(12) United States Patent
Tsujimoto

(10) Patent No.: US 6,307,974 B1
(45) Date of Patent: Oct. 23, 2001

(54) IMAGE PROCESSING APPARATUS, SYSTEM, AND METHOD WITH ADAPTIVE TRANSFER

(75) Inventor: Takuya Tsujimoto, Kawasaki (JP)

(73) Assignee: Canon Kabushika Kaisha, Tokyo (JP)

( * ) Notice: Subject to any disclaimer, the term of this patent is extended or adjusted under 35 U.S.C. 154(b) by 0 days.

(21) Appl. No.: 09/099,819

(22) Filed: Jun. 19, 1998

(30) Foreign Application Priority Data

Jun. 23, 1997 (JP) ................................... 9-166431
May 28, 1998 (JP) ................................ 10-147959
May 28, 1998 (JP) ................................ 10-147960

(51) Int. Cl.[7] ........................... G06K 9/36; G06K 9/00; H04L 12/66; H04J 3/16
(52) U.S. Cl. ....................... 382/239; 382/319; 370/352; 370/465
(58) Field of Search ................................ 382/319, 239, 382/309, 162; 348/220; 370/232, 264, 265, 352, 424, 465; 358/1.14, 1.15, 405

(56) References Cited

U.S. PATENT DOCUMENTS

| | | | |
|---|---|---|---|
| 4,549,292 | * 10/1985 | Isaman et al. | 370/424 |
| 5,450,411 | * 9/1995 | Heil | 370/352 |
| 5,720,013 | * 2/1998 | Uda et al. | 395/114 |
| 5,926,560 | * 7/1999 | Ichinose et al. | 382/162 |
| 5,982,416 | * 11/1999 | Ishii et al. | 348/29 |
| 6,005,613 | * 12/1999 | Endsley et al. | 348/231 |

* cited by examiner

Primary Examiner—Thomas D. Lee
Assistant Examiner—Wenpeng Chen
(74) Attorney, Agent, or Firm—Morgan & Finnegan, L.L.P.

(57) ABSTRACT

This invention is to transmit read image data to a host device using a transfer mode which guarantees a predetermined band and does not perform error check or retransmission time suitable for the original purpose of prescanning. When a prescanning instruction is received from a host computer (112), a scanner (115) is driven to read an original image, and thinning/interpolation and compression are performed. In addition, transfer through a communication interface USB to the host computer (112) is performed in the isochronous transfer mode which guarantees a predetermined band within a periodically continuous time and does not perform retransmission in response to error occurrence, thereby realizing high-speed transfer.

46 Claims, 56 Drawing Sheets

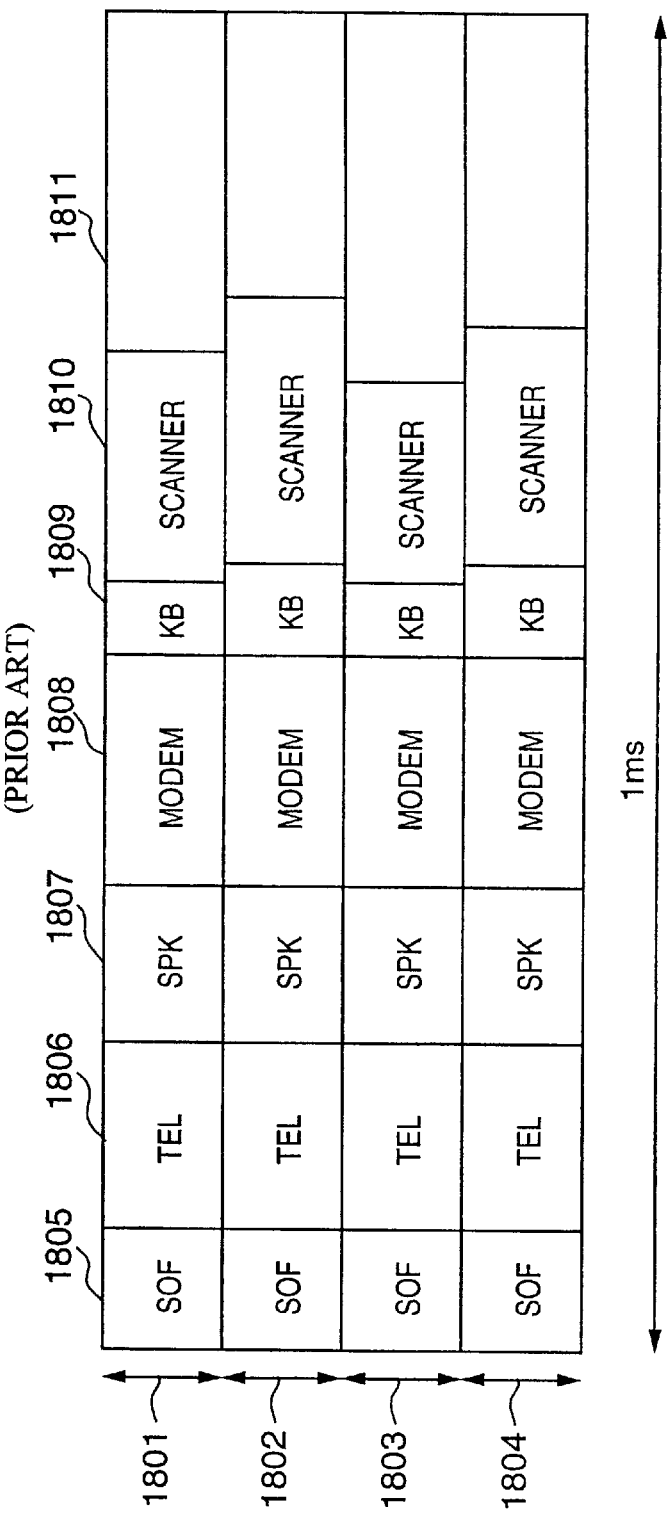
FIG. 18 (PRIOR ART)
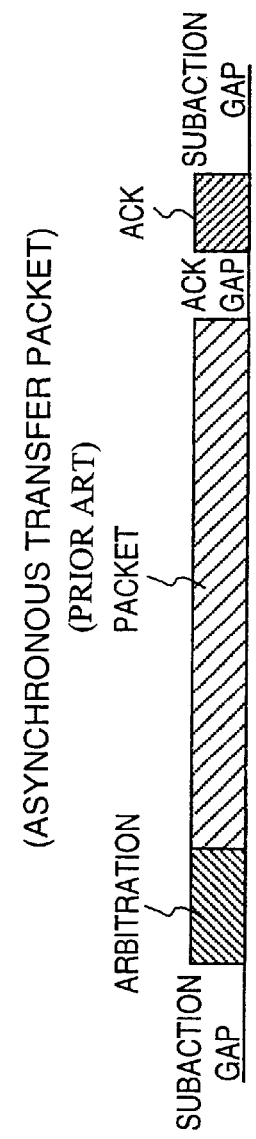
FIG. 19 (ASYNCHRONOUS TRANSFER PACKET) (PRIOR ART)

(REQUEST AND PERMISSION OF ARBITRATION)

REQUEST FOR BUS USE RIGHT (REQUEST AND PERMISSION OF ARBITRATION)

PERMISSION OF BUS USE (ISOCHRONOUS TRANSFER PACKET)

(BUS STATE WHEN ONE CYCLE IS PRECISELY 125μs)

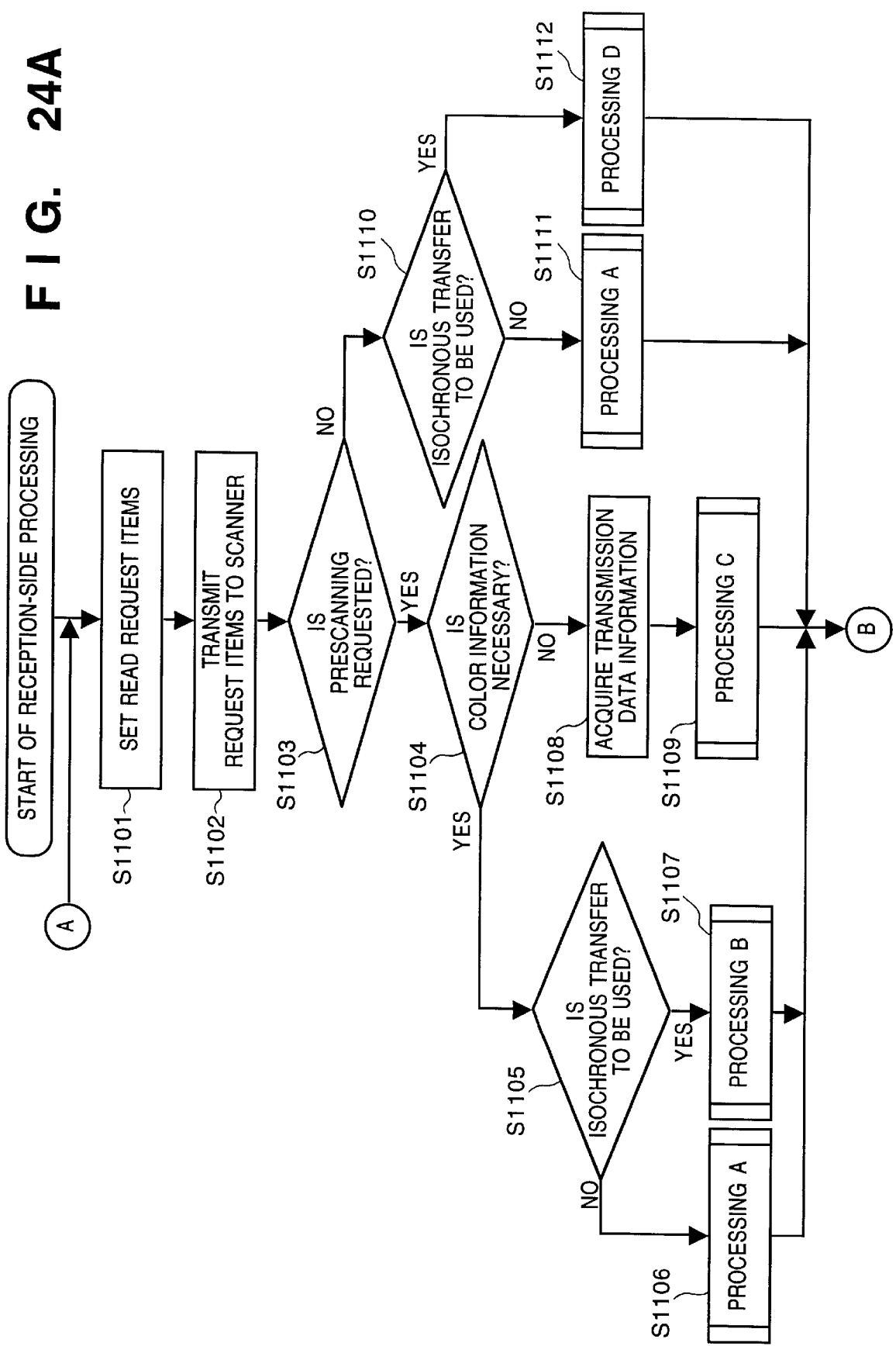

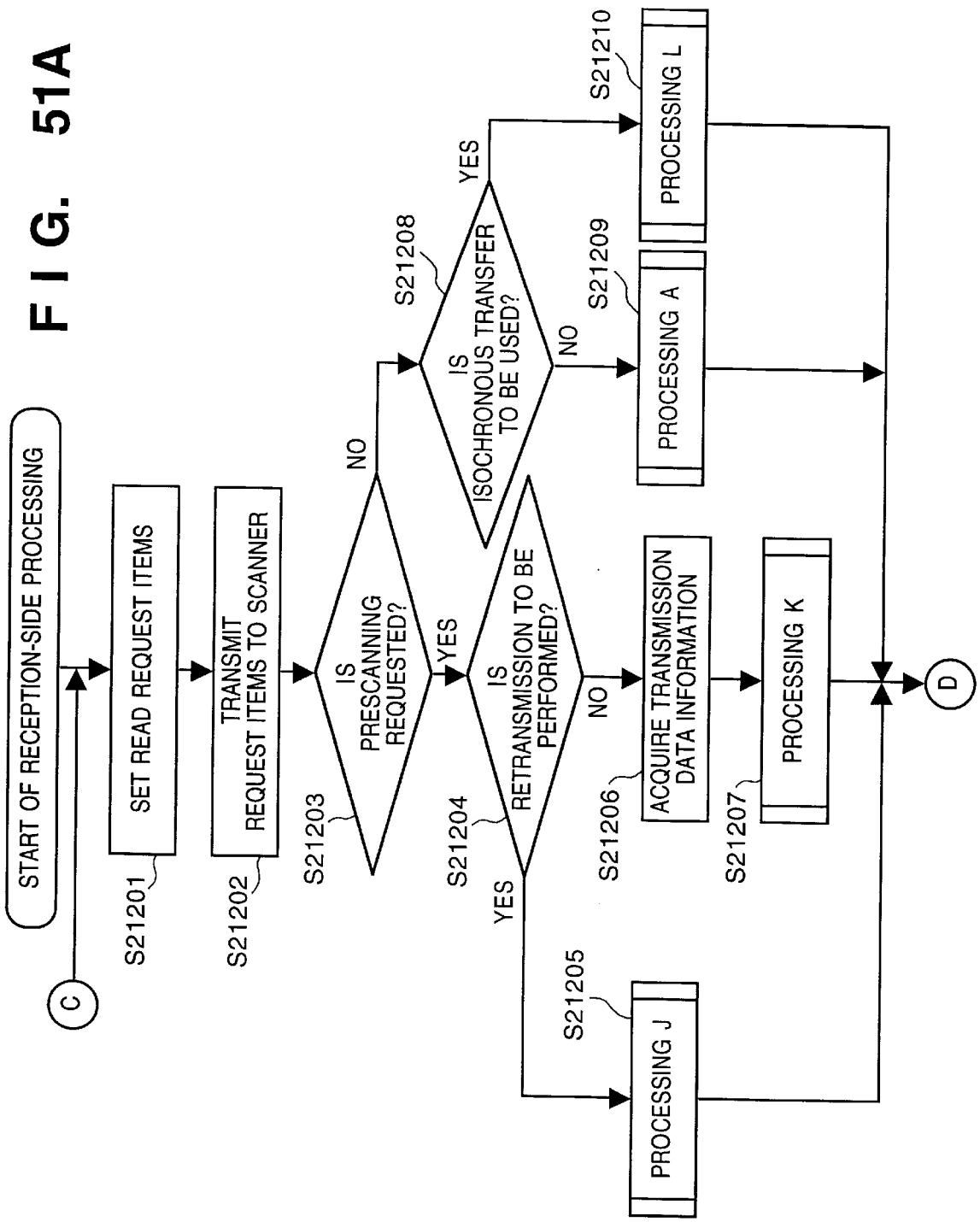

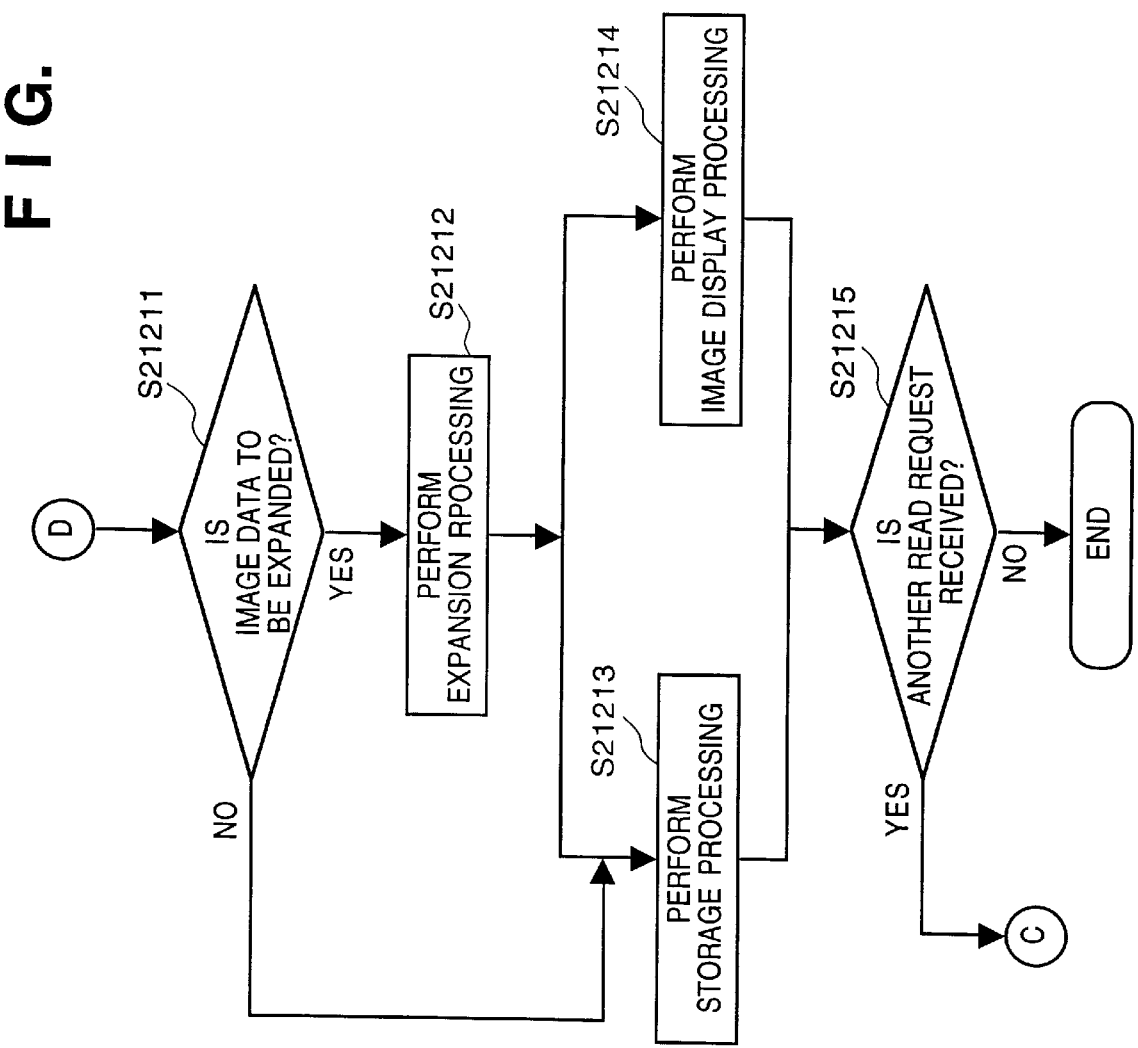

IMAGE PROCESSING APPARATUS, SYSTEM, AND METHOD WITH ADAPTIVE TRANSFER

BACKGROUND OF THE INVENTION

The present invention relates to an image processing apparatus and a control method therefor and, more particularly, to an image processing apparatus for reading an original image and transferring it to a host device, and a control method therefor.

The following method is known as a conventional method of reading an image by an image scanner.

First, to identify the whole image to be input, e.g., to determine whether the image to be currently read is correct or to set the scanning range, the image is provisionally scanned (prescanning). This prescanned image data is transmitted to the host. The host confirms the image or designates the region to be actually read (designate the trimming range). The desired region is scanned (scanning) on the basis of the prescanned image, thereby reading the image. If another region is to be designated, prescanning is performed again.

This prescanning operation is necessary before desired image data is read by scanning. Actually necessary data is the image data read by scanning. However, since the amount of read image data is large, the time necessary for prescanning and, more particularly, the time for transmitting data to the host cannot be ignored.

To solve the above problem or shorten the time required for prescanning, the read resolution in prescanning is set to be lower than that in scanning, i.e., the image is input at a low resolution to reduce the data amount, data is compressed in reading or transmission, a color image is prescanned to a monochromatic image, or a read color image is converted into a monochromatic image and then transmitted.

The transmission time can also be shortened by using a high-speed interface. In recent years, a USB (Universal Serial Bus) has received a great deal of attention as a high-speed serial interface for connecting a computer to a peripheral device. The specifications of this interface allow for relatively inexpensive connection of a computer to a peripheral device at a communication rate of 12 Mbps (a communication rate of 1.5 Mbps can also be used).

FIG. 17 shows a connection example of the USB.

Reference numeral 1701 denotes a host; 1702, a hub, and 1703, a device.

The host 1701 is an ordinary computer for controlling communication of the entire USB. The hub 1702 is a branchpoint in USB connection, to which a plurality of hubs or devices can be connected (the host 1701 has a hub function). The device 1703 is a peripheral device such as a modem, a printer, or a scanner.

The USB has a control transfer mode, an isochronous transfer mode, an interrupt transfer mode, and a bulk transfer mode. Control transfer is used to control the USB. Isochronous transfer is performed at a predetermined rate and does not permit any delay. That is, no retransmission due to an error is performed, though a predetermined band is guaranteed. Examples of applications in which isochronous transfer is used include a telephone or an audio device. As a characteristic feature, isochronous transfer has no correction for a communication error, though the data transfer band and time are guaranteed. In control transfer, interrupt transfer, and bulk transfer, retransmission is performed when a communication error occurs. A short response time is required for interrupt transfer. Examples of applications in which interrupt transfer is used include a pointing device such as a keyboard or a mouse. Bulk transfer has low priority although the data amount is large. Examples of applications in which bulk transfer is used include a printer or a scanner.

FIG. 18 shows the general bandwidths of the USB.

Reference numerals 1801 to 1804 denote frames to be repeatedly generated; 1805, an SOF (Start Of Frame) packet indicating the start of a frame; 1806 to 1808, bandwidths for isochronous transfer; 1809, a bandwidth for interrupt transfer; 1810, a bandwidth for bulk transfer; and 1811, an unused bandwidth.

A frame means a 1-ms period bandwidth generated in the USB. The bandwidths for the respective transfer modes are ensured in one frame. The bandwidth for isochronous transfer is assigned when the device is connected to the USB, and after this, a predetermined bandwidth is ensured. Bulk transfer uses a bandwidth which is not used for isochronous transfer. For this reason, when the bandwidth used for isochronous transfer is large, the capability of bulk transfer lowers.

As a high-speed serial interface other than the USB, an IEEE 1394 bus having a higher data transfer rate may be used.

For the IEEE 1394 (to be abbreviated as "1394" hereinafter), data transfer rates of 100, 200, and 400 Mbps are defined. A 1394 port having a higher transfer rate is defined to hold the compatibility to the lower speed. That is, the data transfer rates of 100, 200, and 400 Mbps can be used on the same network.

In addition, the 1394 uses a transfer format of a DS-Link coding scheme, thereby increasing the efficiency of the data transfer band as compared to 8B10B conversion (the start and stop bits are added to 8-bit data) as a general serial transfer format.

For the 1394, the transfer operation performed in the network is called a subaction. For the 1394, two subaction operations are defined. One is asynchronous transfer, and the other is a real-time transfer mode called isochronous transfer which guarantees the transfer band.

Each subaction is divided into three parts. These transfer states are sequentially called arbitration, packet transmission, and acknowledgement.

Asynchronous subaction is asynchronous transfer. FIG. 19 shows the time transition state in this transfer mode. The first subaction gap represents that the bus is idle. Since the 1394 is a serial bus, this gap time is monitored, i.e., it is checked whether the immediately preceding transfer operation is ended, thereby determining whether transfer can be performed.

Upon detecting the idle state for a predetermined or more time, the node which needs transfer determines that the bus can be used and executes arbitration to acquire the bus. It is a node positioned at the root (device having a 1394 port) that actually makes the decision for arbitration of the bus, as shown in FIG. 20. When the right to the bus is acquired by arbitration, data transfer (packet transmission) is executed. After data transfer, the node which has received the data returns "ack" (reception acknowledge code) for the received data. That is, bidirectional communication is performed. The "ack" is coded. Both nodes can confirm on the basis of the contents of this code whether transfer has been normally performed.

After this, the subaction gap (idle) is detected again, and the transfer operation is repeated.

The 1394 transfers data as a packet. When transfer is complete, the bus is immediately released. This allows effective use of the band. Packet data has a header portion and a data portion. The header portion contains information such as the other party address, the self node address, and the transfer data size. The data portion contains actual transfer data in quartet units (4 bytes). Each of the header and data portions has CRC data to ensure the reliability of the data.

When the node executes transfer, the data is transferred to all nodes in the bus. Each node reads the header address of the packet. If the packet data is addressed to the self node, the node receives it.

FIG. 21 shows the time transition state in isochronous transfer. Since isochronous transfer is executed at an interval of about 8 kHz with priority over asynchronous transfer, the isochronous transfer mode guarantees the transfer band. Therefore, real-time data transfer can be realized.

However, isochronous transfer is executed by broadcasting, so no ack code is returned upon reception. That is, because of one-directional communication, it cannot be confirmed whether transfer has been normally performed. The transfer format of isochronous transfer uses a channel ID in place of a node address.

When a plurality of nodes are to simultaneously perform real-time data (isochronous) transfer, a channel ID number for identifying the contents (transmission node) is set for each transfer data. A node which is to receive the data sets a target ID and receives desired isochronous data.

Isochronous transfer will be described in more detail with reference to FIG. 23.

One isochronous cycle is set from the cycle start to the next cycle start data. This cycle starts at an interval of 8 kHz (125 $\mu$s) on average. After the cycle start data, isochronous transfer starts upon detecting a subaction gap shorter than that of asynchronous transfer.

When isochronous transfer is complete, asynchronous transfer can be executed until the next cycle. Each node makes determination therefor upon detecting that the subaction gap after isochronous transfer has a length for allowing the start of asynchronous transfer. Even when asynchronous transfer continues to the next cycle start data transfer time, asynchronous transfer is not interrupted. The next cycle start waits until the bus idles, and then, the cycle start is issued. If a certain cycle continues over 125 $\mu$s, the next cycle is shortened. However, isochronous transfer is always executed. Therefore, real-time data such as video or audio data can be handled at the same transfer cycle. The cycle start data is managed by the cycle master node (root) of the 1394 network.

For the above-described transfer as well, it is important to decrease the amount of prescanned image data to be transmitted. Once data to be transmitted is determined, the data is checked such that it can be reliably received by the host. For this purpose, error check or retransmission is performed resulting in a longer transmission time.

In a bus interface such as a USB (Universal Serial Bus) having a plurality of transfer modes and scheduled at a specific period, the bandwidths of the respective transfer modes are assigned in one period (one frame). Bulk transfer used to transfer a large quantity of data such as image data read by a scanner has low priority as compared to the remaining transfer modes. For this reason, when the traffic in the bus is large (when priority transfer is being performed), data cannot be transmitted at a desired transfer rate.

SUMMARY OF THE INVENTION

The present invention has been made in consideration of the above problem, and has as its first object to provide an image processing apparatus capable of realizing a short data transmission time suitable for the original purpose of prescanning by using a transfer mode which guarantees a predetermined band and does not perform error check or retransmission request to transmit read image data to a host device.

It is another object of the present invention to realize transfer of image data such as color information for which any data omissions are not permitted, by using a transfer mode for guaranteeing reliable data transfer in prescanning.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 18 is a view showing general bandwidths of the USB;

FIG. 19 is a view showing the time transition state in asynchronous subaction transfer;

FIGS. 24A and 24B are flow charts showing the control procedure on the reception side in the third embodiment;

FIGS. 51A and 51B are flow charts showing the procedure of reception processing in the reception-side apparatus in the fifth embodiment;

DETAILED DESCRIPTION OF THE PREFERRED EMBODIMENTS

The embodiments of the present invention will be described below with reference to the accompanying drawings.

<First Embodiment>

Figure 1:
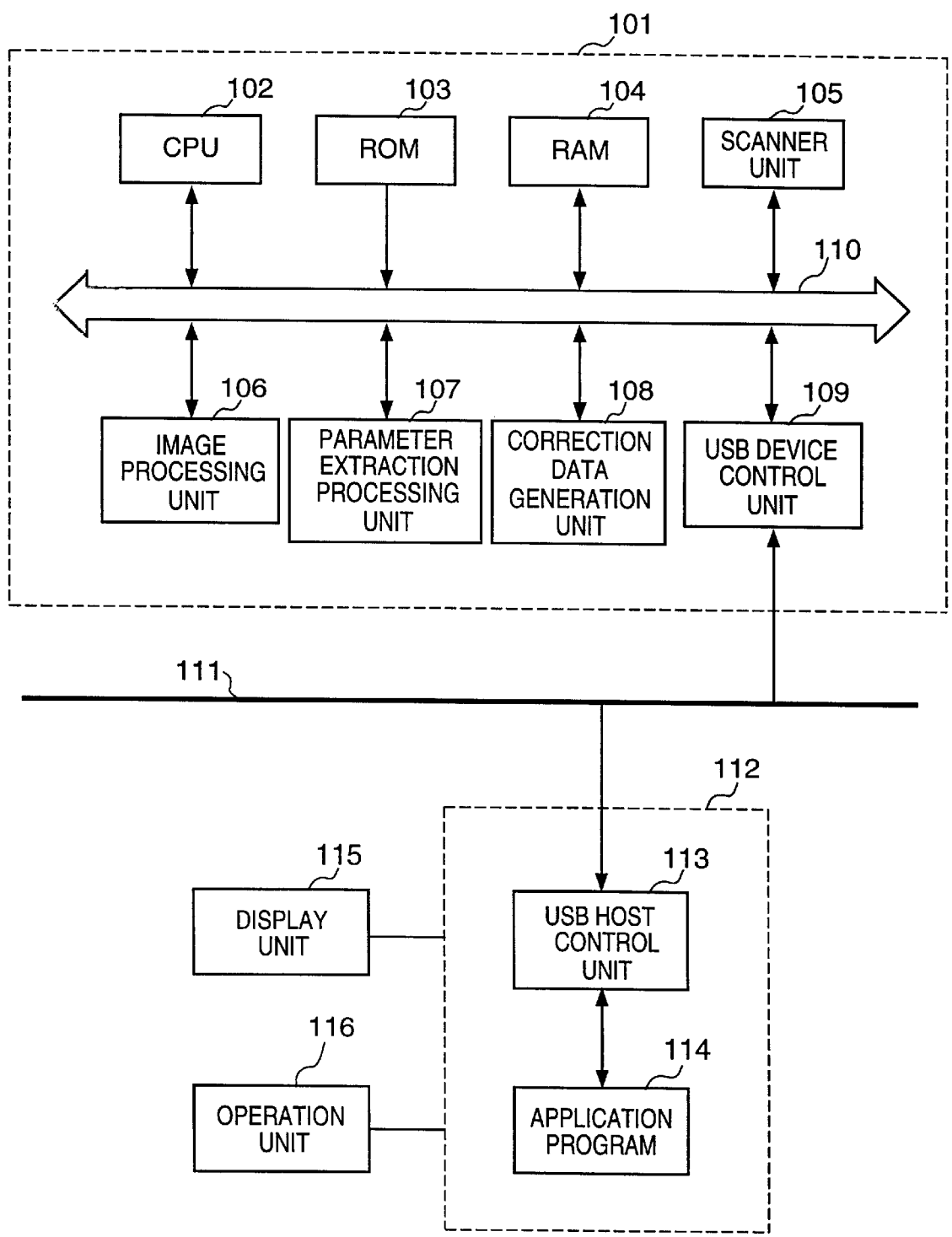
FIG. 1 is a block diagram of an image reading apparatus in the first embodiment.

FIG. 1 is a block diagram of an image reading apparatus in the first embodiment. Referring to FIG. 1, reference numeral 101 denotes an image processing device main body, and in this case, the image reading apparatus is a scanner device. A CPU 102 controls the entire image reading apparatus 101. A ROM 103 stores a program to be executed by the CPU 102. A RAM 104 stores data to be used by the CPU 102, various image data read by a scanner 105, and generated correction data.

The scanner 105 reads an original. The scanner 105 has, e.g., a linear CCD to read the image in units of lines. A two-dimensional image is read by moving the CCD in the subscanning direction. An image processing unit 106 processes image data. A parameter extraction processing unit 107 extracts a parameter to generate scanning correction data. Reference numeral 108 denotes a main scanning correction data generation unit. A USB device control unit 109 controls communication with a USB. A bus 110 connects the blocks 102 to 109 of this device. Reference numeral 111 denotes a USB interface cable. The units 105 to 109 will be described later in more detail with reference to FIGS. 2 to 6.

A host computer (PC) 112 serves as a host of the USB system of this arrangement. A USB host control unit 113 is connected to the USB to control communication with the USB. An application program (client software) 114 runs on the host computer. Sending an image read request to the scanner main body, setting in reading, and processing of image data transmitted through the USB are performed by the application program.

A display unit 115 comprising a CRT or an LCD connected to the host computer displays transmitted image data or setting in reading. An operation unit 116 is constituted by a keyboard or a mouse connected to the host computer. Various setting and application operations are performed on the operation unit 116.

Figure 2:
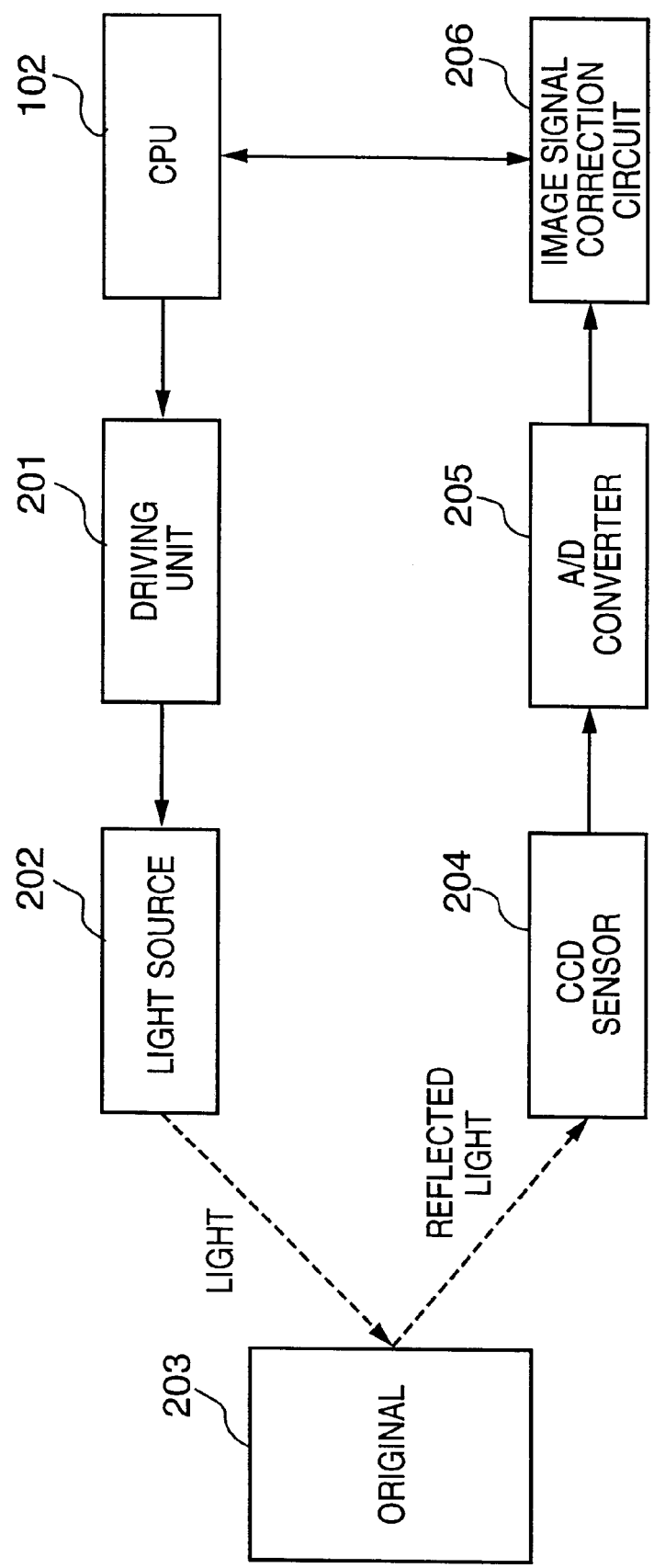
FIG. 2 is a block diagram showing details of a scanner 105 in the first embodiment.

FIG. 2 is a block diagram showing details of the scanner 105 in the first embodiment.

Referring to FIG. 2, reference numeral 201 denotes a driving unit for driving a light source 202; 202, the light source; 203, an original to be read; and 204, a CCD sensor. An A/D converter 205 converts the analog output signal from the CCD sensor 204 into a digital signal. In this case, assume an A/D converter for converting 10 bit signals per pixel. An image signal correction circuit 206 corrects the input signal on the basis of the digital signal from the A/D converter 205.

Scanning is controlled by the CPU 102. First, the CPU 102 outputs a signal to the driving unit 201 to irradiate the original 203 with the light source 202. After this, light output from the light source 202 is received by the original 203, and the reflected light is detected by the CCD sensor 204 as a detection means and input as image information of the original 203. The input signal is converted into a 10-bit digital signal for each of the R, G, and B components. The image signal correction circuit corrects the input level on the basis of the digital signal in converting it into an 8-bit output. The CPU 102 outputs a signal to the driving unit 201 on the basis of the 8-bit signal, thereby controlling the operation of the scanner. Prescanning is performed on the basis of a signal of one color, e.g., only the G component of the R, G, and B components.

Figure 3:
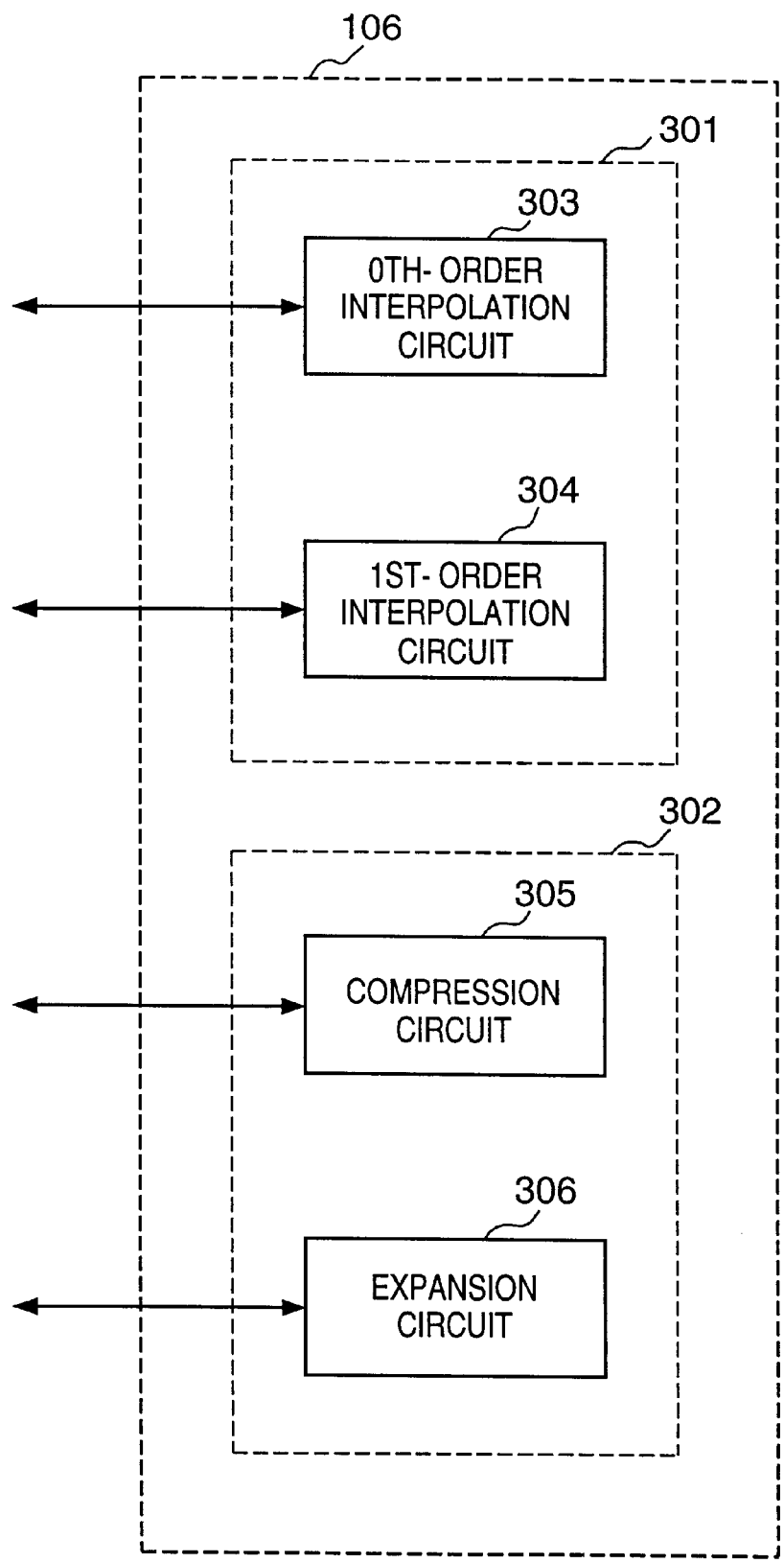
FIG. 3 is a block diagram showing details of an image processing unit 106 in the first embodiment.

FIG. 3 is a block diagram showing details of the image processing unit 106 in the first embodiment.

The image processing unit 106 is constituted by two blocks, as shown in FIG. 3. One is a resolution conversion processing unit 301, and the other is a compression processing unit 302.

A 0th-order interpolation circuit 303 in the resolution conversion processing unit 301 thins pixels. The resolution is converted by a simple thinning operation of decreasing the number of pixels. A 1st-order interpolation circuit 304 thins pixels. The resolution is converted by linearly interpolating pixels when the number of pixels is decreased.

A compression circuit 305 in the compression processing unit 302 compresses image data. In this case, compression based on JPEG is performed. An expansion circuit 306 in the compression processing unit expands image data. In this case, expansion based on JPEG is performed.

Resolution conversion is performed to shorten the time for transmitting data to the host or decrease the amount of image data for the sake of saving the memory. The scanner reads an image at a resolution designated by the user.

However, since prescanning aims at confirmation of the image or designation of a region for main scanning, the image is read at a lower resolution than that in main scanning. The resolution in the main scanning direction is determined depending on the above-described sensor. To lower the resolution, pixels of image data which has been read at a certain resolution are thinned to obtain a resolution for achieving the purpose of prescanning and reducing the amount of transmission data. The resolution in the subscanning direction perpendicular to the main scanning direction is converted by changing the moving speed (scanner speed) of the CCD sensor 204.

Compression is performed to shorten the time for transmitting data to the host or decrease the amount of image data for the sake of saving the memory, like resolution conversion. The expansion circuit for expanding the temporarily compressed data is arranged assuming a case wherein transmission is performed in a transfer mode without error correction, or compressed data cannot be expanded on the reception side.

Figure 4:
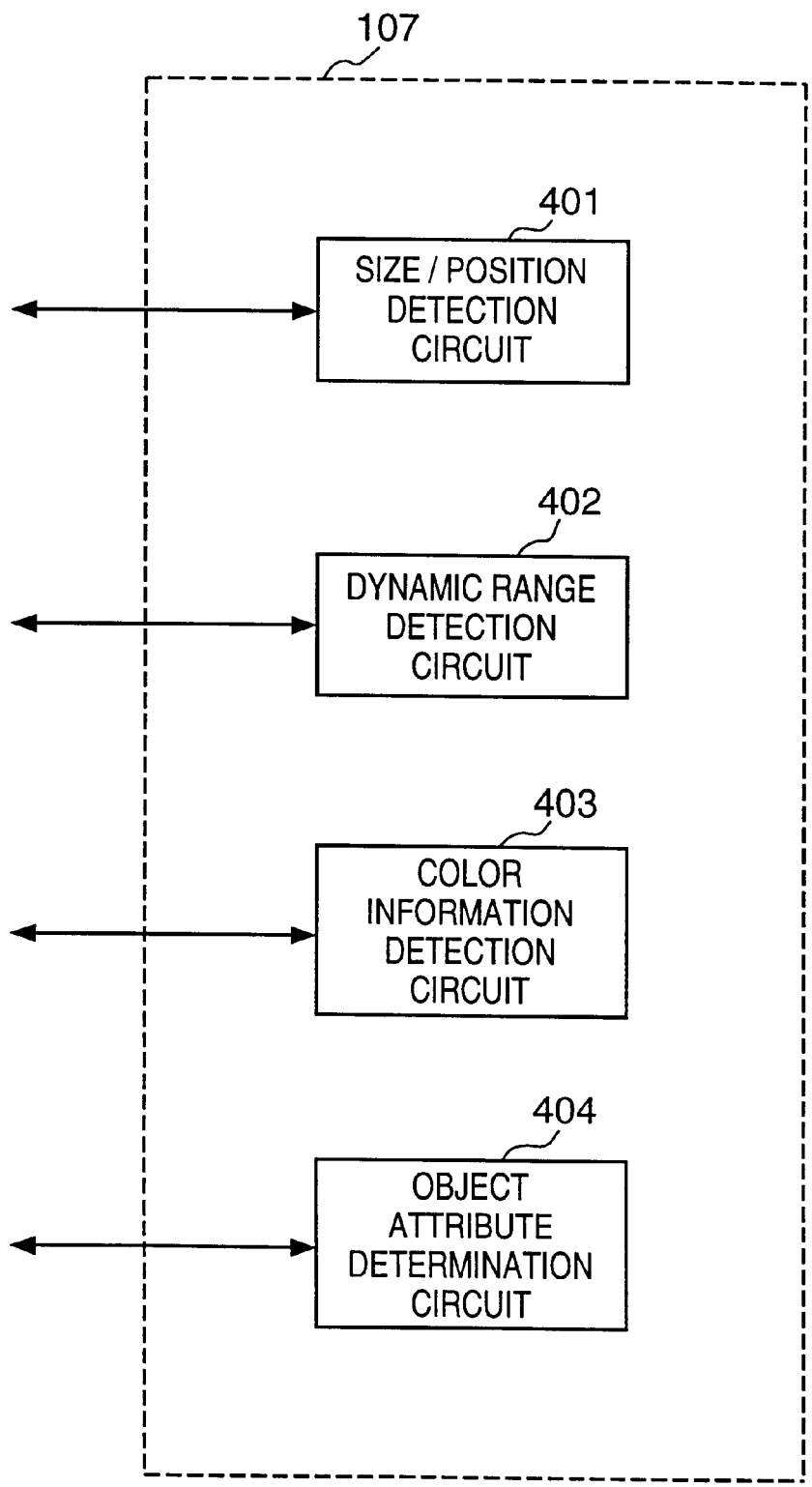
FIG. 4 is a block diagram of a parameter extraction processing unit 107 in the first embodiment.

FIG. 4 is a block diagram of the parameter extraction processing unit 107 in the first embodiment.

In FIG. 4, a circuit 401 detects the position or size of the original. This size/position detection circuit 401 detects the edge of the original by regarding a portion where the input level abruptly changes as the boundary between the original and the read table. A circuit 402 detects the dynamic range of the input signal, i.e., the maximum and minimum levels of the 10-bit digital output. A circuit 403 detects color information. The signal level of the background color of the original or information used for color balance correction of R, G, and B components is detected. A circuit 404 determines the attribute of an object in the original. The object in the original is, e.g., text data, graphic data, or a halftone image such as a photograph.

Figure 5:
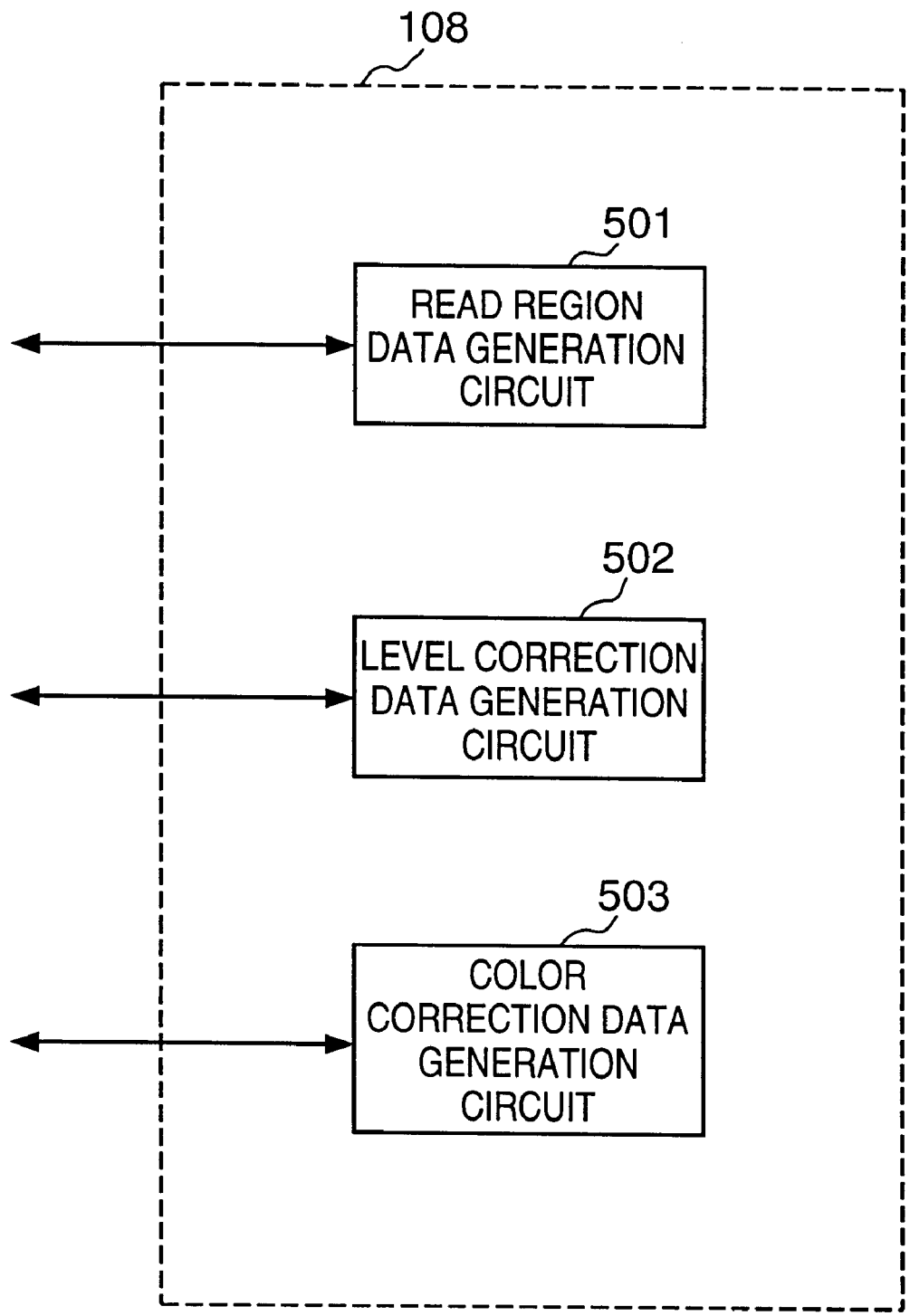
FIG. 5 is a block diagram of a correction data generation unit 108 in the first embodiment.

FIG. 5 is a block diagram of the correction data generation unit 108 in the first embodiment.

In FIG. 5, a circuit 501 generates data for determining the original read region on the basis of the signal from the size/position detection circuit 401. The above-described driving system of the scanner is controlled on the basis of the generated data. A circuit 502 generates data for correcting the level of the input signal on the basis of the signal from the dynamic range detection circuit 402. As described above, this data is used to generate an 8-bit image signal from the 10-bit output signal after A/C conversion. A circuit 503 generates color correction data on the basis of the signal from the color information detection circuit 403. This circuit reduces granular noise or corrects/adjusts the balance of colors by adjusting the background color of the original in accordance with the white level.

Figure 6:
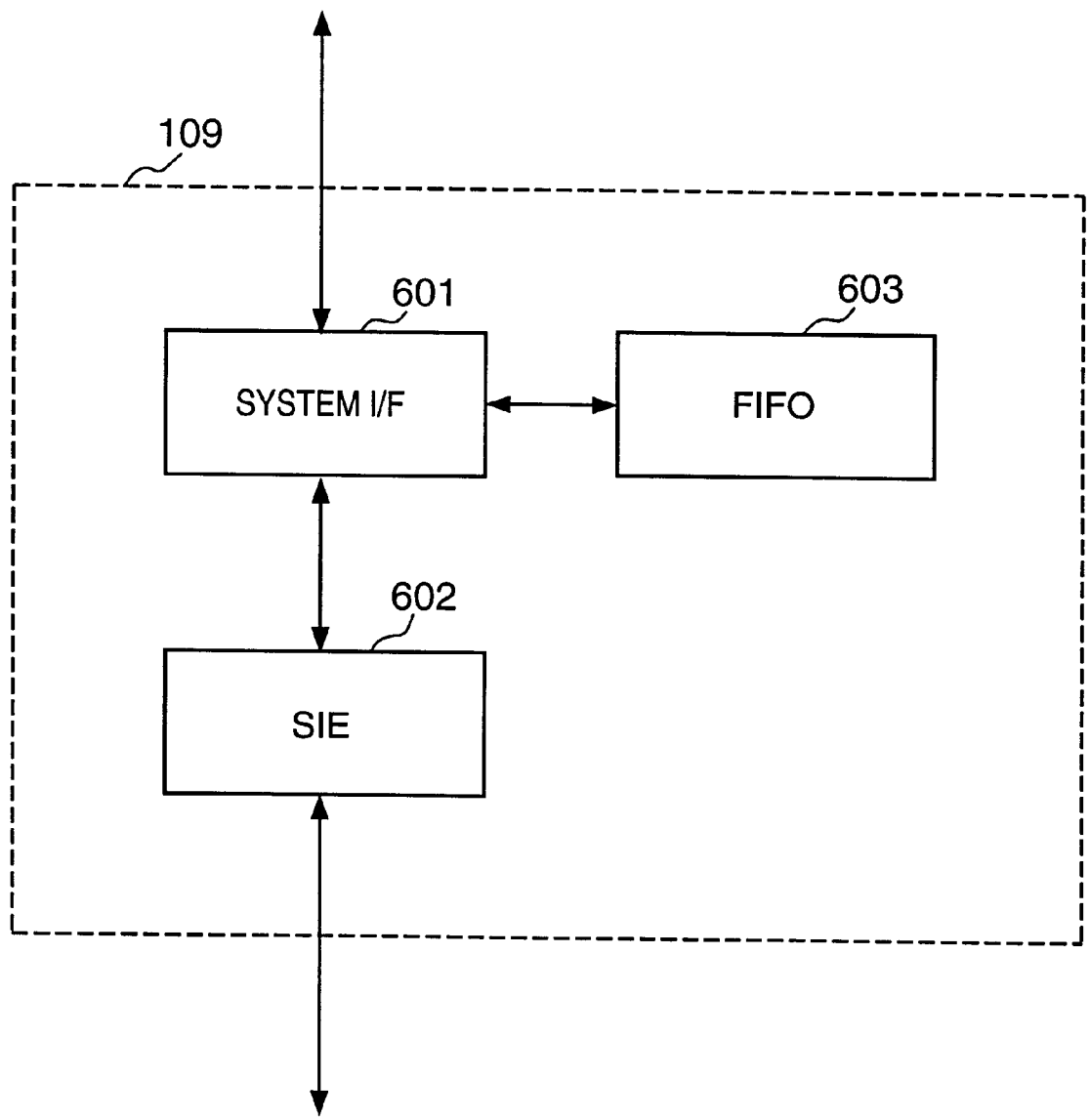
FIG. 6 is a block diagram of a USB device control unit 109 in the first embodiment.

FIG. 6 is a block diagram of the USB device control unit 109 in the first embodiment.

In FIG. 6, reference numeral 601 denotes a system interface logic unit interfacing to the scanner system and, more particularly, the CPU. In this case, the system interface 601 serves as an interface between an SIE (to be described later) and the CPU. An SIE (Serial Interface Engine) 602 executes the basic operation of the USB. An FIFO 603 is connected to the system interface 601 to serve as a transmission/reception buffer at the end point of the USB.

Figure 7:
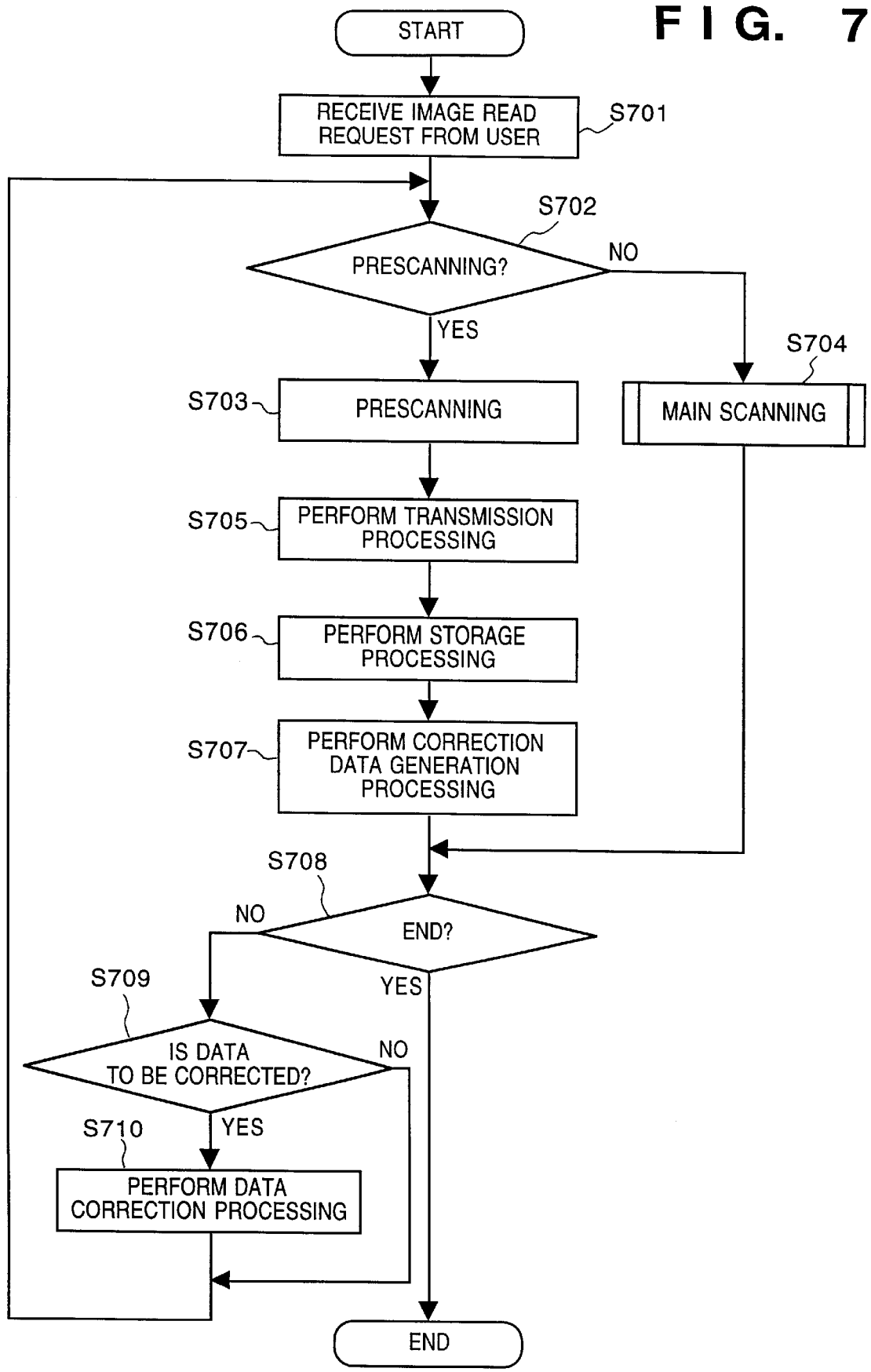
FIG. 7 is a flow chart showing the control procedure in the first embodiment.

FIG. 7 is a flow chart showing the control procedure in the first embodiment.

In step S701, an image read request is received from the user. This request is issued from the host computer operated by the user. In addition, various setting information (refer to branch determination in each flow chart to be described later for further details) associated with reading, which are selected on the host side, are also transmitted.

In step S702, it is determined whether image reading is to be performed by prescanning or scanning (main scanning). If prescanning is to be performed, the flow advances to step S703. If scanning (main scanning) is to be performed, the flow advances to step S704. Hereinafter, "main scanning" is simply expressed with "scanning".

The contents of the prescanning operation in step S703 and those of the scanning operation in step S704 will be described later in detail with reference to FIGS. 8 and 13, respectively.

After prescanning, the flow advances to step S705 to transmit data obtained by prescanning to the host.

In FIG. 7, data transmission is sequential to prescanning. In fact, immediately after the scanner starts reading raster data, the data is transmitted to the host (details will be described later with reference to FIGS. 9 and 10).

Figure 11:
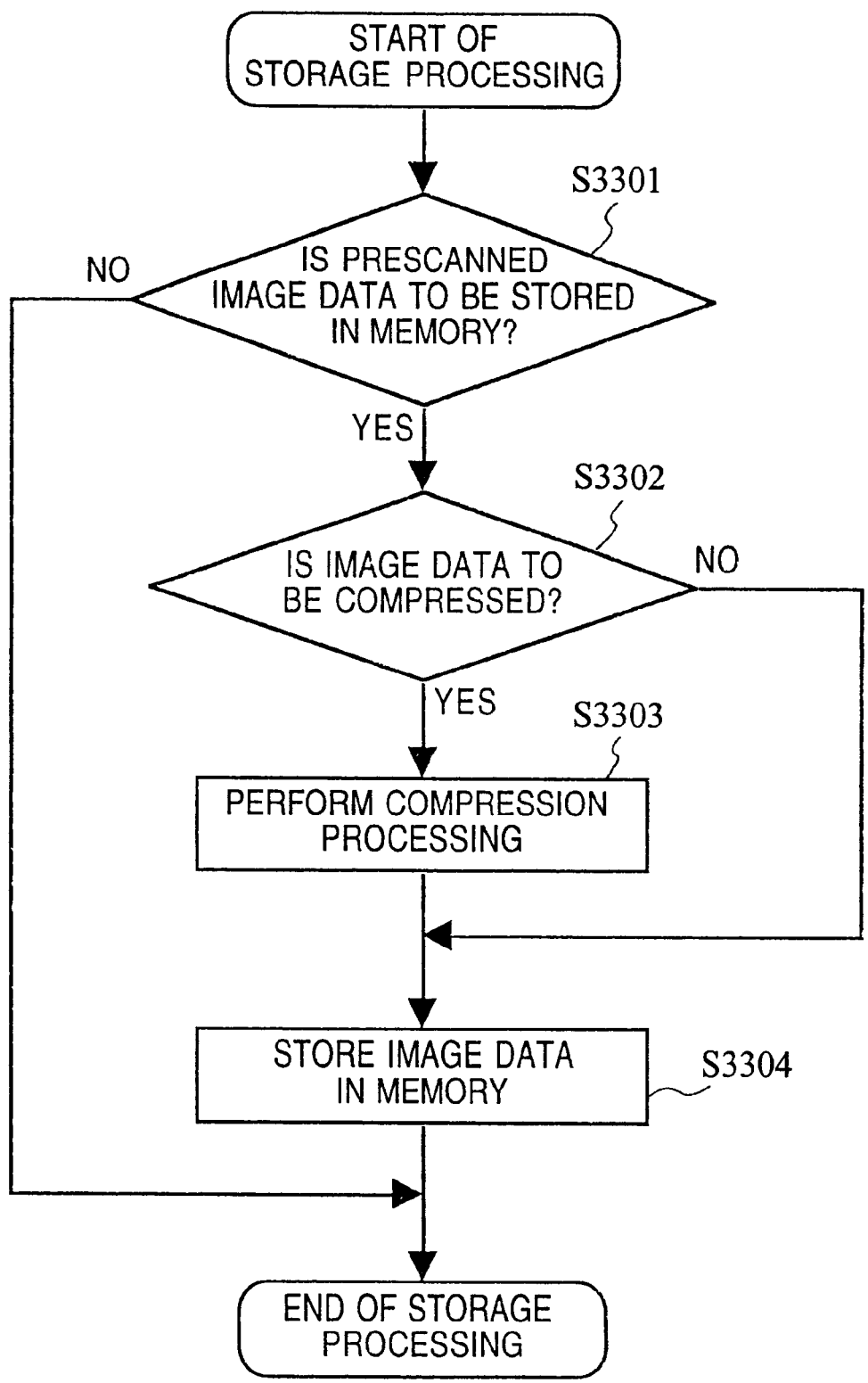
FIG. 11 is a flow chart showing the procedure of storage processing in the first embodiment.
Figure 12:
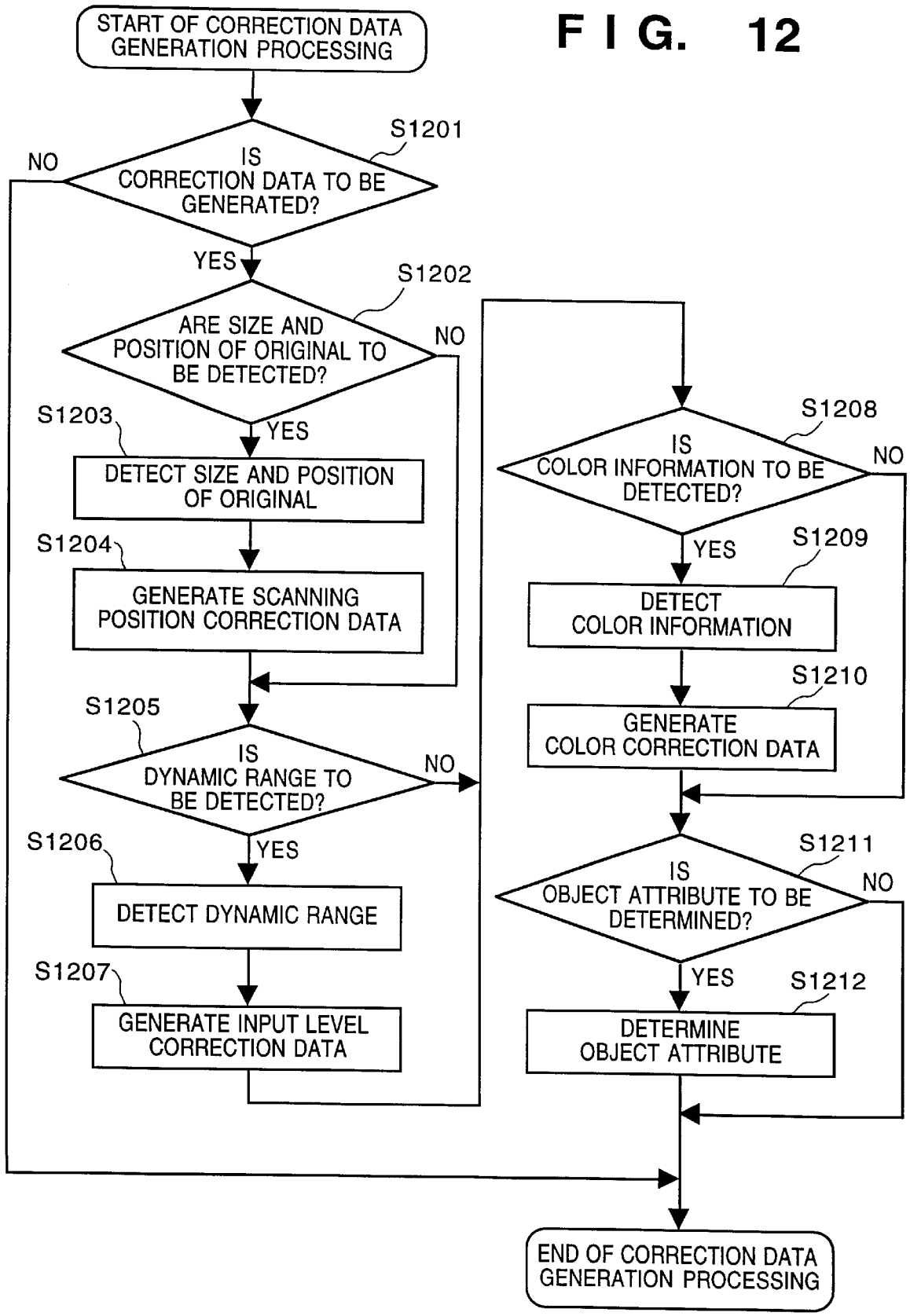
FIG. 12 is a flow chart showing the procedure of correction processing in the first embodiment.

In step S706, the read image data is stored in the memory in the scanner (details are shown in FIG. 11). Although storage in the memory is also performed after transmission processing in this flow chart, storage and transmission can be simultaneously performed because of the hardware arrangement. In step S707, correction data to be used in scanning is generated (details are shown in FIG. 12). Correction data generation can also be simultaneously performed. In step S708, it is selected whether scanning is to be ended. If YES in step S708, processing is ended. If NO in step S708 (if another image read request is received), the flow advances to step S709. In step S709, it is selected whether data correction is to be performed. If correction data generated in prescanning is present, and correction is to be performed, the flow advances to step S710. If NO in step S709, the flow returns to step S702.

In step S710, data correction processing is performed, and the operation stands by for th e next prescanning or scanning.

Operations of main parts in th e above entire processing will be described below in more detail.

Figure 8:
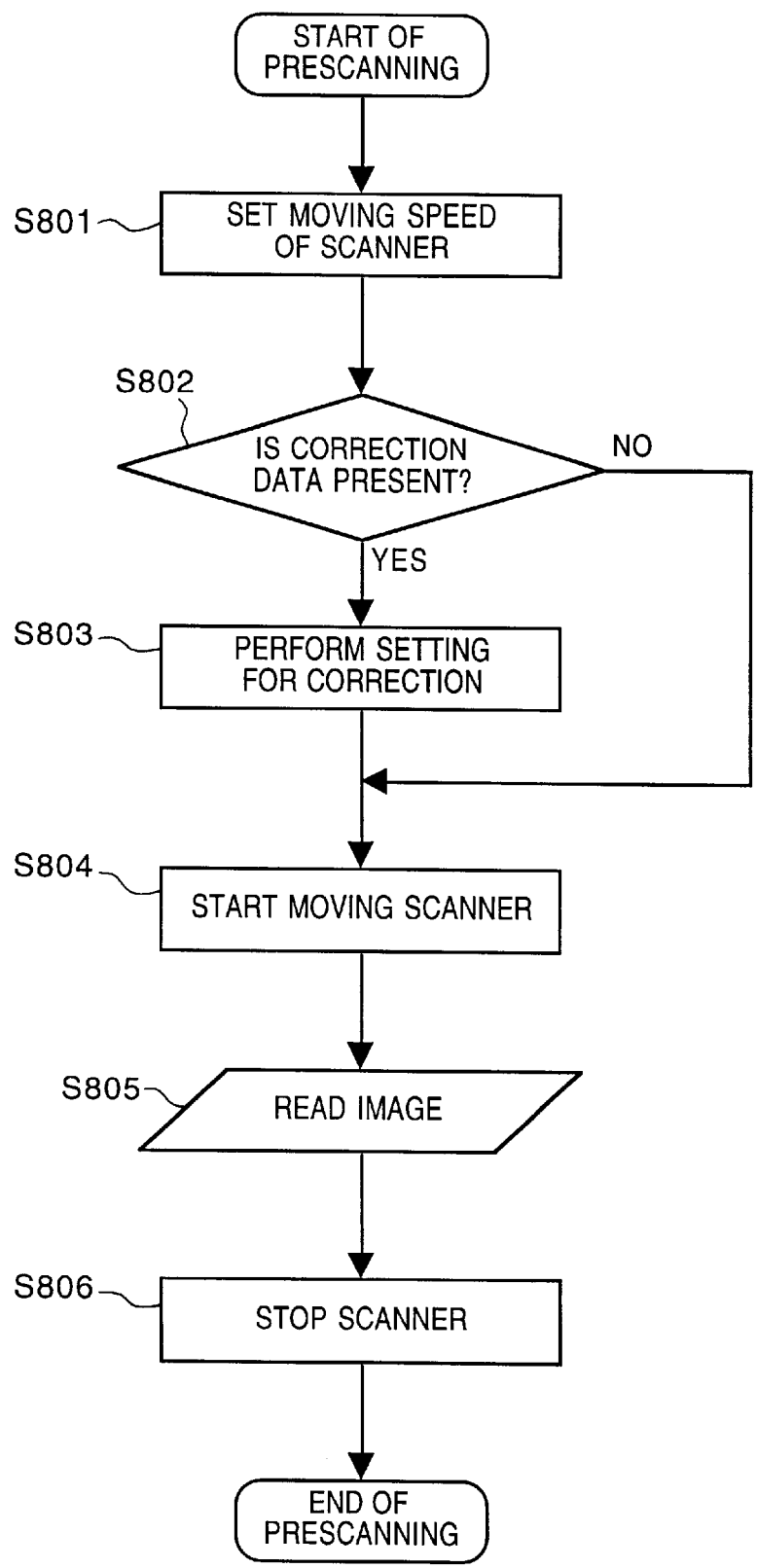
FIG. 8 is a flow chart showing the procedure of prescanning in the first embodiment.

FIG. 8 is a flow chart showing the procedure of prescanning (step S703) in the first embodiment.

In step S801, the moving speech of the scanner is set to control the scanner driving system and read the image at a desired resolution (in prescanning, the scanner moving speed is set to be higher than that in scanning).

In step S802, it is selected whether correction data for prescanning is present. If YES in step S802, setting for correction is performed in step S803. If NO in step S802 (if default setting is not changed), the flow advances to step S804.

In step S803, correction data is corrected. With this processing, the read position is set, and the input level is corrected.

In step S804, the scanner starts moving. In step S805, the image is read. Upon completing reading, the scanner is stopped in step S806. The scanner is driven simultaneously with transmission to the host or storage in the memory as described above.

Figure 9:
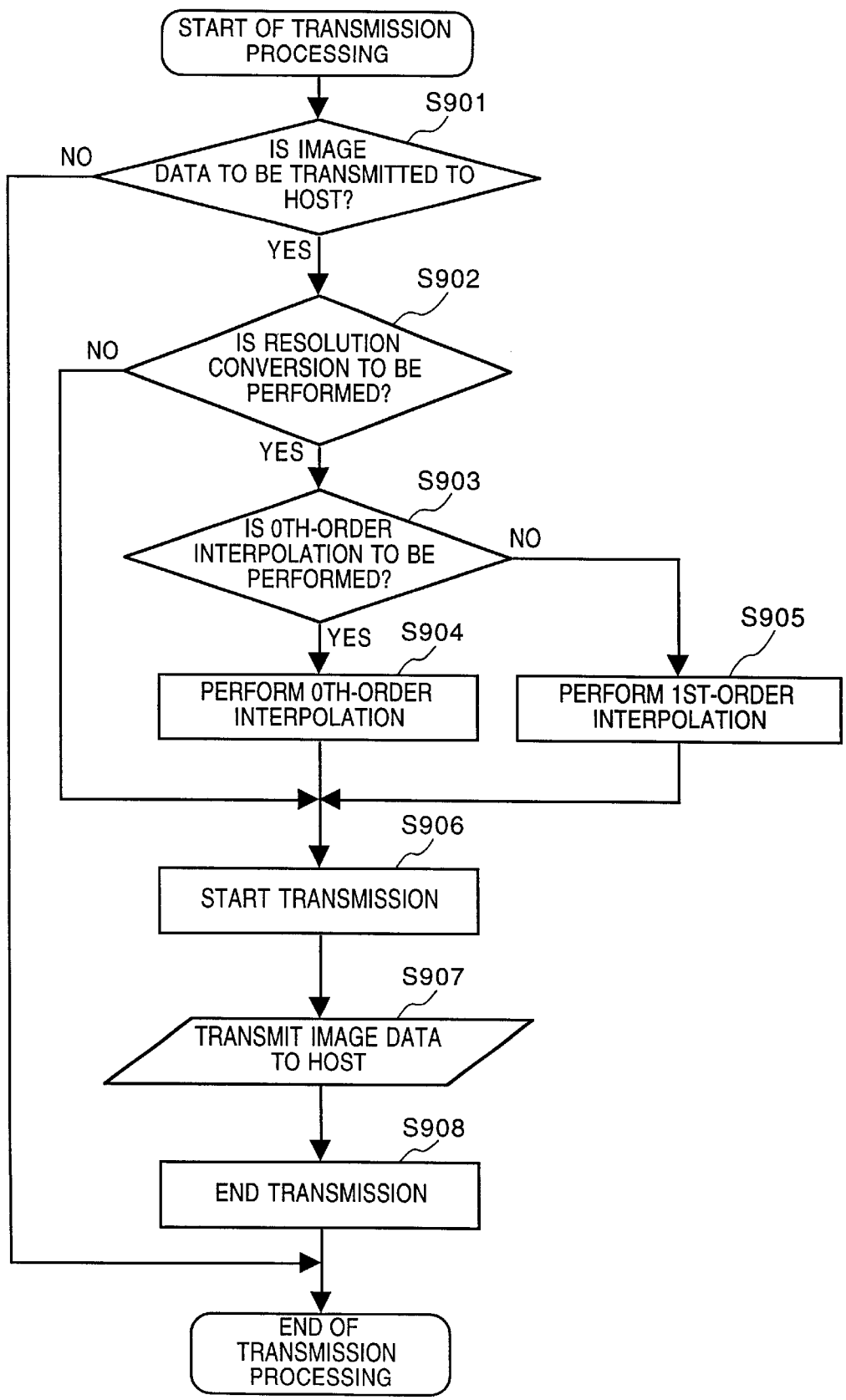
FIG. 9 is a flow chart showing the procedure of transmission processing in the first embodiment.

FIG. 9 is a flow chart showing the procedure of transmission processing (step S705) in the first embodiment.

In step S901, it is selected whether the data is to be transmitted to the host. If YES in step S901, the flow advances to step S902. If NO in step S901, the procedure of transmission processing is ended.

In step S902, it is selected whether the resolution is to be converted. If resolution conversion processing (resolution conversion processing for main scanning direction image data read by the CCD sensor 204) is to be performed, the flow advances to step S903. If NO in step S902, the flow advances to step S906.

In step S903, it is selected whether 0th-order interpolation (simple thinning) processing is to be performed as resolution conversion. If YES in step S903, the flow advances to step S904. If NO in step S903 (if another resolution conversion processing is to be performed), the flow advances to step S905.

When 0th-order interpolation processing (simple thinning processing) is performed in step S904, or 1st-order interpolation processing (linear interpolation processing) is performed in step S905, the flow advances to step S906 to start transmission to the host. In step S907, the data is transmitted to the host (details will be described with reference to FIG. 10).

Figure 10:
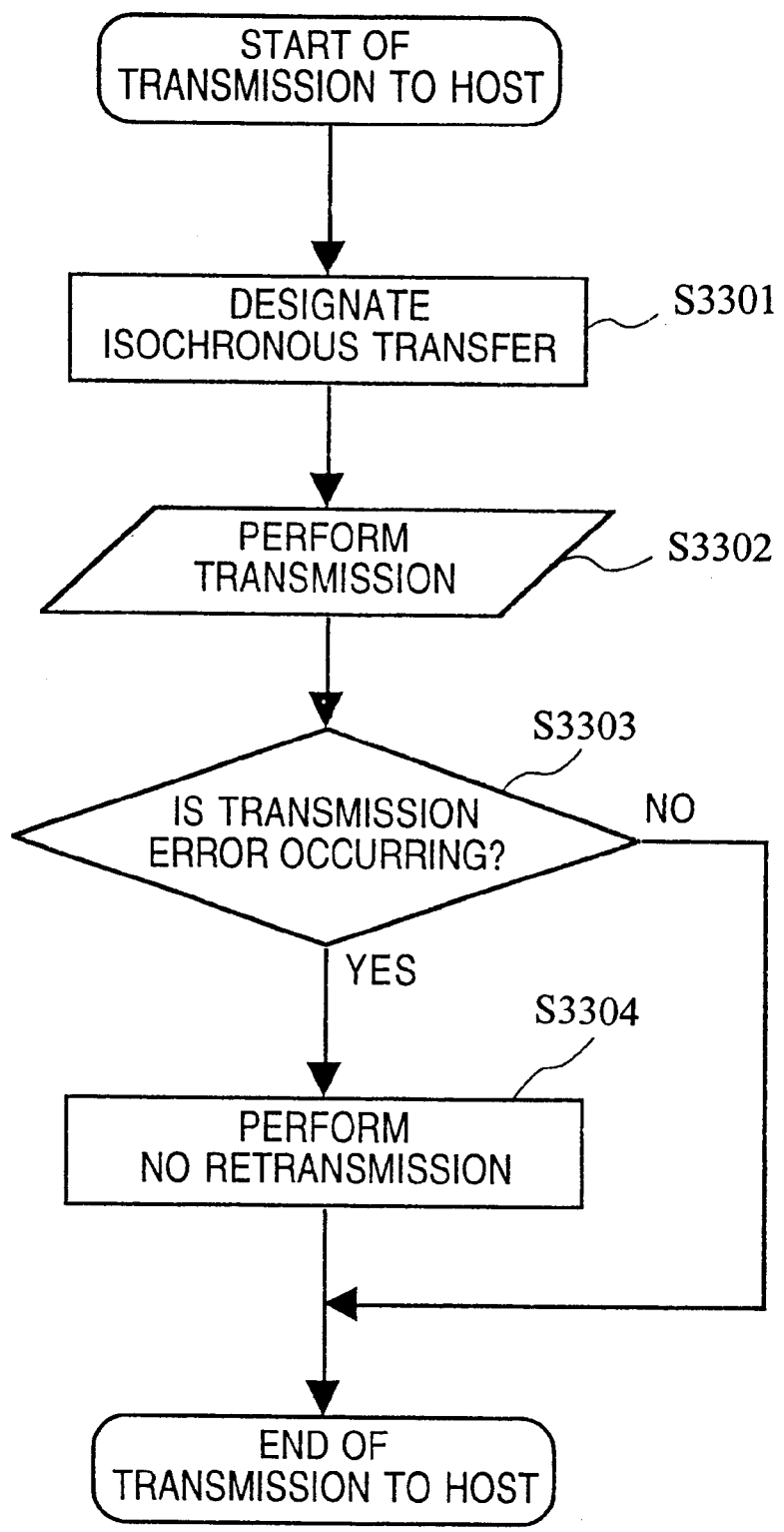
FIG. 10 is a flow chart showing details of the procedure of transmission processing in the first embodiment.

When the data is completely transmitted, processing advances to step S908 to end transmission. FIG. 10 is a flow chart showing details of the procedure of transmission processing (step S907) in the first embodiment.

In step S3301, isochronous transfer is designated as a transfer mode for transmitting prescanned image data. In constituting the device, the end point of isochronous transfer is created, and a bandwidth is assigned.

In step S3302, the image data is transmitted to the host by isochronous transfer.

Even when an error occurs during data transfer to the host, transmission processing is ended without retransmission, i.e., correction of the communication error. Since isochronous transfer performs no retransmission in case of an error, some data maybe omitted. However, transfer can be ended within a predetermined time because a predetermined bandwidth is guaranteed in a periodically continuous time (frame) Therefore, the prescanned image data can be transmitted in a short time.

An error rarely occurs, and in many cases, transfer without any error can be performed. Even when an error occurs, the image data can be retransmitted without any mechanical reading, as described later, so most prescanned image data can be transferred at a high speed.

FIG. 11 is a flow chart showing the procedure of storage processing (step S706) in the first embodiment.

In step S3001, it is selected whether the prescanned image data is to be stored in the memory (RAM 104). If YES in step S3001, the flow advances to step S3002. If NO in step S3001, storage processing is ended.

In step S3002, it is selected whether the prescanned image data is to be compressed. If YES in step S3002, the flow advances to step S3003 to perform compression processing. If NO in step S3002, the flow advances to step S3004.

In step S3004, the prescanned image data (or compressed data if step S3003 is performed) is stored in the memory (RAM 104).

With this processing, the limited memory can be effectively utilized. In addition, when a retransmission request is received from the host side, the image data can be transmitted without reading the image again.

FIG. 12 is a flow chart showing the procedure of correction processing (step S707) in the first embodiment.

In step S1201, it is selected whether correction data for scanning is to be generated. If YES in step S1201, the flow advances to step S1202. If NO in step S1201, correction data generation processing is ended.

In step S1202, it is selected whether the size and position of the original is to be detected. If YES in step S1202, the flow advances to step S1203 to detect the size and position of the original. In step S1204, data for correcting the scanning position is generated on the basis of the size/position detection data detected in step S1203. If NO in step S1202, the flow skips steps S1203 and S1204 and advances to step S1205.

In step S1205, it is selected whether the dynamic range of the input signal is to be detected. If YES in step S1205, the flow advances to step S1206. If NO in step S1205, the flow advances to step S1208.

In step S1206, the dynamic range, i.e., the maximum and minimum values of the input signal are detected. In step S1207, input level correction data is generated on the basis of the dynamic range detection data detected in step S1206.

In step S1208, color information, e.g., information of the background color level or RGB color balance, is detected. If YES in step S1208, the flow advances to step S1209. If NO in step S1208, the flow advances to step S1211.

In step S1209, the color information is detected. In step S1210, color correction data is generated on the basis of the color information detected in step S1209.

In step S1211, it is selected whether the attribute of an object in the original, e.g., text data, graphic data, or image data is to be determined. If YES in step S1211, the flow advances to step S1212 to determine the objects in the original in units of blocks. If No in step S1211, correction data generation processing is ended.

In this flowchart, four condition detection operations are sequentially performed. However, since this embodiment assumes a hardware arrangement, the detection processing can be simultaneously performed.

Figure 13:
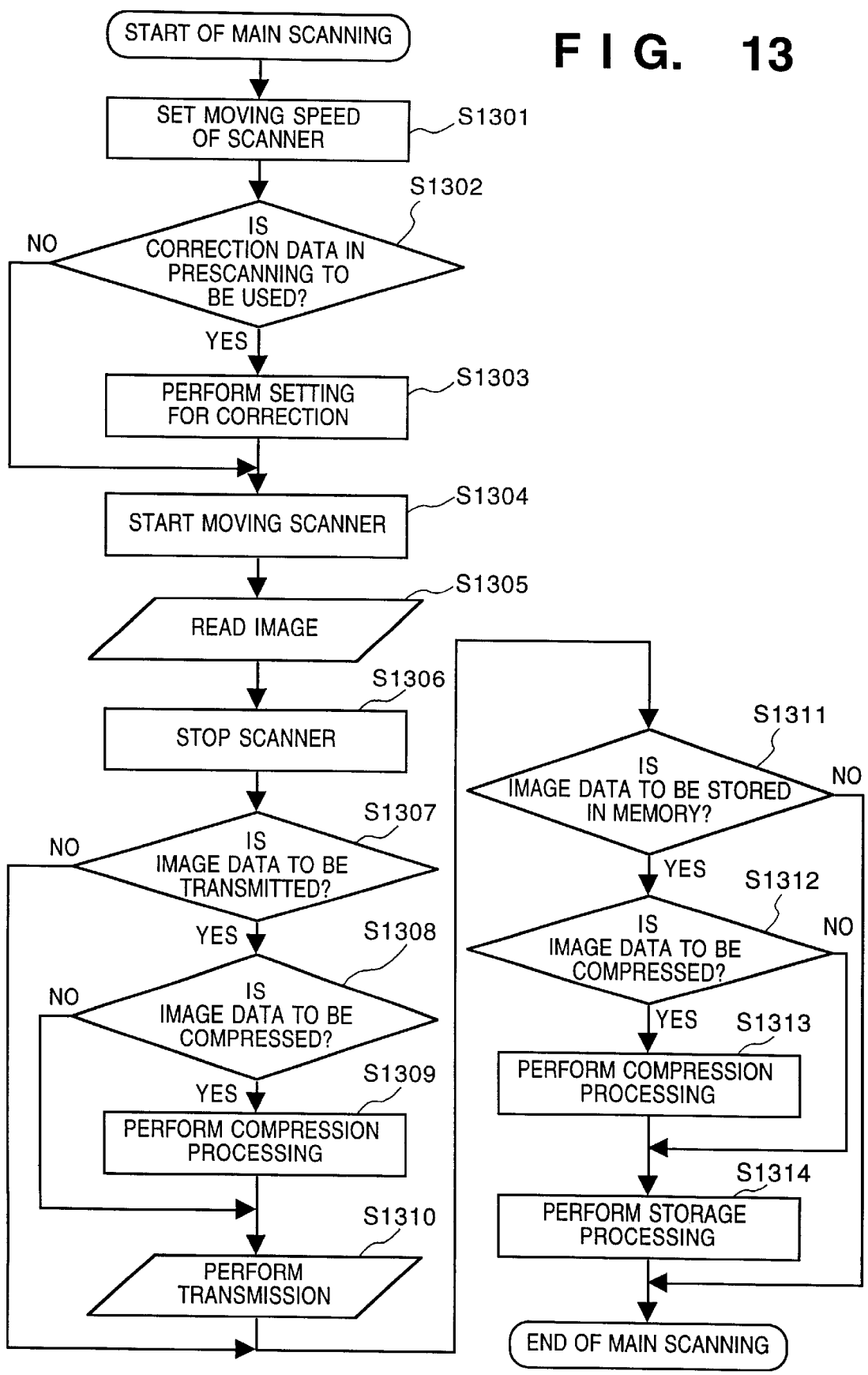
FIG. 13 is a flow chart showing the control procedure of scanning in the first embodiment.

FIG. 13 is a flow chart showing the control procedure of scanning (step S704) in the first embodiment.

In step S1301, the scanner moving speed (resolution in the subscanning direction) is set on the basis of user setting.

In step S1302, it is selected whether the correction data generated in prescanning is to be used. If YES in step S1302, the flow advances to step S1303. If NO in step S1302, the flow advances to step S1304.

In step S1303, setting for scanning is performed on the basis of the correction data generated in prescanning.

In step S1304, the scanner starts moving. In step S1305, image data from the scanner is fetched. In step S1306, when scanning of the edge of the original or the trimming designated region is complete, the scanner is stopped.

In step S1307, it is selected whether the scanned image data is to be transmitted. In this case, the transmission procedure is performed after the scanner is stopped. Actually, the image data is fetched and transmitted to the host in units of lines. If YES in step S1307, the flow advances to step S1308. If NO in step S1307, the flow advances to step S1311.

In step S1308, it is selected whether the image data is to be compressed before transmission. If YES in step S1308, the flow advances to step S1309. If NO in step S1308, the flow advances to step S1310.

In step S1309, the image data is compressed. The compression processing can be performed simultaneously with read and transmission processing.

In step S1310, the image data is transmitted to the host computer. In this case, when an error occurs, retransmission is performed. As the transfer mode of the USB, bulk transfer is used. In bulk transfer, the bandwidth is not guaranteed in a periodically continuous time (frame), so transfer takes a long time. However, when an error occurs during transfer, retransmission is performed, so the data can be properly transferred. That is, although the transfer time is not corrected, the communication error is corrected.

In step S1311, the image data is to be stored in the memory after or simultaneously with transmission. If YES in step S1311, the flow advances to step S1312. If NO in step S1311, scanning processing is ended.

In step S1312, it is selected whether the image data is to be compressed and stored in the memory. If YES in step S1312, the flow advances to step S1313. If NO in step S1312, the flow advances to step S1314.

In step S1313, compression processing is performed. Compression processing in transmission and that in storage in the memory can be simultaneously or separately performed. In step S1314, the image data is stored in the memory.

With the above arrangement, the original purposes of prescanning, i.e., conformation of an image to be read and designation of a scanning region (designation of a trimming range) are satisfied, and the time required for transmission of prescanned image data can be shortened.

<Second Embodiment>

The second embodiment has the same arrangement, including the arrangement of the main body, as that of the first embodiment except the control procedure, and a detailed description of the same parts will be omitted.

In the second embodiment, when a prescanning instruction is to be output on the host computer side, the program for setting prescanning is executed, and the result is transferred to the device to make an instruction, as will be apparent from the following description.

Figure 14:
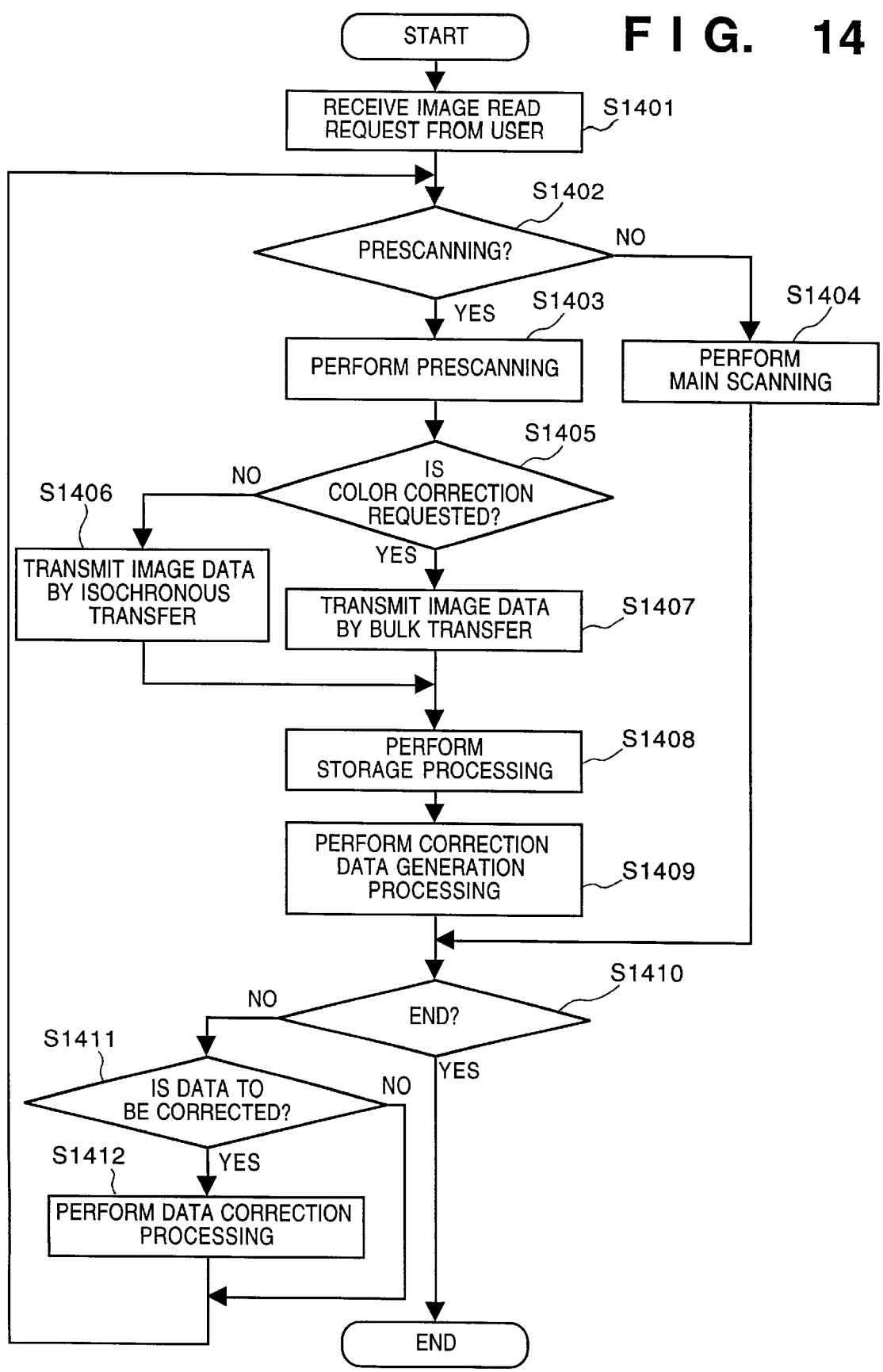
FIG. 14 is a flow chart showing the entire control procedure in the second embodiment.

FIG. 14 is a flow chart showing the entire control procedure in the second embodiment.

In step S1401, an image read request from the user is received. This request is output from the host computer operated by the user. Simultaneously, read setting selected by the setting means such as a keyboard on the host side is transmitted.

In step S1402, it is selected whether the image is to be read by prescanning or scanning. If prescanning is to be performed, the flow advances to step S1403. If scanning is to be performed, the flow advances to step S1404 (as in the first embodiment).

In prescanning processing in step S1403, the same processing as in the first embodiment (FIG. 8) is performed.

In step S1405, it is selected whether color correction is requested as a purpose of prescanning. If NO in step S1405, the flow advances to step S1406. If YES in step S1405 (if the purpose is the same as in the first embodiment), the flow advances to step S1407.

If color correction is not requested as the purpose of prescanning (if the purpose is the same as in the first embodiment), the data is transmitted to the host by isochronous transfer in step S1406.

If color correction is requested as the purpose of prescanning, the data is transmitted to the host by bulk transfer in step S1407 (details will be described with reference to FIG. 15).

In step S1408, the read image data is stored in the memory in the scanner (this processing is the same as that in the first embodiment shown in FIG. 11).

In step S1409, correction data to be used in scanning is generated (this processing is the same as that in the first embodiment shown in FIG. 12).

In step S1410, it is elected whether scanning is to be ended. If YES in step S1410, processing is ended. If NO in step S1410 (if another image read request is received), the flow advances to step S1411.

In step S1411, it is selected whether data correction is to be performed. If the correction data generated in prescanning is present, and correction is to be performed, the flow advances to step S1412. If NO in step S1411, the flow returns to step S1402.

In step S1412, the data is corrected. After this, the operation stands by for prescanning or scanning.

Figure 15:
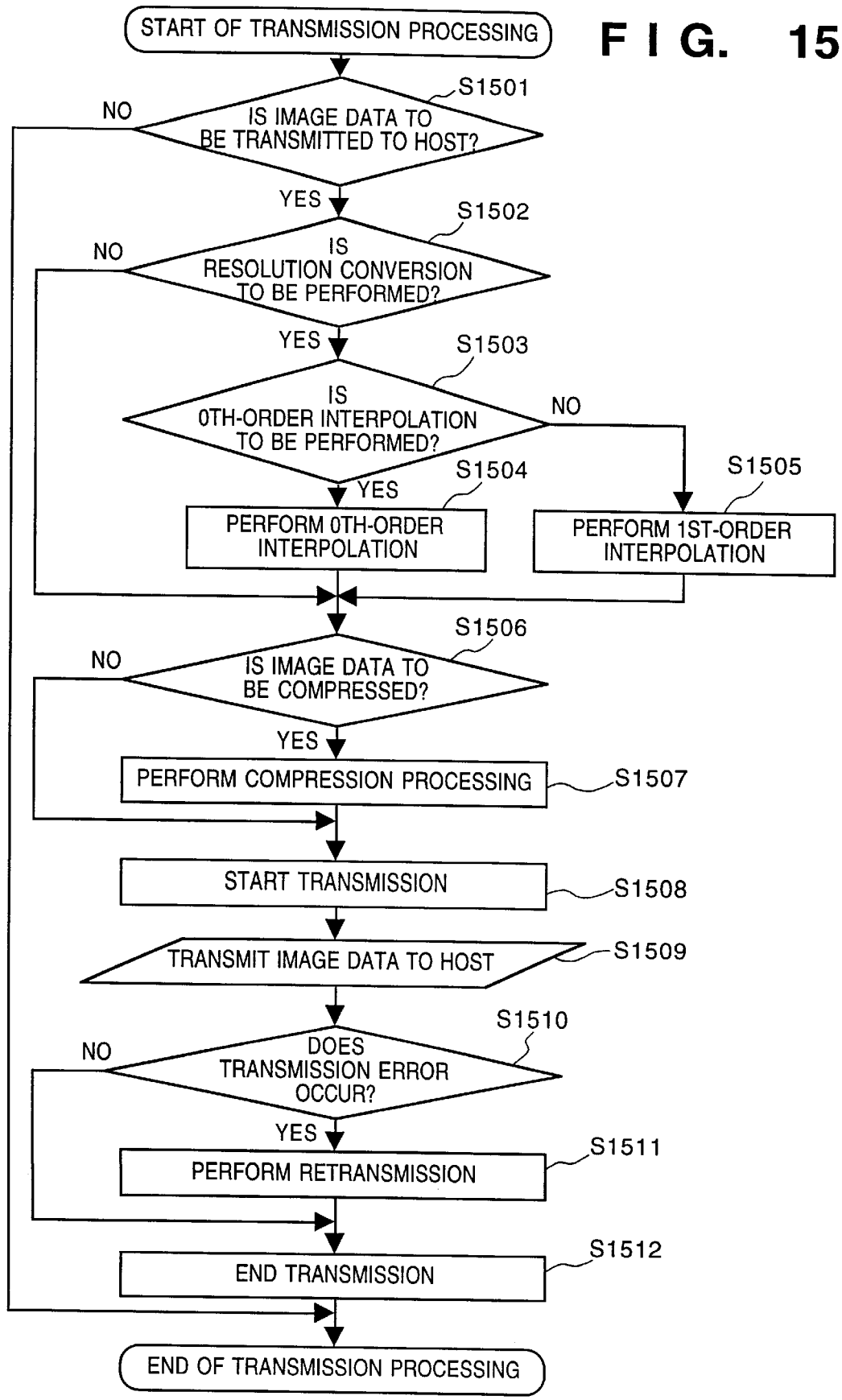
FIG. 15 is a flow chart showing the procedure of transmission processing in bulk transfer of the second embodiment.

FIG. 15 is a flow chart showing the procedure of transmission processing by bulk transfer in the second embodiment.

In step S1501, it is selected whether the data is to be transmitted to the host. If YES in step S1502, the flow advances to step S1502. If NO in step S1501 (if data is not to be transmitted), the procedure of transmission processing is ended.

In step S1502, it is selected whether the resolution is to be converted. If YES in step S1502, the flow advances to step S1503. If NO in step S1502, the flow advances to step S1506.

In step S1503, it is selected whether 0th-order interpolation (simple thinning) processing is to be performed as resolution conversion. If YES in step S1503, the flow advances to step S1504 to perform processing. If NO in step S1503 (if another resolution conversion processing such as 1st-order interpolation processing is to be performed), the flow advances to step S1505 to perform processing.

In step S1506, it is selected whether the transmission image data is to be compressed. If YES in step S1506, the flow advances to step S1507. If NO in step S1506, the flow advances to step S1508.

In step S1508, transmission to the host starts. In step S1509, the image data is transmitted to the host. In this case, the bulk transfer mode of the USB is used.

In step S1510, it is detected whether a transmission error occurs. If YES in step S1510, the flow advances to step S1511. If NO in step S1510 (if transfer is successfully complete), the flow advances to step S1512 to end transmission processing.

If an error occurs, transmission is performed again by retransmission in step S1511, and then, transmission is ended in step S1512.

In the above procedure, even when an error occurs, reliable data transmission is guaranteed by retransmission. Therefore, data such as color information for which no data omission is permitted can be transferred.

Figure 16:
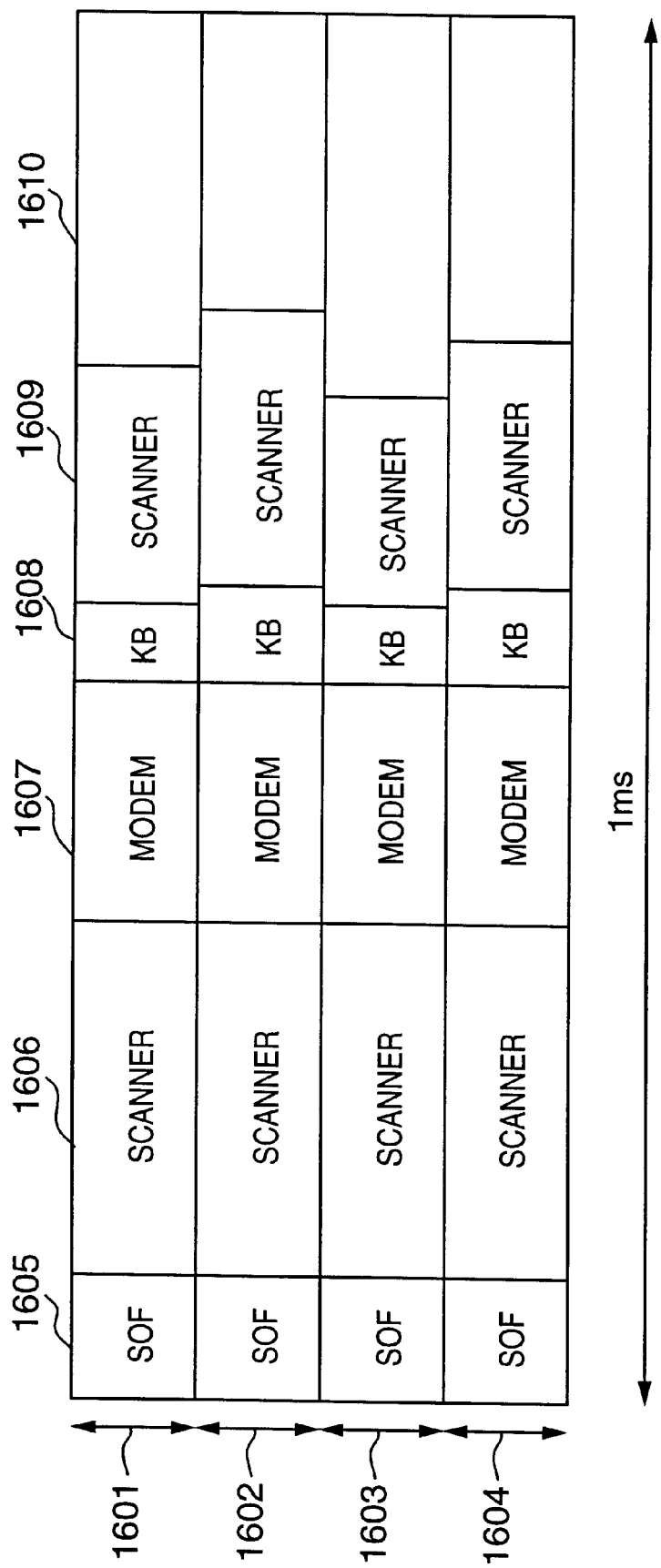
FIG. 16 is a view showing an example of USB bandwidths in transmitting prescanned data by isochronous and bulk transfer in the second embodiment.
Figure 17:
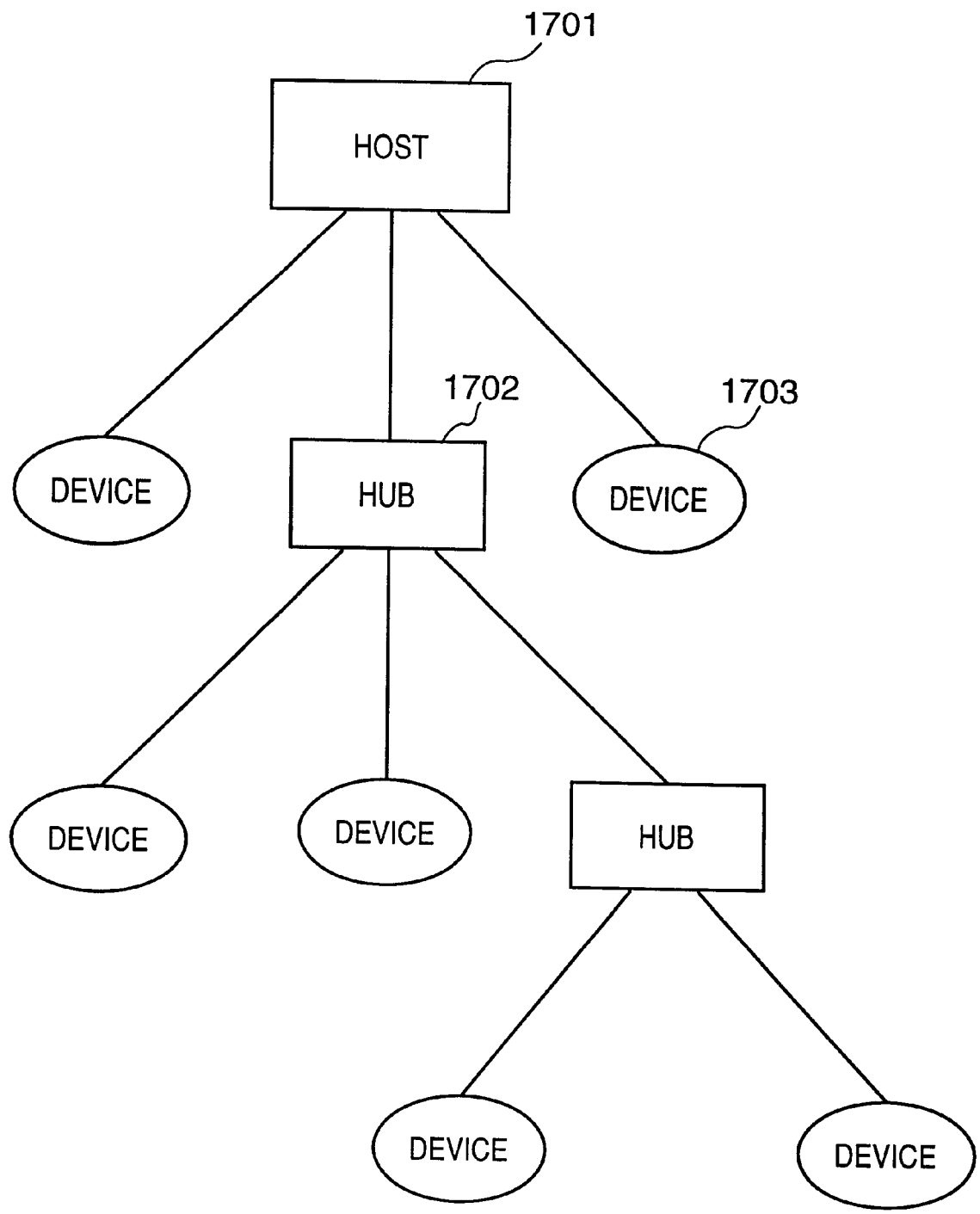
FIG. 17 is a view showing a general example of USB connection.
Figure 20A:
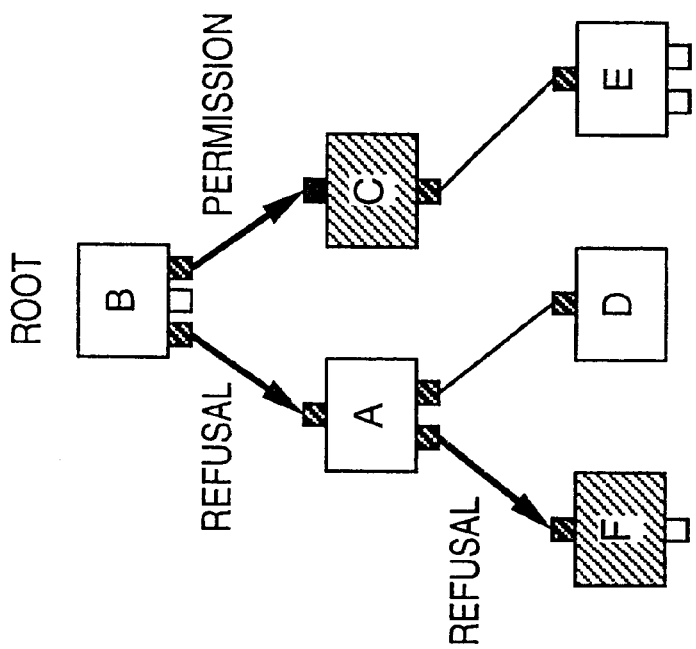
FIG. 20 is a view showing the arbitration operation.
Figure 20B:
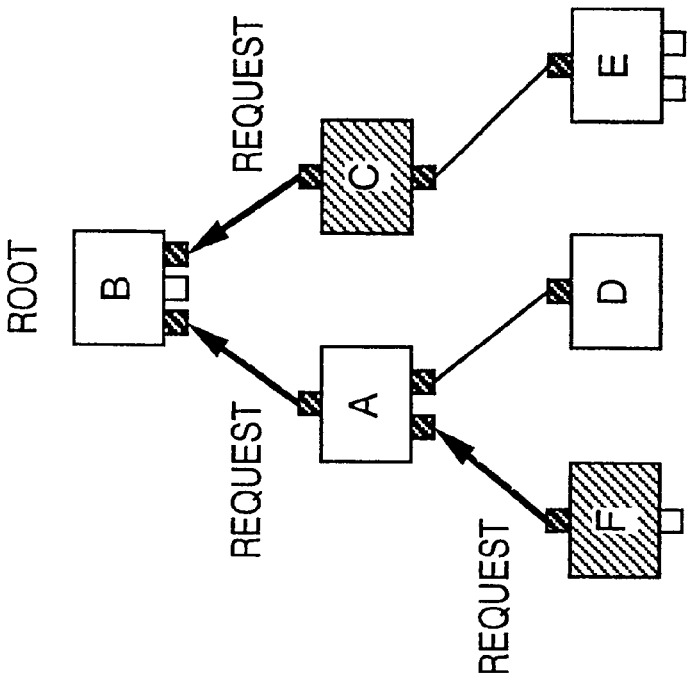
Figure 21:
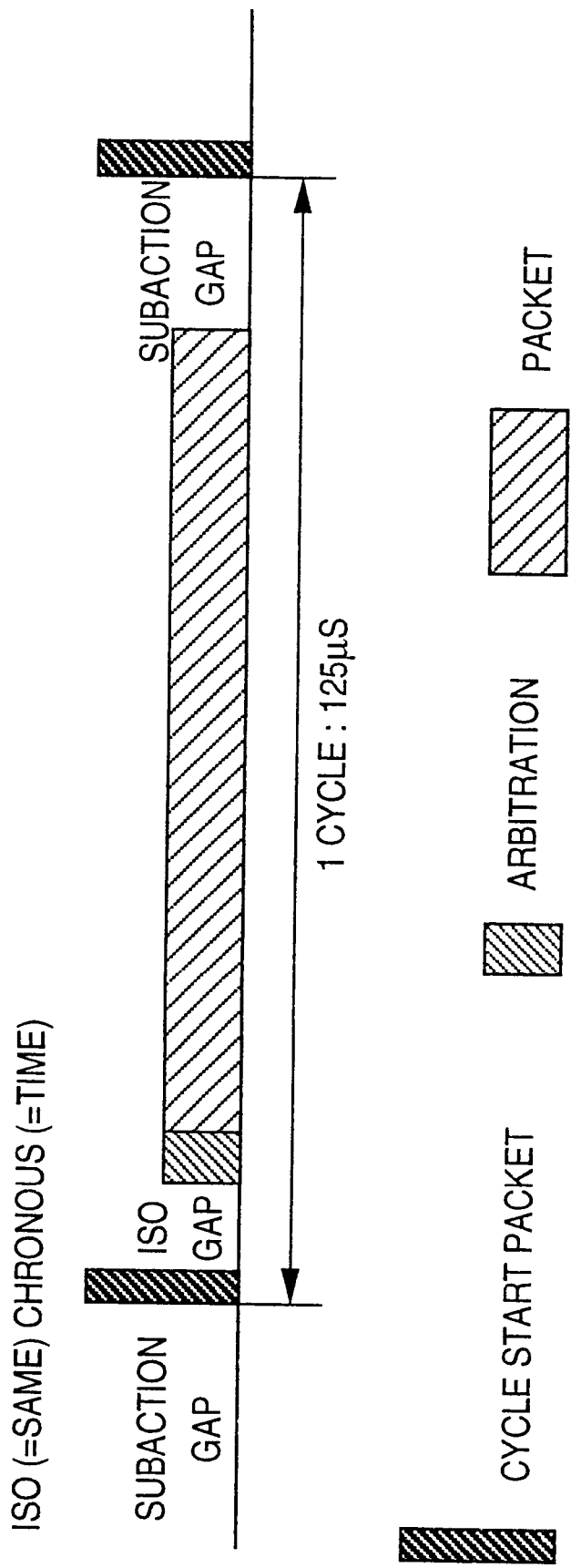
FIG. 21 is a view showing the time transition state in isochronous transfer.
Figure 22:
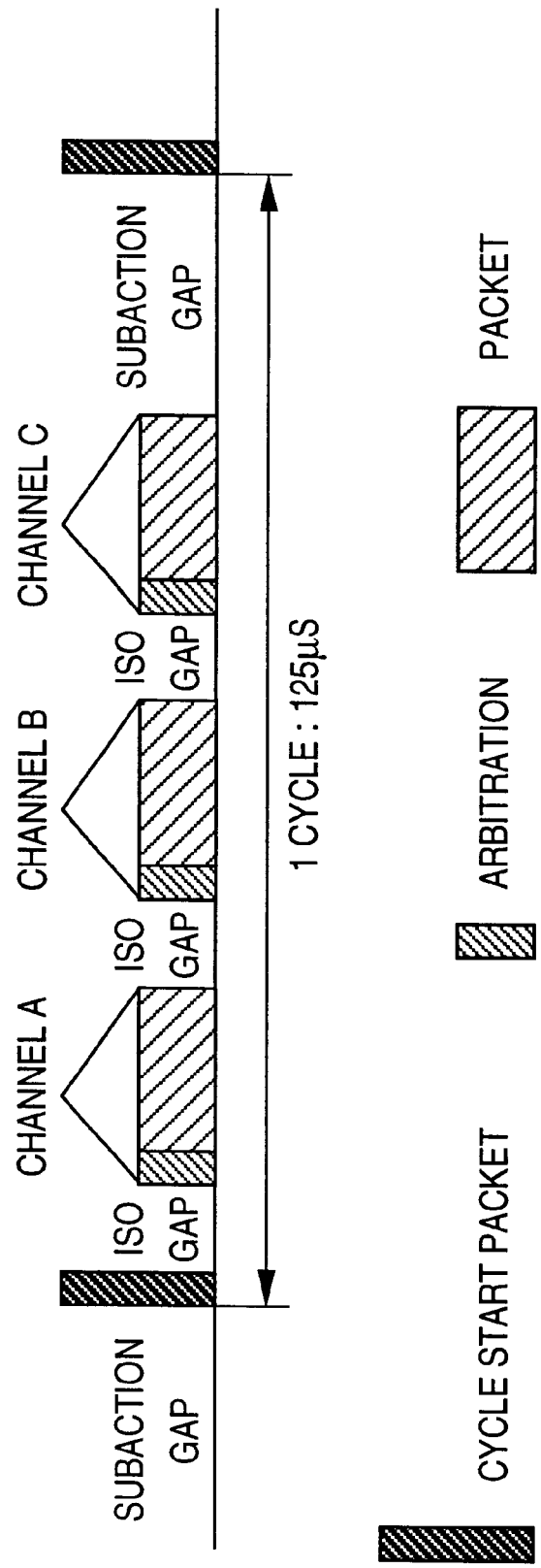
FIG. 22 is a view showing the time transition state in packet transfer in isochronous transfer.
Figure 23:
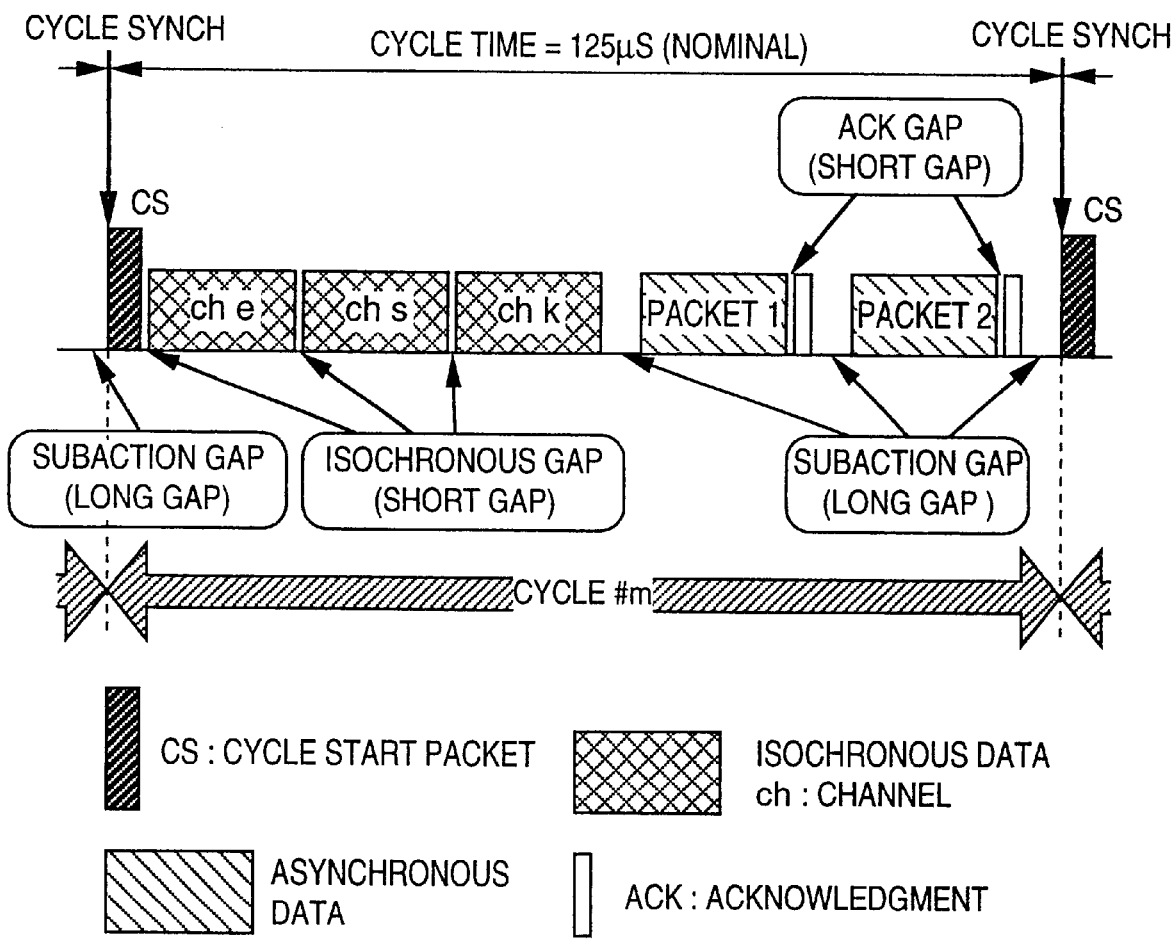
FIG. 23 is a view showing the time transition state in one cycle of isochronous transfer.

FIG. 16 shows an example of USB bandwidths in transmitting prescanned data by isochronous and bulk transfer in the second embodiment.

Reference numerals 1601 to 1604 denote frames to be repeatedly generated; 1605, an SOF (Start Of Frame) packet indicating the start of a frame; and 1606 and 1607, bandwidths for isochronous transfer. The data transmitted using the bandwidth 1606 is prescanned image data having no color information (i.e., allowing data omission to some extent). Reference numeral 1608 denotes a bandwidth for interrupt transfer. In this case, a keyboard is exemplified. Reference numeral 1609 denotes a bandwidth for bulk transfer. The data transmitted using the bandwidth 1609 is prescanned image data having color information. In this bandwidth, error retransmission is performed. Reference numeral 1610 denotes an unused bandwidth.

In this example, two prescanned image data (image data for isochronous transfer, which has no color information, and image data for bulk transfer, which has color information) are simultaneously transmitted using different bandwidths. However, only one of them can also be transmitted. Alternatively, the data may be stored in the memory and transmitted in response to a request from the user, as needed.

In the first and second embodiments, image processing such as compression, correction parameter extraction, and correction data generation are simultaneously performed in a dedicated hardware arrangement. However, processing can also be sequentially performed by the CPU for controlling the main body.

In the first and second embodiments, the USB interface is used as a communication means to the host.

However, these embodiments can be practiced with any communication interface such as an IEEE 1394 as far as it supports a mode without error retransmission (isochronous mode). In the IEEE 1394, bulk transfer of the USB corresponds to isochronous transfer.

As described above, according to the first and second embodiments, in an image reading apparatus having a scanner for scanning an original and converting it into color image data, a communication means for transmitting the data to the host through a predetermined network or a communication interface, a data transfer mode (isochronous transfer) in which the communication means guarantees a predetermined bandwidth in a periodically continuous time and does not perform retransmission when an error occurs, and a mode which guarantees not a bandwidth but reliable data transfer by error retransmission, prescanned image data is transmitted to the host side by isochronous transfer. With this arrangement, the original purposes of prescanning, i.e., conformation of an image to be read and designation of a scanning region (designation of a trimming range) are satisfied, and the time required for transmission of prescanned image data is shortened.

Especially, according to the second embodiment, in an image reading apparatus having a scanner for scanning an original and converting it into color image data, a communication means for transmitting the data to the host through a predetermined network or a communication interface, a data transfer mode (isochronous transfer) in which the communication means guarantees a predetermined bandwidth in a periodically continuous time and does not perform retransmission when an error occurs, and a mode which guarantees not a bandwidth but reliable data transfer by error retransmission, when the prescanned image data is to be transferred to the host, the isochronous transfer mode and the transfer mode for guaranteeing transfer without data omission by retransmission are switched in accordance with the purpose of the user. With this arrangement, even when image data (e.g., color information of an original) for which no data omission is permitted is requested for prescanning in the first invention, prescanned image data transmission suitable for both the purposes of shortening the transmission time and preventing omission of bits can be realized.

As described above, according to the first and second embodiments, the data transmission time can be shortened for the original purpose of prescanning.

In addition, when the transfer mode for guaranteeing reliable data transfer in prescanning is used, image data such as color information for which no data omission is permitted can be transferred.

<Third Embodiment>

In the first and second embodiments, prescanned image data is transmitted by isochronous transfer without retransmission. Therefore, if an error occurs, image data omission occurs.

An example will be described with reference to FIGS. 43A to 43D.

Figure 43A:
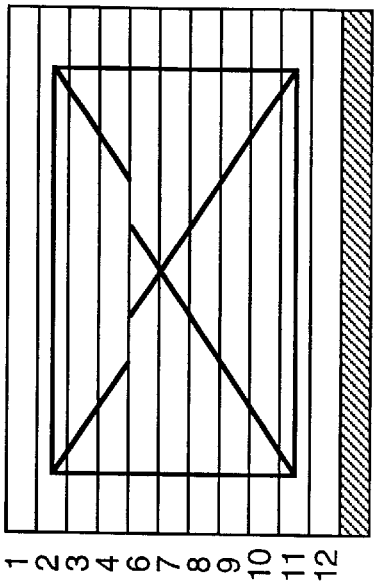
FIGS. 43A to 43D are views showing disadvantages in the display in image data omission due to an error.
Figure 43B:
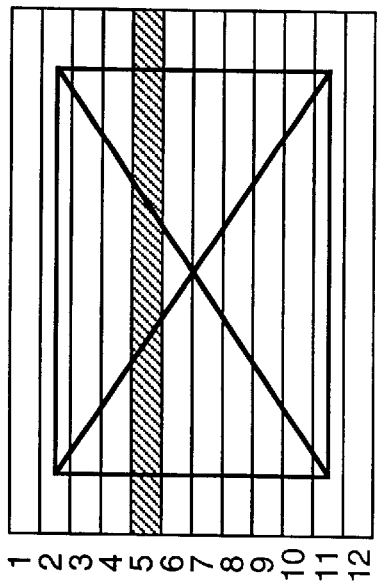
Figure 43C:
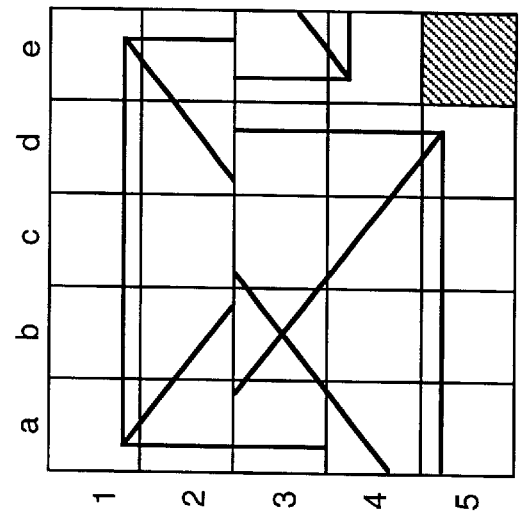

FIGS. 43A and 43C are schematic views of image data read by prescanning. These image data are segmented in accordance with the size of a transmission packet and transferred to the reception side. In FIG. 43A, the image data is segmented into bands in the subscanning direction. In FIG. 43C, the image data is segmented into blocks in the main scanning and subscanning directions. In FIG. 43A, numbers 1 to 12 are added to identify the segmented bands. In FIG. 43C, numbers and letters are added to identify the blocks.

Halftone-dotted band 5 or block 3b is a packet which has not been received due to an error occurring during isochronous transfer. If recovery such as retransmission is not performed, the prescanned image data is displayed on the reception side as in FIG. 43B or 43D.

Figure 43D:
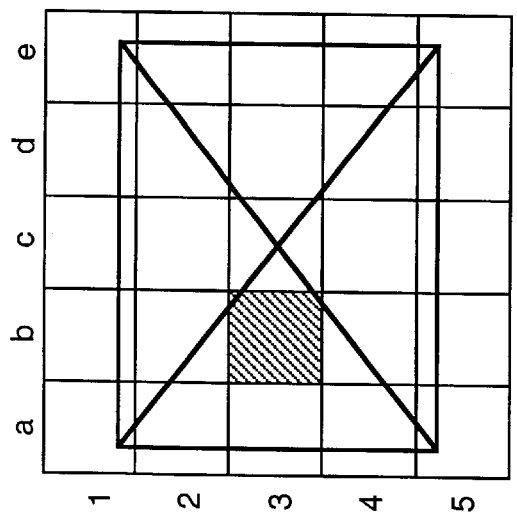

In both cases, an image with a shift is displayed because of omission of the band or block. In FIG. 43B, band 6 is displayed at the position of band 5, and the subsequent bands shift one by one. In addition, the total number of packets to be received decreases by one. In FIG. 43D, block 3c is displayed at the position of block 3b, and the subsequent blocks shift one by one. In this case as well, the total number of packets to be received decreases by one. As described above, packet omission makes it difficult to grasp the image position information, though it is one of the original purposes of prescanning.

To solve this problem, a transfer mode which guarantees reliable data transfer when a data error occurs or a packet cannot be received is employed to retransmit the omitted image data. Alternatively, the image data is retransmitted by isochronous transfer again. However, if the omitted image data cannot be specified, transmission must be performed from the beginning, resulting in a long time.

Even when the omitted packet can be specified, retransmission processing requires a certain time. If isochronous transfer is used for retransmission, and an error occurs again, retransmission must be performed again. When asynchronous transfer with lower priority in the bandwidth use as compared to isochronous transfer is used to perform reliable retransmission, a longer time is required.

The third embodiment is to provide an image processing system, an information processing apparatus, a control method, and a storage medium which allow high-speed transfer when contents of an image from an image scanner or an image data generation source are to be confirmed, and eliminate the influence on the layout of the entire image even when an error occurs during transfer.

As the second object, the third embodiment is to provide an image processing system, an information processing apparatus, a control method, and a storage medium which allow high-speed transfer of an image read by an image scanner or image data from an image data generation source, and even when an error occurs during transfer, transfer only the error data in a transfer mode with retransmission, thereby guaranteeing both high-speed transfer and image quality.

In the third embodiment, an IEEE 1394 is used as a communication interface.

Figure 29:
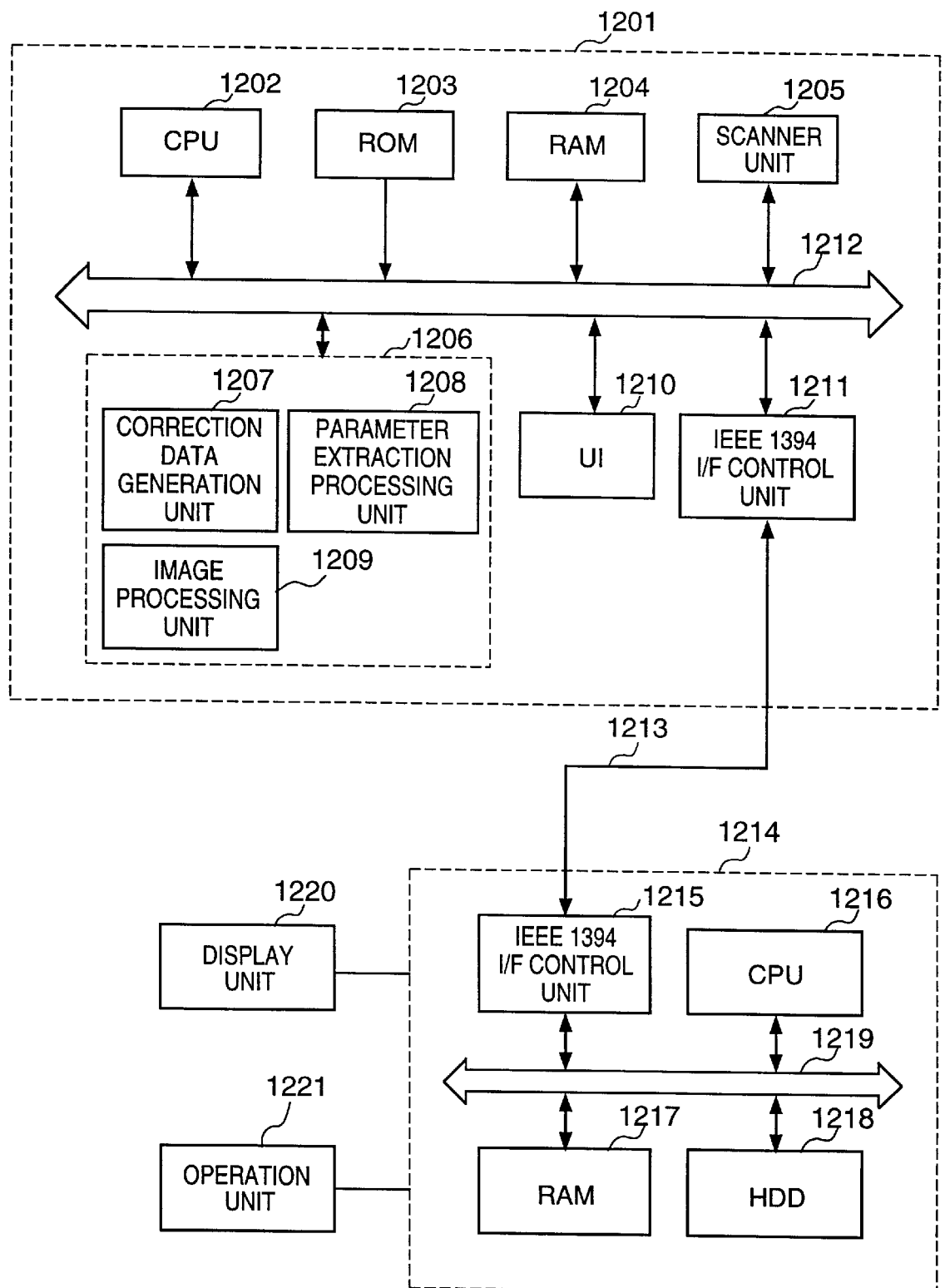
FIG. 29 is a block diagram of an image reading system of the third embodiment.

FIG. 29 is a block diagram showing the arrangement of an image reading system in the third embodiment.

Referring to FIG. 29, reference numeral 1201 denotes an image reading apparatus main body. The image reading apparatus is constituted by blocks 1202 to 1212 to be described below and mainly has a scanner function of reading an original, an image processing function, and a communication function of transmitting image data.

The CPU 1202 controls the entire image reading apparatus 1201 and executes a program for realizing the functions of a transaction layer, a node controller, and an application layer of the IEEE 1394 interface. The ROM 1203 stores the program to be executed by the CPU 1202 and various control information. As the ROM 1203, a flash memory or the like can be used to update the control information later.

The RAM 1204 stores data or a program to be used by the CPU 1202, various image data read by the scanner unit 1205, and generated correction data.

The scanner unit 1205 reads an original and is constituted by a light source used in reading an original, a CCD sensor, an A/D converter, an image signal correction circuit, and the like. Details have been described with reference to FIG. 2.

The ASIC 1206 performs mechanical control (not shown) and various image processing in the image reading apparatus. The ASIC 1206 is a dedicated hardware logic for controlling the scanner head in reading an image, correcting the read image data, and performing various image processing such as compression/coding and parameter extraction.

The correction data generation unit 1207 is incorporated in the ASIC 1206. Details including processing contents will be described later with reference to FIG. 38. The block 1208 in the ASIC 1206 performs parameter extraction processing to generate correction data. The image processing unit 1209 in the ASIC 1206 performs various image processing.

The user interface 1210 notifies the status of the image reading apparatus 1201 main body or a status in communication or receives a command input from the user. The user interface 1210 is constituted by a display unit for notification and an operation unit for receiving the input.

The IEEE 1394 device control unit 1211 controls communication of the IEEE 1394 and is constituted by a dedicated LSI having the functions of a PHY (physical) layer and a LINK layer. Details will be described with reference to FIG. 30.

Reference numeral 1212 denotes a system bus. Constituent elements except the blocks 1202 to 1211 of the image reading apparatus 1201 shown in FIG. 29 are also connected on this bus, so high-speed data transfer can be performed between the blocks. Reference numeral 1213 denotes a cable of the IEEE 1394 interface. Contained within this cable are two sets of twisted pair cables (one of the two cables is a signal line A, and the other is a signal line B) and a set of power supply pair cables, i.e., a total of six cables.

Reference numeral 1214 denotes a host computer (e.g., a workstation or a personal computer). In this system configuration, the host computer 1214 outputs a read request to the image reading apparatus (scanner device) 1201 and receives image data transferred from the image reading apparatus (scanner device) 1201. An IEEE 1394 device control unit 1215 for controlling communication of the IEEE 1394 has the same functions as those of the above-described IEEE 1394 device control unit 1211. A CPU 1216 controls the host computer main body 1214 and executes an application program as one of constituent elements of the reading system of the scanner.

On the host computer 1214, a program (driver) for realizing the functions of the transaction layer, the node controller, and the application layer of the IEEE 1394 interface is also executed.

A RAM 1217 temporarily stores data or a program to be used by the CPU 1216 and various image data transmitted from the scanner device 1201 or loads not only an application program but also an OS. A hard disk drive 1218 stores the OS and application program to be executed by the CPU 1216, the above-described driver program, control information, and various image data. Reference numeral 1219 denotes a system bus on which other devices (not shown) are also connected.

A display unit 1220 is constituted by a CRT or an LCD connected to the host computer 1214. The display unit 1220 displays transmitted image data or setting in reading.

An operation unit 1221 is constituted by a pointing device such as a keyboard or a mouse connected to the host computer 1214. An operation on the application program such as various read setting is performed by the operation unit 1221.

In the above system configuration, image reading requested from the host computer 1214 is executed by the image reading apparatus 1201 connected through the IEEE 1394 interface, and the read image data is sent to the host computer 1214 through the same interface, thereby obtaining a desired image.

Figure 30:
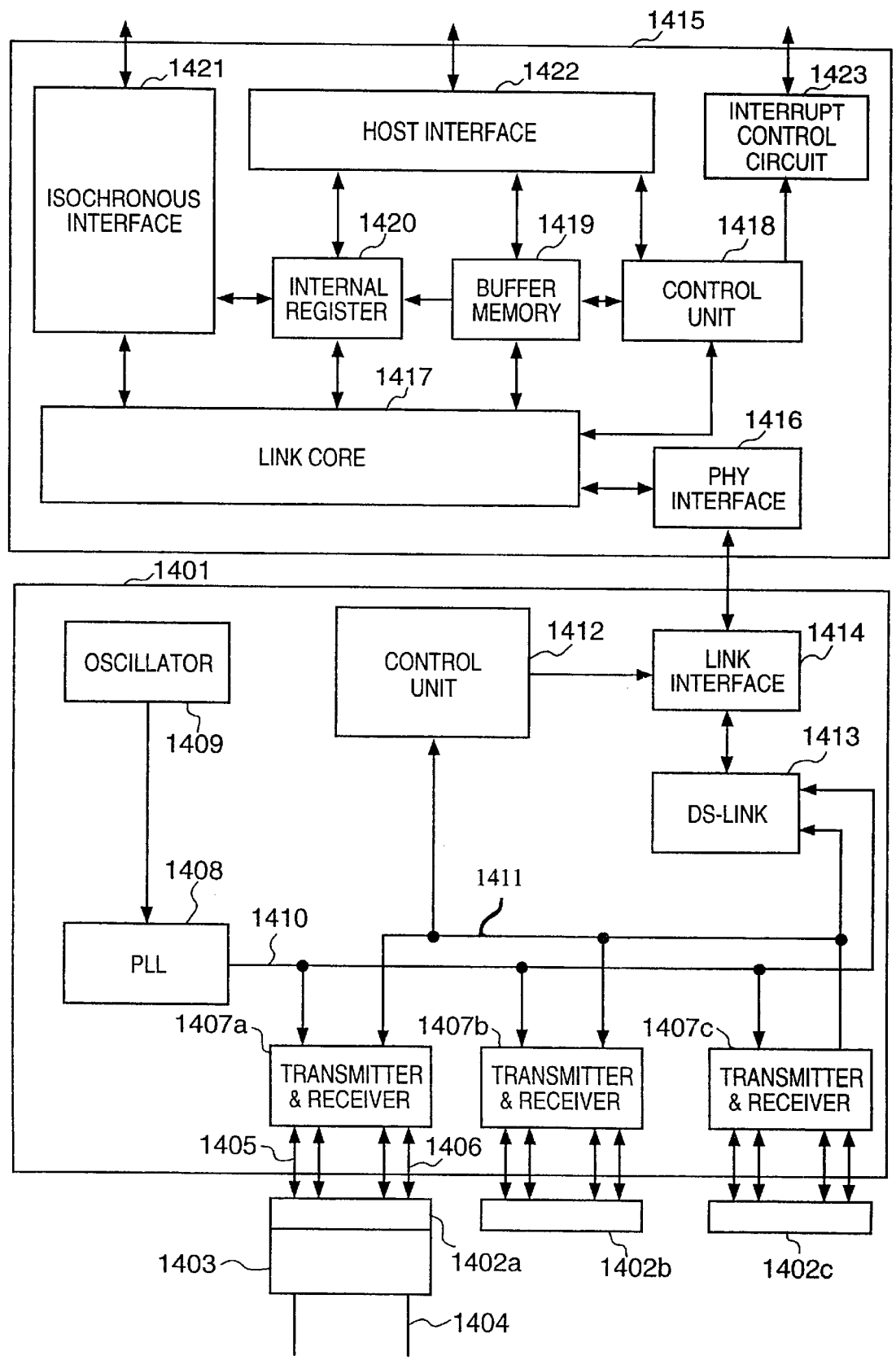
FIG. 30 is a block diagram of an IEEE 1394 interface control unit in the third embodiment.

FIG. 30 is a block diagram showing the arrangement of the IEEE 1394 interface control unit in the third embodiment.

In FIG. 30, reference numeral 1401 denotes a hardware logic of a physical layer which constitutes the IEEE 1394 device control unit 1211 shown in FIG. 29 together with a link layer. The PHY LSI 1401 of the physical layer is constituted by blocks 1407, 1408, and 1412 to 1414 to be described below. Each of receptacles 1402a, 1402b, and 1402c serves as a device-main-body-side input terminal (port) of the IEEE 1394 interface. Cables are inserted into these ports to connect various devices. In this embodiment, the device has three ports. Reference numeral 1403 denotes a plug of the IEEE 1394 interface cable. This portion is inserted into the port of a device. Reference numeral 1404 denotes an IEEE 1394 interface cable. Contained within this cable are two sets of twisted pair cables (one of the two cables is a signal line A, and the other is a signal line B) and a set of power supply pair cables, i.e., a total of six cables. Reference numeral 1405 denotes a TpA signal from a TpA receiver. The IEEE 1394 device has two transceivers TpA and TpB for each cable.

The TpA transmits an arbitration bit and a packet (strobe signal) and receives an arbitration signal and a packet (data signal).

Reference numeral 1406 denotes a TpB signal from the TpB receiver. The TpB transmits an arbitration bit and a packet (data signal) and receives an arbitration signal and a packet (strobe signal).

Each of transmitters/receivers 1407a, 1407b, and 1407c is constituted by a driver for driving a differential signal, a low-offset broadband receiver, and a conversion unit for converting an analog signal into a digital signal. The transmitter/receiver receives a signal transmitted through the IEEE 1394 cable or converts data to be transmitted from the device into a signal to be output to the cable.

The PLL 1408 generates a clock having the operation frequency of the IEEE 1394 interface from the output from a crystal oscillator 1409. Reference numeral 1409 denotes a crystal oscillator. The operation clock of the IEEE 1394 interface is supplied through a line 1410. Reference numeral 1411 denotes a digital signal converted by the transmitter/receiver 1407. Various signals to be used to construct a bus or a data signal to be transmitted/received correspond to the digital signal 1411.

The control unit 1412 performs control of the interface to the LSI for realizing the link layer or various control operations in initializing the bus, detecting a loop, and reconstructing the bus. The codec 1413 uses a DS-Link scheme defined by the IEEE 1394 interface specifications. The interface 1414 interfaces to the LSI for realizing the link layer function and is constituted by various registers. Received data or data to be transmitted to another device is sent through this interface.

Reference numeral 1415 denotes a hardware logic of the link layer which constitutes the IEEE 1394 device control unit 1211 shown in FIG. 29 together with the physical layer.

The LSI 1415 of the link layer is constituted by blocks 1416 to 1423 to be described below.

The interface 1416 interfaces to the LSI for realizing the PHY layer function. The link core 1417 has the main functions of the link layer. The link core 1417 has the function of a transmitter for converting transmission data in isochronous or asynchronous transfer mode into a packet format and the function of a receiver for generating a recycle timer which is necessary when the device has the function of an isochronous resource manager or an upper function, generating a CRC for a transmission packet, checking the CRC in a reception packet, or confirming a packet received from the PHY layer.

The control unit 1418 controls the interface to the LSI for realizing the physical layer function or controls various incorporated functional blocks. The transmission/reception buffer 1419 is exclusively used for asynchronous transfer. This buffer 1419 is a temporary buffer for absorbing the data transfer rate for each of the above-described transmitter and the host bus. The various registers 1420 externally control the link LSI 1415. The interface 1421 is exclusively used for isochronous transfer and performs handling with an external system through a dedicated bus. The host interface 1422 is constituted by various registers and serves as a connection point to a layer (e.g., a transaction layer or an application layer) above the link layer. The interrupt control circuit 1423 notifies the upper layer of an interrupt factor defined in the internal register and notifies reception of a packet or generation of bus reset.

Figure 31:
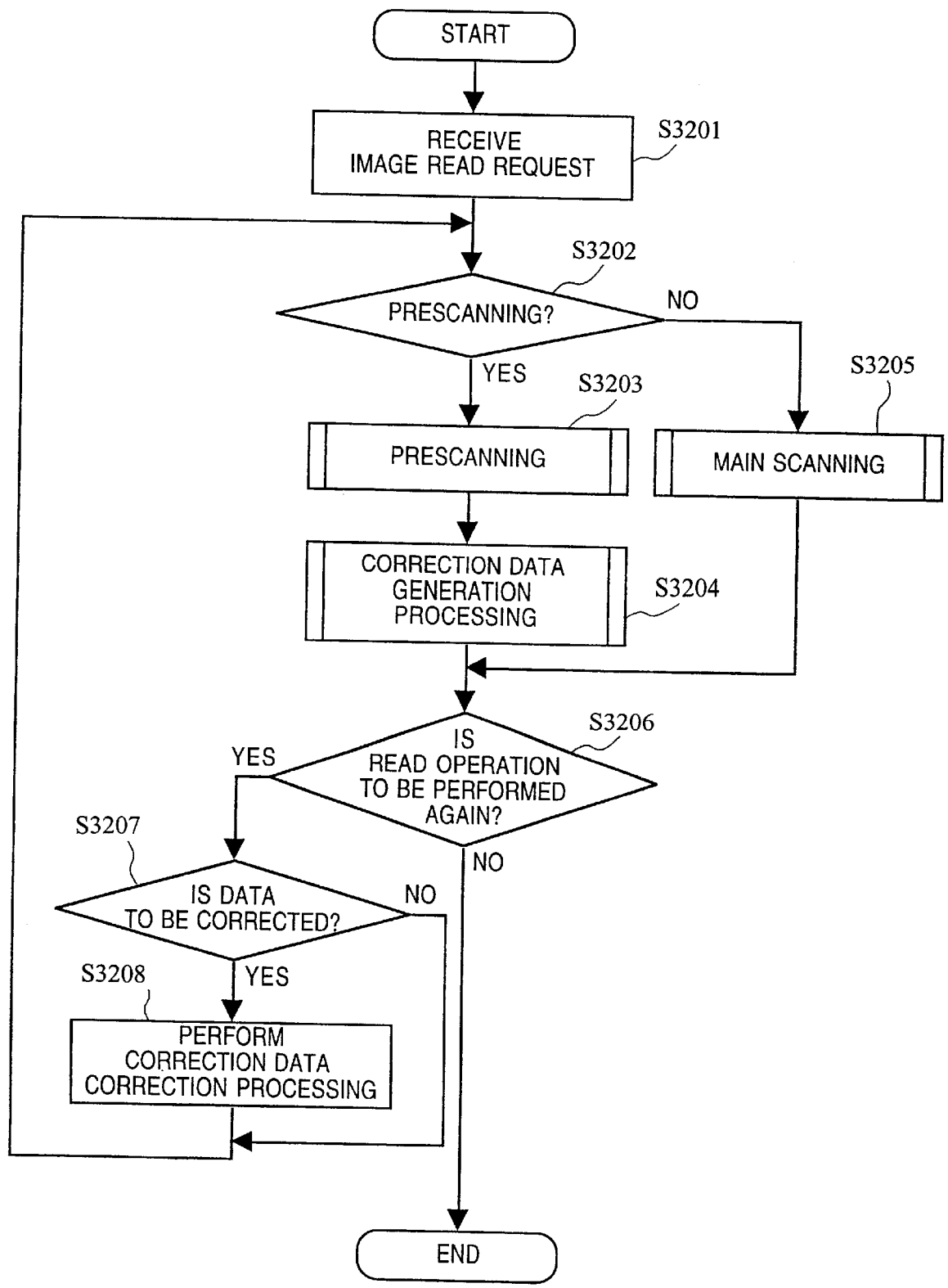
FIG. 31 is a flow chart showing the control procedure on the image data transmission side in the third embodiment.

FIG. 31 is a flow chart showing the control procedure on the image data transmission side in the third embodiment (image reading apparatus of this embodiment).

In step S3201, an image read request from the user is received. This request is output from the host computer 1214 operated by the user. Simultaneously, pieces of selection information for reading, which are set on the host side, are transmitted. This image read request must be properly sent from the host computer 1214 side to the image reading apparatus 1201 side. For this purpose, the asynchronous transfer mode in which retransmission processing is performed when an error occurs is used.

In step S3202, it is selected whether the image is to be read by prescanning or not (scanning) If prescanning is to be performed, the flow advances to step S3203. Otherwise (if scanning is to be performed), the flow advances to step S3205.

In step S3203, prescanning processing is performed. Details of this processing will be described with reference to FIG. 32.

In step S3204, correction data to be used for scanning or prescanning for the second time is generated. Details will be described with reference to FIG. 38. The correction data is generated after prescanning processing. However, even before prescanning processing is complete, correction data generation can be started when necessary data has been obtained. In this arrangement, this function is realized by a hardware logic. Therefore, the correction data can be generated simultaneously with reading image data by the scanner device 1205.

In step S3205, the scanning operation is performed. Details will be described with reference to FIG. 39.

In step 3206, it is determined whether the reading operation is to be performed again after correction data generation processing in step S3204 and scanning processing in step S3205. If another read request is received from the host computer 1214, the flow advances to step S3207; otherwise, processing is ended.

In step S3207, it is determined whether correction data for the next reading operation is to be generated using the data generated by correction data generation processing in step S3204. If correction data generated in prescanning is present, and correction is to be performed, the flow advances to step S3208. Otherwise, i.e., if an image is to be read under the same read condition, the flow returns to step S3202 to repeat read processing.

In step S3208, the correction data is corrected. With this processing, change/correction of the correction data to be used for the next reading, as needed, is complete, and the operation stands by for the subsequent prescanning or scanning processing.

Figure 32:
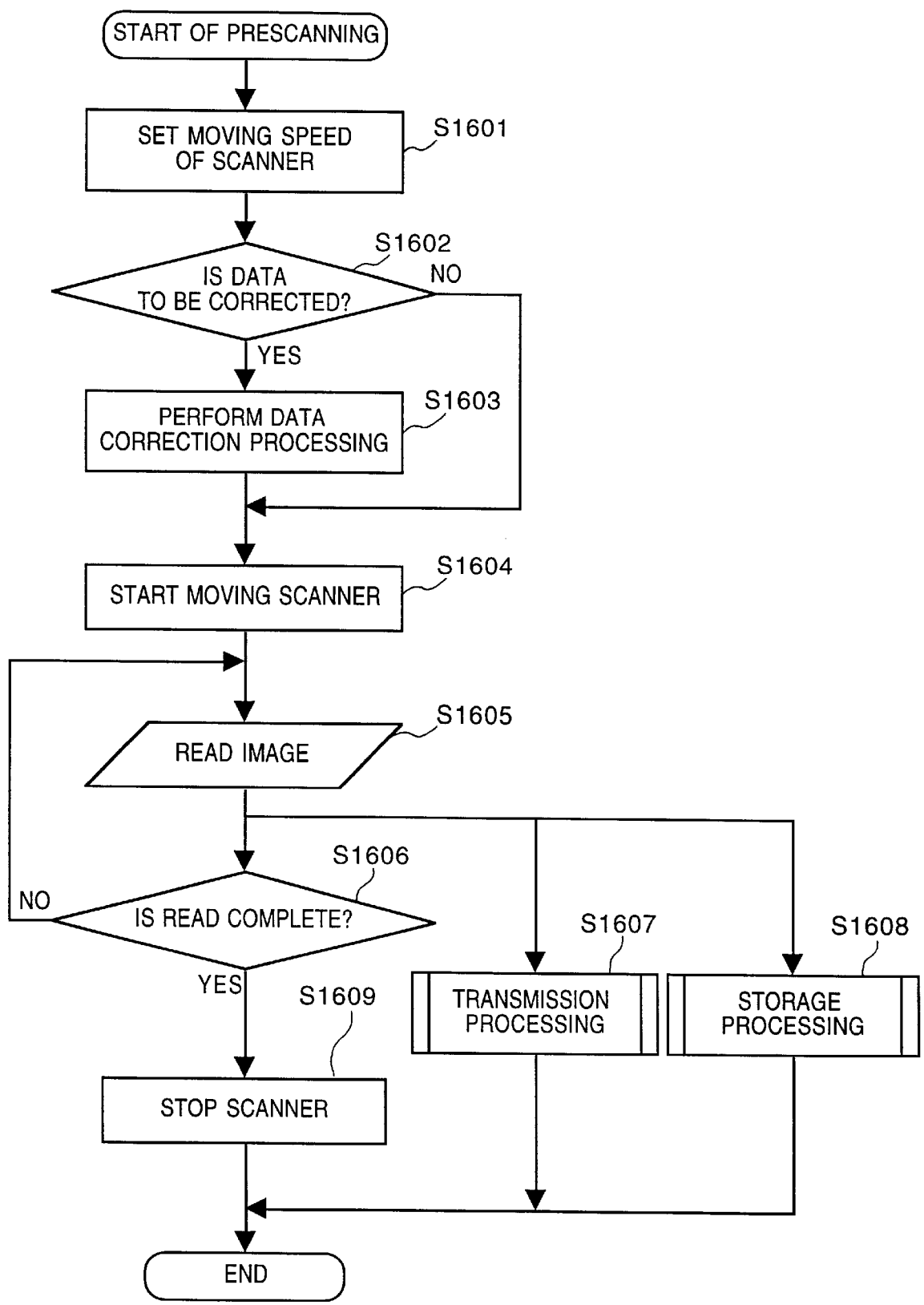
FIG. 32 is a flow chart showing the procedure of prescanning in the third embodiment.

FIG. 32 is a flow chart showing the procedure of prescanning (step S3203) in the third embodiment.

In step S1601, the moving speed of the scanner is set. Since this scanner is assumed to have a line sensor, the driving unit 1301 is controlled to set the moving speed of the scanner device 1302 in the subscanning direction, thereby obtaining a desired resolution.

In step S1602, it is determined whether the image data is to be corrected using correction data for prescanning. If YES in step S1602, setting for correction is performed in step S1603. If NO in step S1602 (if default setting is not changed), the flow advances to step S1604.

In step S1603, the correction data is set. With this processing, the original read position or input level is set. Setting for correction of the color or density is also made, as needed.

In step S1604, a signal is transmitted to the driving unit 1201 to start moving the scanner. In step S1605, the image is read. Simultaneously, processing of transmitting the read image data to the host computer 1214 or storing the image data in a storage medium in the image reading apparatus 1201 is performed. These processing operations can be performed serially or in parallel depending on the arrangement.

In step S1606, it is determined whether the image is completely read. If YES in step S1606, the flow advances to step S1609. If NO in step S1606, the flow returns to step S1605 to continue the read processing.

In step S1607, transmission processing of transferring the read image data to the host computer 1214 is performed. Details will be described later with reference to FIG. 33.

In step S1608, storage processing of storing the read image data is performed. Details will be described later with reference to FIG. 37.

In step S1609, the scanner is stopped. Driving the scanner is performed simultaneously with transmission to the host or storage in the memory, as described above.

Figure 33:
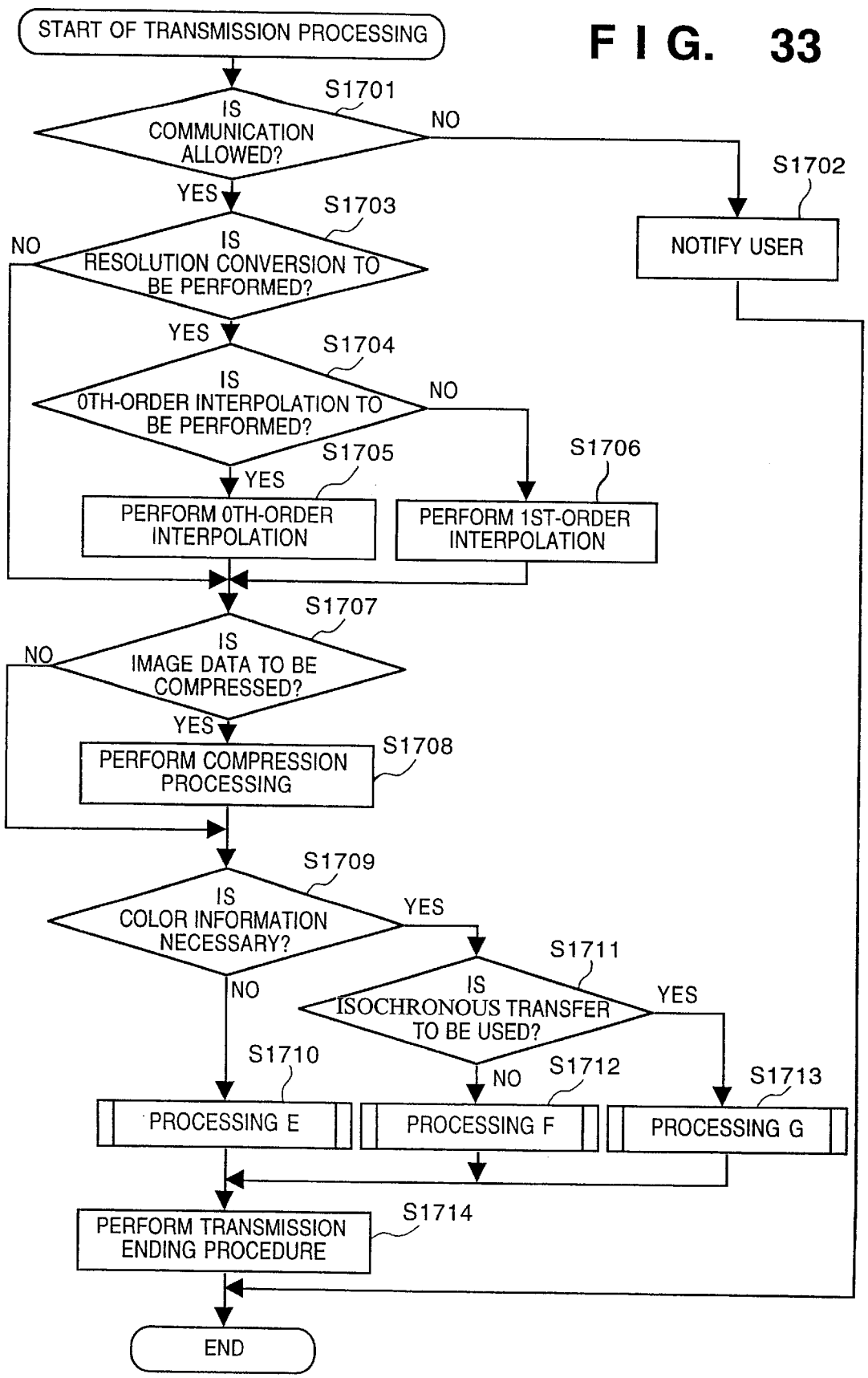
FIG. 33 is a flow chart showing the procedure of transmission processing in the third embodiment.

FIG. 33 is a flow chart showing the procedure of transmission processing in the third embodiment.

In step S1701, it is determined whether image data can be transmitted to the host computer 1214. If No in step S1701, the flow advances to step S1702 to notify, to the user through the user interface 1210 of the image reading apparatus 1210, that image data cannot be transmitted to the host computer 1214.

If YES in step S1701, the flow advances to step S1703 to determine whether the resolution is to be converted. If YES in step S1703, the flow advances to step S1704. If No in step S1703, the flow advances to step S1707.

In step S1704, it is determined whether 0th-order interpolation (simple thinning) is to be selected as resolution conversion processing. If YES in step S1704, the flow advances to step S1705. If NO in step S1704 (if another resolution conversion processing is to be performed), the flow advances to step S1706.

In step S1705, 0th-order interpolation (simple thinning) is performed as resolution conversion processing. In step S1706, 1st-order interpolation (linear interpolation) is performed as resolution conversion processing.

In step S1707, it is determined whether the image data to be transferred is to be compressed. If YES in step S1707, the flow advances to step S1708 to compress the image data. If NO in step S1707, the flow skips step S1708 and advances to step S1709.

In step S1709, it is determined whether color information is necessary. When color information is necessary, recovery processing such as retransmission must always be performed in response to error occurrence. If YES in step S1709, the flow advances to step S1711. If NO in step S1709, the flow advances to step S1710.

In step S1710, image data transfer processing E when no color information is necessary is performed. The processing contents will be described later with reference to FIG. 34.

When color information is necessary, it is determined in step S1711 whether the isochronous transfer mode is to be used to transfer the image data. If YES in step S1711, the flow advances to step S1713. If No in step S1711, i.e., if the asynchronous transfer mode is to be used, the flow advances to step S1712.

In step S1712, image data transfer processing F using asynchronous transfer is performed. The processing contents will be described later with reference to FIG. 35.

In step S1713, image data transfer processing G using isochronous transfer is performed. The processing contents will be described later with reference to FIG. 36.

When any one of the transfer processing operations is complete, the flow advances to step S1714 to perform the procedure of ending transmission.

Figure 34:
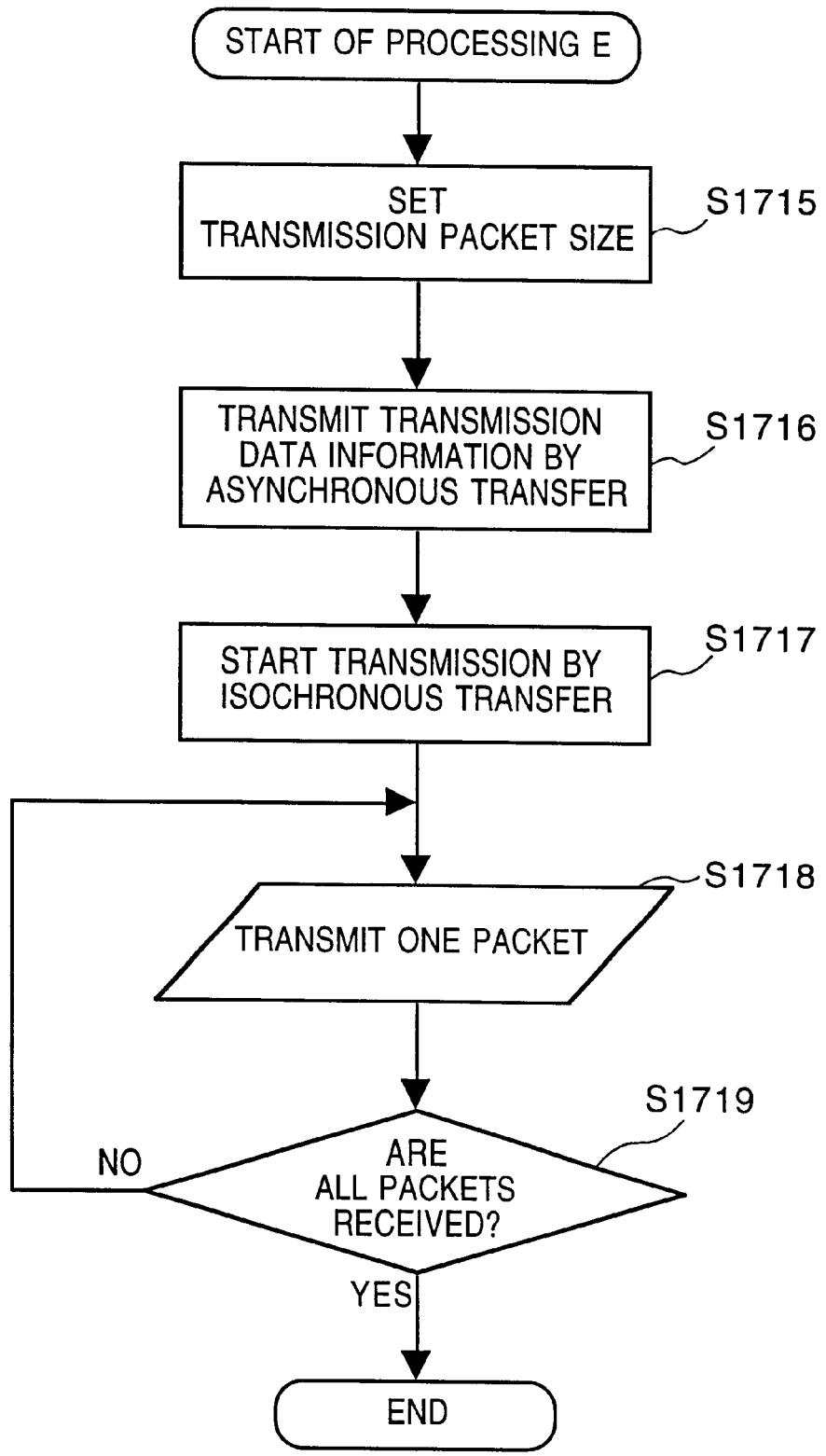
FIG. 34 is a flow chart showing the contents of processing E in FIG. 33.

Transfer processing performed in step S1710 when no color information is necessary will be described with reference to FIG. 34.

In step S1715, the transmission packet size is set. More specifically, the size of image data to be transmitted or the total number of packets to be transmitted and the size of a packet for one cycle of transfer are set. Actually, since transmission processing is performed while the image is being read, the image data size is estimated from the size to be read. The packet size is determined such that the constant multiple of the main scanning direction data length of the prescanning image to be displayed matches the data length of the packet to be transmitted. Alternatively, the packet size is determined such that the constant multiple of the data length of the set transmission packet matches the main scanning direction data length of the prescanning image to be displayed. The packet size is set within the range of isochronous transfer band assigned after IEEE 1394 bus configuration.

In step S1716, transmission data information (the image data size, the total number of packets, and the packet size) set in step S1715 is transmitted to the host computer 1214 using asynchronous transfer in which retransmission is performed when an error occurs.

In step S1717, processing of transmitting the prescanned image data in the isochronous transfer mode is initiated.

In step S1718, the image data is transmitted to the host computer 1214 in units of packets in the isochronous transfer mode. The flow returns to step S1718 to continue transmission processing until it is determined in step S1719 that all image data are transmitted.

Actually, since isochronous transfer is used for transfer, the number of packets having been transmitted (or the number of remaining image data) need not be counted every time one packet is transmitted. In addition, even when all packets are transferred, the host computer 1214 need not be notified of it. Although no packets are transmitted after transfer is complete, the band assigned for isochronous transfer does not change.

As the characteristic feature of processing E, the isochronous transfer without retransmission is used to transfer the prescanning image. With this arrangement, after the band for isochronous transfer is ensured in IEEE 1394 bus configuration, a predetermined band can always be used, and therefore, the time required to transmit the image to the host computer 1214 can be shortened. However, as will be described later, when an error occurs, some recovery processing is required because no retransmission protocol is present (no recovery processing is performed in processing 15E).

Figure 35:
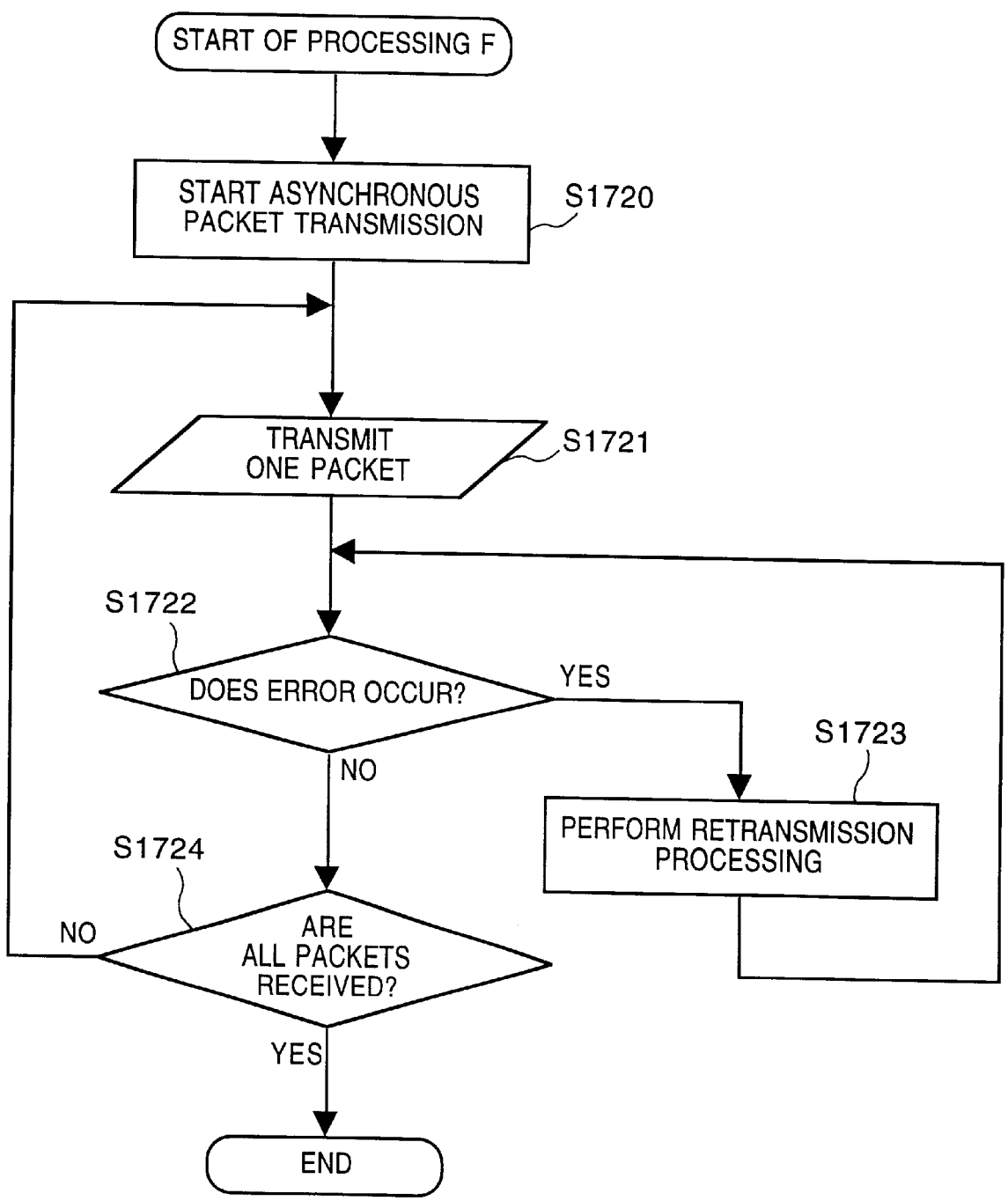
FIG. 35 is a flow chart showing the contents of processing F in FIG. 33.

Processing F of performing image data transfer using asynchronous transfer will be described next with reference to FIG. 35.

In step S1720, processing of transmitting prescanned image data in the asynchronous transfer mode is started. In step S1721, the image data is transmitted to the host computer 1214 in units of packets in the asynchronous transfer mode.

In step S1722, it is determined whether the transmitted packet is not properly received because of the problem on the line or the state of the reception-side node, i.e., whether an error occurs. If YES in step S1722, the flow advances to step S1723. If NO in step S1722 (when transfer is successfully complete), the flow advances to step S1724.

In step S1723, since an error occurs, retransmission is performed on the basis of the IEEE 1394 protocol, and the flow returns to step S1722. With this processing, all packets can be transmitted without data omission.

In step S1724, it is determined whether all image data are transmitted. If all the packets are processed, the sequence of processing F is ended. If NO in step S1724, i.e., if packets to be transmitted remain, the flow returns to step S1721 to continue transmission processing.

As the characteristic feature of processing F, the asynchronous transfer mode with retransmission is used to transfer the prescanning image. With this processing, information such as color information for which no data omission is permitted can be properly transferred. However, the priority of asynchronous transfer in band acquisition is lower than that of isochronous transfer, and a long time is required because processing in the transaction layer portion is performed every time a packet is transmitted.

Figure 36:
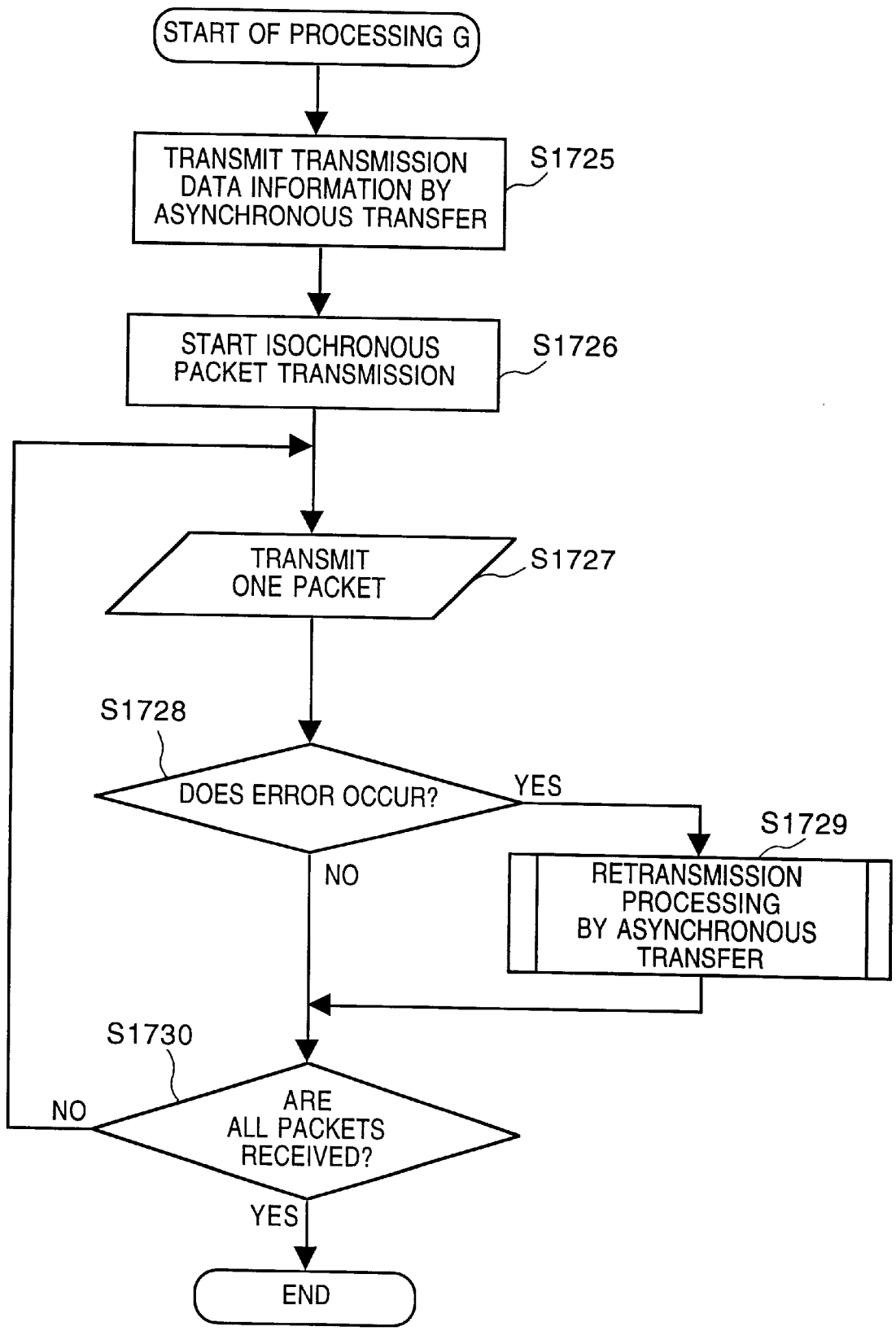
FIG. 36 is a flow chart showing the contents of processing G in FIG. 33.

Processing G of performing image data transfer using isochronous transfer will be described next with reference to FIG. 36.

In step S1725, setting the transmission packet size described in step S1715 is performed, and transmission data information is transmitted to the host computer 1214 using asynchronous transfer in which retransmission is performed when an error occurs. It is also determined whether the image data is to be segmented into packets in units of colors, though this is not illustrated. That is, a method of transmitting image data packets corresponding to a certain size while including all colors or a method of transmitting data of a packet size in units of colors can be selected.

In step S1726, processing of transmitting the prescanned image data in the isochronous transfer mode is started. In step S1727, the image data is transmitted to the host computer 1214 in units of packets by isochronous transfer.

In step S1728, it is determined whether the transmitted packet is not properly received because of the problem on the line or the state of the reception-side node, i.e., whether an error occurs. Since the isochronous transfer mode has no retransmission based on the IEEE 1394 protocol, a unique protocol is performed. In this embodiment, serial number data is added to each packet to be transmitted by isochronous transfer. When the host computer 1214 determines that an error occurs, i.e., a packet is omitted, the omitted packet number (serial number defined by the independent protocol) is supplied to the image reading apparatus 1201 on the packet transmission side, and retransmission is performed. If YES in step S1728, the flow advances to step S1729. If NO in step S1728 (if transfer is successfully complete), the flow advances to step S1730.

In step S1729, in response to error occurrence, retransmission is performed on the basis of the asynchronous transfer protocol. With this processing, all packets can be transmitted without any data omission. If the packets are transferred in units of colors, and the host computer 1214 notifies in the retransmission request that no color image data is necessary anymore, monochromatic image data (only luminance data) will be transferred subsequently.

In step S1730, it is determined whether all image data are transmitted. If all the packets are processed, the sequence of processing G is ended. If NO in step S1730, i.e., if packets to be transmitted still remain, the flow returns to step S1727 to continue transmission processing.

As the characteristic feature of processing G, a unique protocol is used such that the isochronous transfer without retransmission is used to transfer the prescanning image, and when an error occurs, asynchronous transfer with retransmission is used. With this arrangement, high-speed transfer without data omission can be performed. However, since retransmission is performed in response to error occurrence, the time required for transfer is longer than that in processing E.

Although not illustrated, image data may be transmitted using both the isochronous transfer mode and the asynchronous transfer mode. When the host computer 1214 determines packet omission according to error occurrence, the image data transmitted by asynchronous transfer is acquired instead of outputting the retransmission request to the image reading apparatus 1201. However, in asynchronous transfer with lower bus priority than that of isochronous transfer, the packet may be transmitted with a delay. Therefore, each packet transmitted by isochronous transfer is basically received, and when it is determined that an error occurs, the corresponding packet transmitted later by asynchronous transfer is assigned to the portion where the data may be omitted. All the remaining packets transmitted by asynchronous transfer are received and then discarded. Although a band more than necessity is required because the data is transmitted twice from the same device, this method promises both the high transfer speed and reliability.

Figure 37:
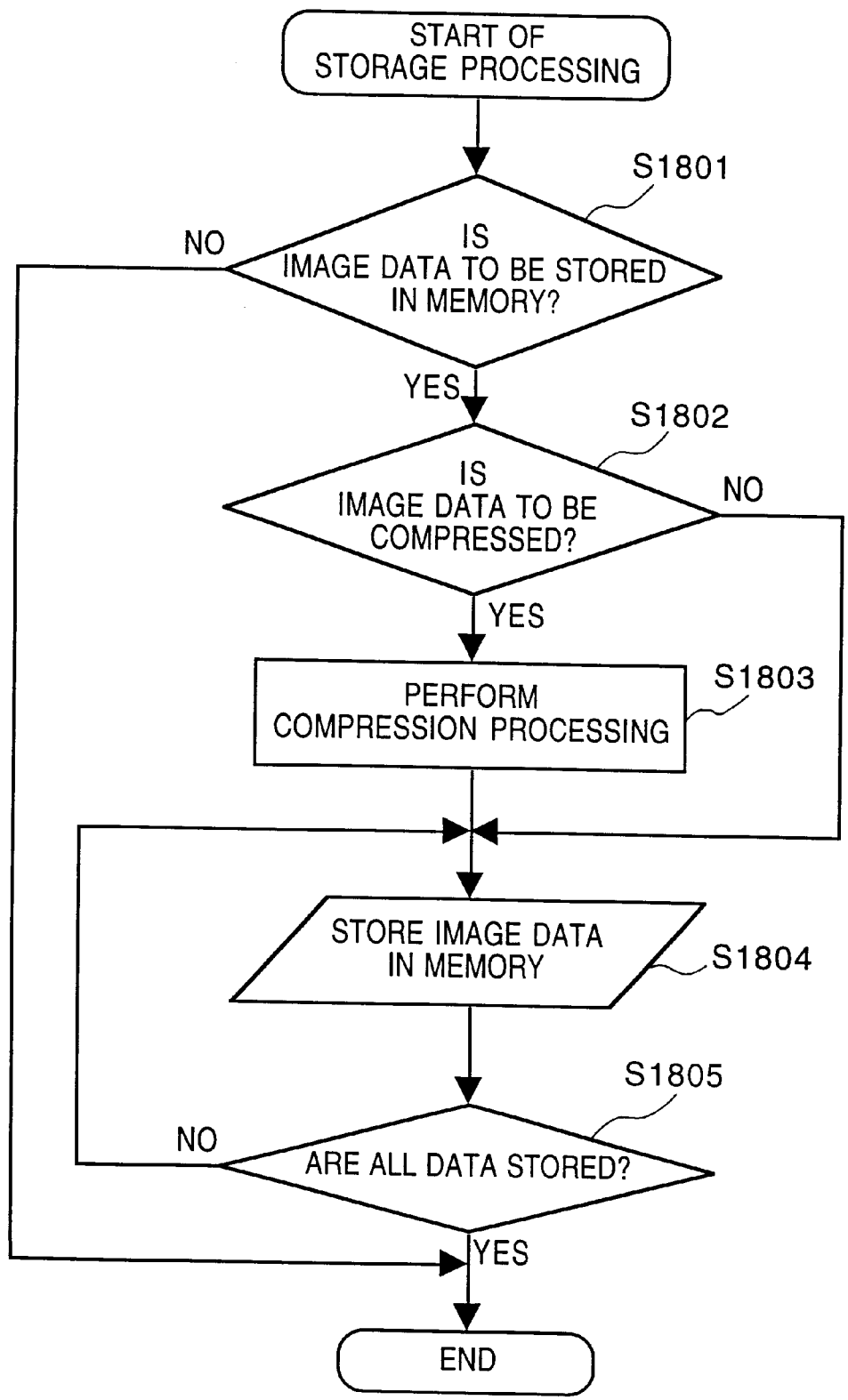
FIG. 37 is a flow chart showing the procedure of storage processing in the third embodiment.

FIG. 37 is a flow chart showing the procedure of storage processing in the third embodiment.

In step S1801, it is determined whether the image data is to be stored in the memory 1204. If YES in step S1801, the flow advances to step S1802. If NO in step S1801, storage processing is ended.

In step S1802, it is determined whether the image data is to be compressed. If YES in step S1802, the flow advances to step S1803 to compress the read image data. In this embodiment, reversible compression is employed. If No in step S1802, the flow skips step S1803 and advances to step S1804.

In step S1804, the image data is stored in the memory 1204.

In step S1805, it is determined whether all the image data are stored in the memory 1204. If YES in step S1805, processing is ended. If NO in step S1805, the flow returns to step S1804 to store the image data in the memory 1204.

With this arrangement, the memory 1204 for storing a large quantity of image data can be effectively used. In addition, even when a retransmission request is received from the host computer 1214 side, the image data can be transmitted without reading the image again, i.e., the processing time can be shortened. Whether or not the image data is to be stored or compressed is determined in accordance with a command from the host computer.

Figure 38:
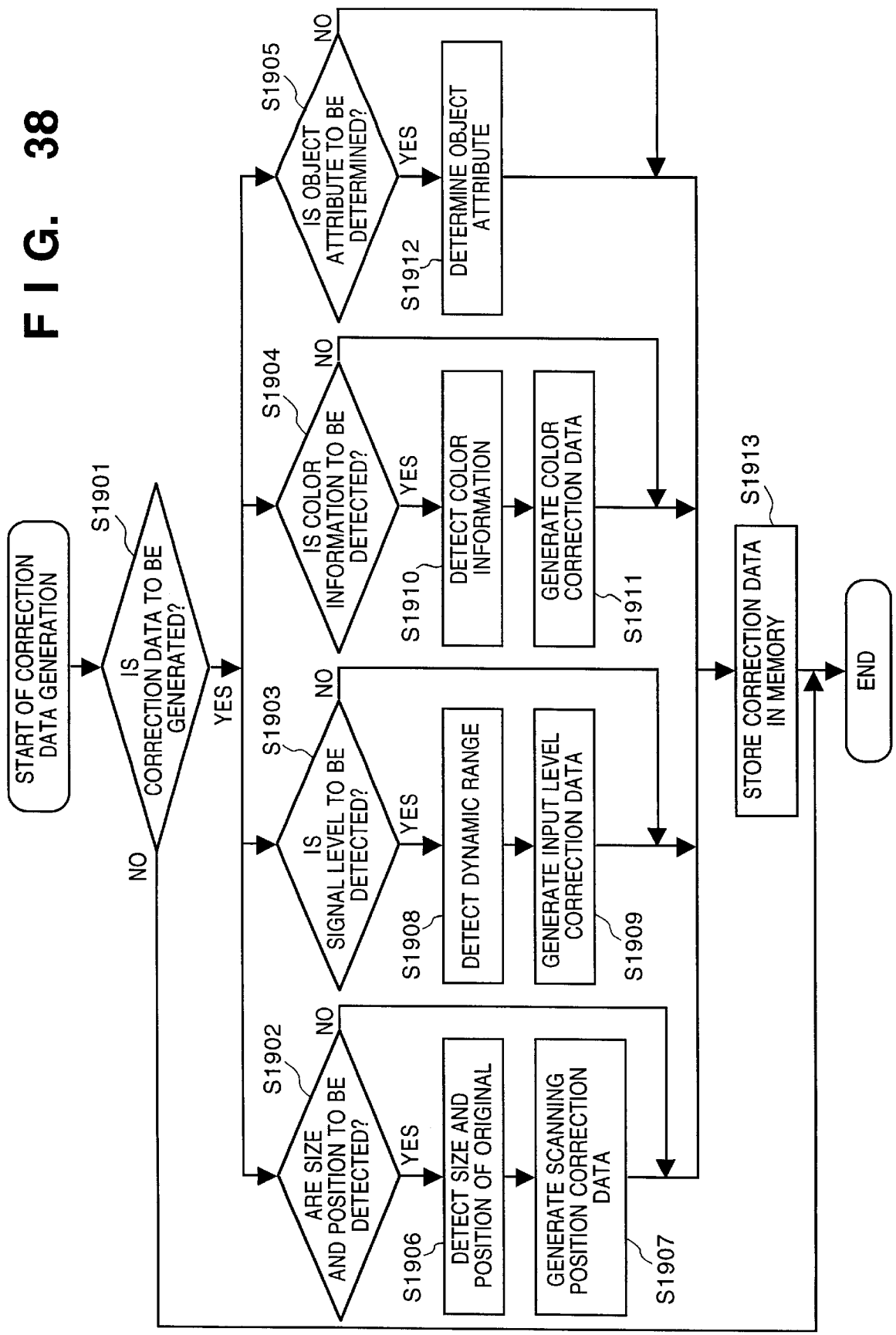
FIG. 38 is a flow chart showing the procedure of correction data generation processing in the third embodiment.

FIG. 38 is a flow chart showing the procedure of correction data generation processing in the third embodiment.

In step S1901, it is determined whether the correction data to be used for scanning or prescanning for the second time is to be generated. If YES in step S1901, the flow advances to steps S1902 to S1905 as four correction data generation processes. If NO in step S1901, processing is ended.

In step S1902, it is determined whether the size and position of the original are to be detected.

If YES in step S1902, the flow advances to step S1906. If NO in step S1902, the flow advances to step S1913. In step S1906, the leading edge position and the edge portion of the original are detected to detect the size and position of the original. In step S1907, data for correcting the scanning position is generated on the basis of the size/position detection data obtained in step S1906.

In step S1903, it is determined whether the dynamic range of the input signal is to be detected. If YES in step S1903, the flow advances to step S1908. If NO in step S1903, the flow advances to step S1913. In step S1908, the maximum and minimum values of the input signal are detected to detect the dynamic range of the input signal. In step S1909, input level correction data is generated on the basis of the dynamic range detection data obtained in step S1908.

In step S1904, it is determined whether the color information, e.g., information of the background color level or color balance of R, G, and B is to be detected. If YES in step S1904, the flow advances to step S1910. If NO in step S1904, the flow advances to step S1913. In step S1910, the color information is detected. In step S1911, color correction data is generated on the basis of the color information detected in step S1910.

In step S1905, it is determined whether the attribute of an object in the original, e.g., text, graphic, or image data is to be determined. If YES in step S1905, the flow advances to step S1912. If NO in step S1905, the flow advances to step S1913. In step S1912, objects in the original are determined in units of blocks. In step S1913, when the correction data is generated, the data is stored in the memory 1204.

Whether or not the correction data is to be generated and, of course, the type of correction data to be generated are determined on the basis of an instruction from the host computer.

This flow chart assumes that the respective correction data generation processing operations are performed in parallel. This is because the arrangement described herein is based on hardware. In a software arrangement, the processing operations are sequentially performed.

Figure 39:
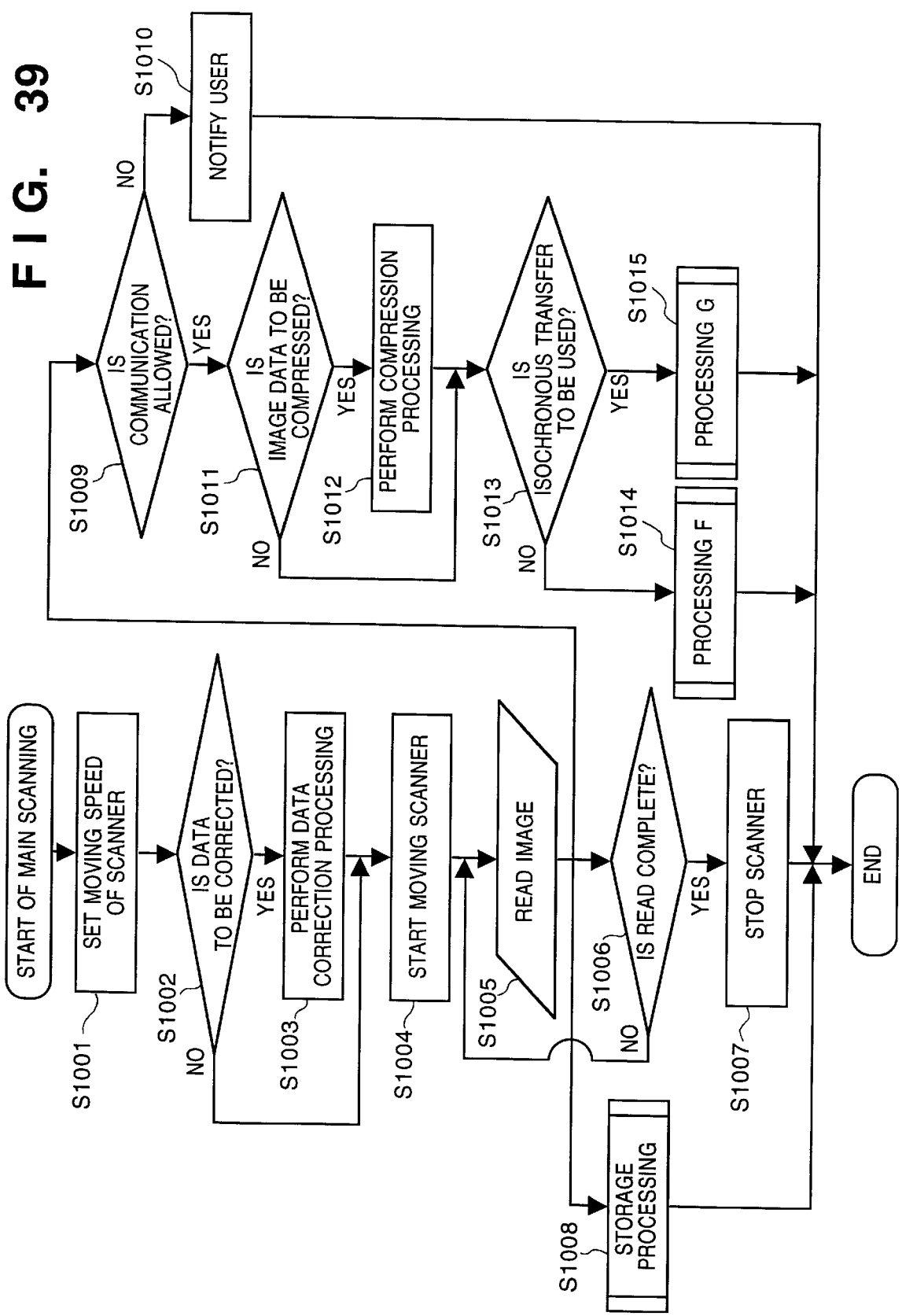
FIG. 39 is a flow chart showing the control procedure of scanning in the third embodiment.

FIG. 39 is a flow chart showing the control procedure of scanning in the third embodiment.

In step S1001, the moving speed of the scanner (the resolution in the subscanning direction) is set on the basis of settings from the user (host computer). Since the image reading apparatus uses a line sensor, the subscanning moving speed of the scanner device 1205 is controlled through the driving unit 1301, thereby obtaining a desired resolution.

In step S1002, when the correction data for scanning is present, it is determined whether the image data is to be corrected using the value. When the correction data is to be used, the setting for correction is performed in step S1003. With this processing, the original read position or input level is set. As needed, the setting for correction of the color or density is also made. If NO in step S1002, the flow skips step S1003.

In step S1004, a signal is transmitted to the driving unit 1201 to start moving the scanner. In step S1005, the image reading operation is performed. Simultaneously, processing of transmitting the read image data to the host computer 1214 (processing from step S1009) or storing the image data in the storage medium in the image reading apparatus 1201 (step S1008) is performed. These processing operations may be performed serially or in parallel depending on the arrangement.

In step S1006, it is determined whether image read processing is complete. If YES in step S1006, the flow advances to step S1007. If NO in step S1006, the flow returns to step S1005 to continue read processing.

In step S1007, when the edge of the original or trimming designation region is completely scanned, the scanner is stopped. The scanner is driven simultaneously with transmission to the host or storage in the memory, as described above.

In step S1008, storage processing of storing the read image data is performed. Details have already been described with reference to FIG. 37, and a description thereof will be omitted.

In step S1009 executed in parallel to image read processing, it is determined whether the image data can be transmitted to the host computer 1214. If YES in step S1009, the flow advances to step S1011. If No in step S1009, the flow advances to step S1010 to notify the user through the user interface 1210 of the image reading apparatus 1201, that image data cannot be transmitted to the host computer 1214.

In step S1011, it is determined whether the image data to be transferred is to be compressed. If YES in step S1011, the flow advances to step S1012 to compress the read image data. If NO in step S1011, the flow skips step S1012.

In step S1013, it is determined whether the isochronous transfer mode is to be used to transfer the image data. If YES in step S1013, the flow advances to step S1015. If NO in step S1013, i.e., if the asynchronous transfer mode is to be used, the flow advances to step S1014.

In step S1014, processing F of performing image data transfer using asynchronous transfer is performed. The processing contents have already been described with reference to FIG. 35, and a detailed description thereof will be omitted.

In step S1015, processing G of performing image data transfer using isochronous transfer is performed. The processing contents have already been described with reference to FIG. 36, and a detailed description thereof will be omitted.

Processing on the image reading apparatus side has been described above. Processing on the reception side, i.e., the host computer side (mainly the driver program of the image scanner) will be described below.

Figure 24B:
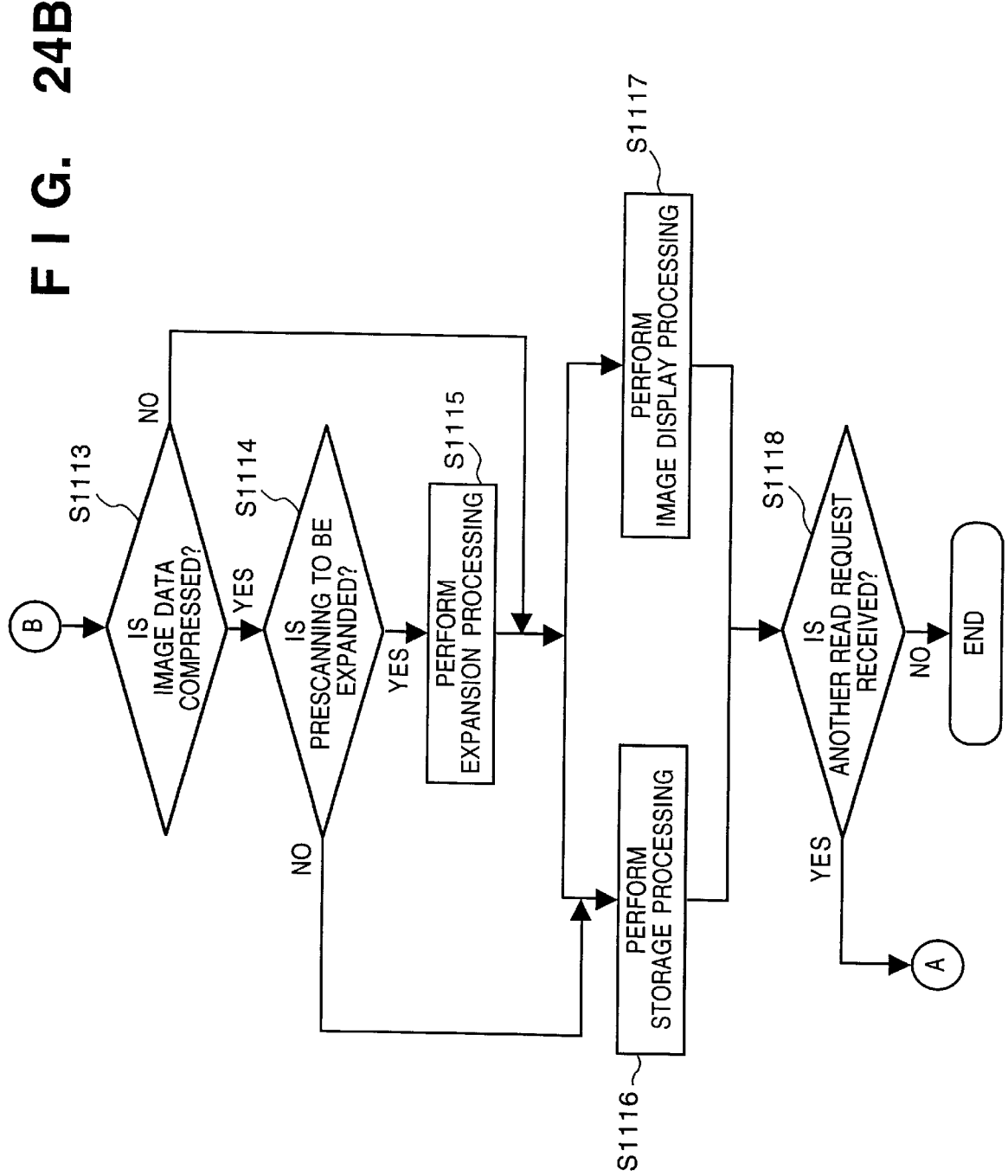

FIGS. 24A and 24B are flow charts showing the control procedure on the reception side (host computer) in the third embodiment.

In step S1101, items of the read request are set. More specifically, the image reading apparatus 1201 is instructed to perform the original read operation, and simultaneously, various items, i.e., whether the image read operation is prescanning or scanning, the resolution, the necessity of color information, the transfer mode, and the like are set. These items are set through the user interface displayed on the display screen on the host computer side.

In step S1102, the request items set in step S1101 are transmitted to the image reading apparatus 1201 by asynchronous transfer. Asynchronous transfer is used to properly transfer the request to the image reading apparatus. If the transmitted request items are not properly received on the image reading apparatus side, retransmission is performed in accordance with the IEEE 1394 protocol to properly transfer the request items.

In step S1103, it is determined whether the requested read operation is prescanning. If YES in step S1103, the flow advances to step S1104. If NO in step S1103, the flow advances to step S1110.

In step S1104, it is determined whether color information is necessary in prescanning. If YES in step S1104, the flow advances to step S1105. If NO in step S1104, the flow advances to step S1108.

If color information is necessary, it is determined in step S1105 whether the isochronous transfer mode is to be used to transfer the image data. If YES in step S1105, the flow advances to step S1107. If NO in step S1105, i.e., if the asynchronous transfer mode is to be used, the flow advances to step S1106.

Figure 25:
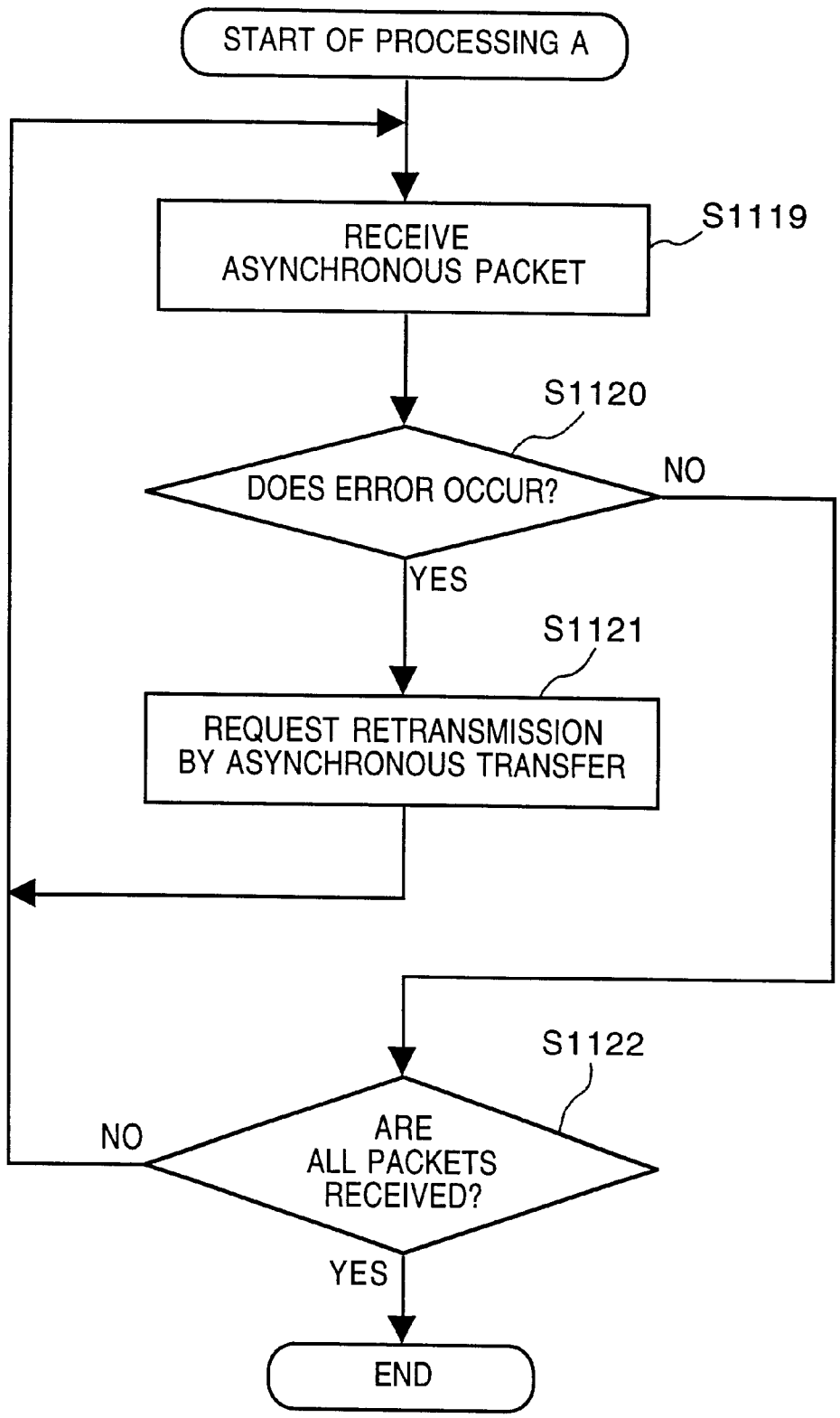
FIG. 25 is a flow chart showing the contents of processing A in FIGS. 24A and 24B.

In step S1106, image data transfer processing A using asynchronous transfer is performed (processing contents will be described later with reference to FIG. 25). In step S1107, image data transfer processing B using isochronous transfer is performed (processing contents will be described later with reference to FIG. 26).

In step S1108, the transmission data information (details have been described above) transferred from the image reading apparatus 1201 in the asynchronous transfer mode is received. When an error occurs on the line or upon reception, a retransmission request is output to properly acquire the information.

Figure 27:
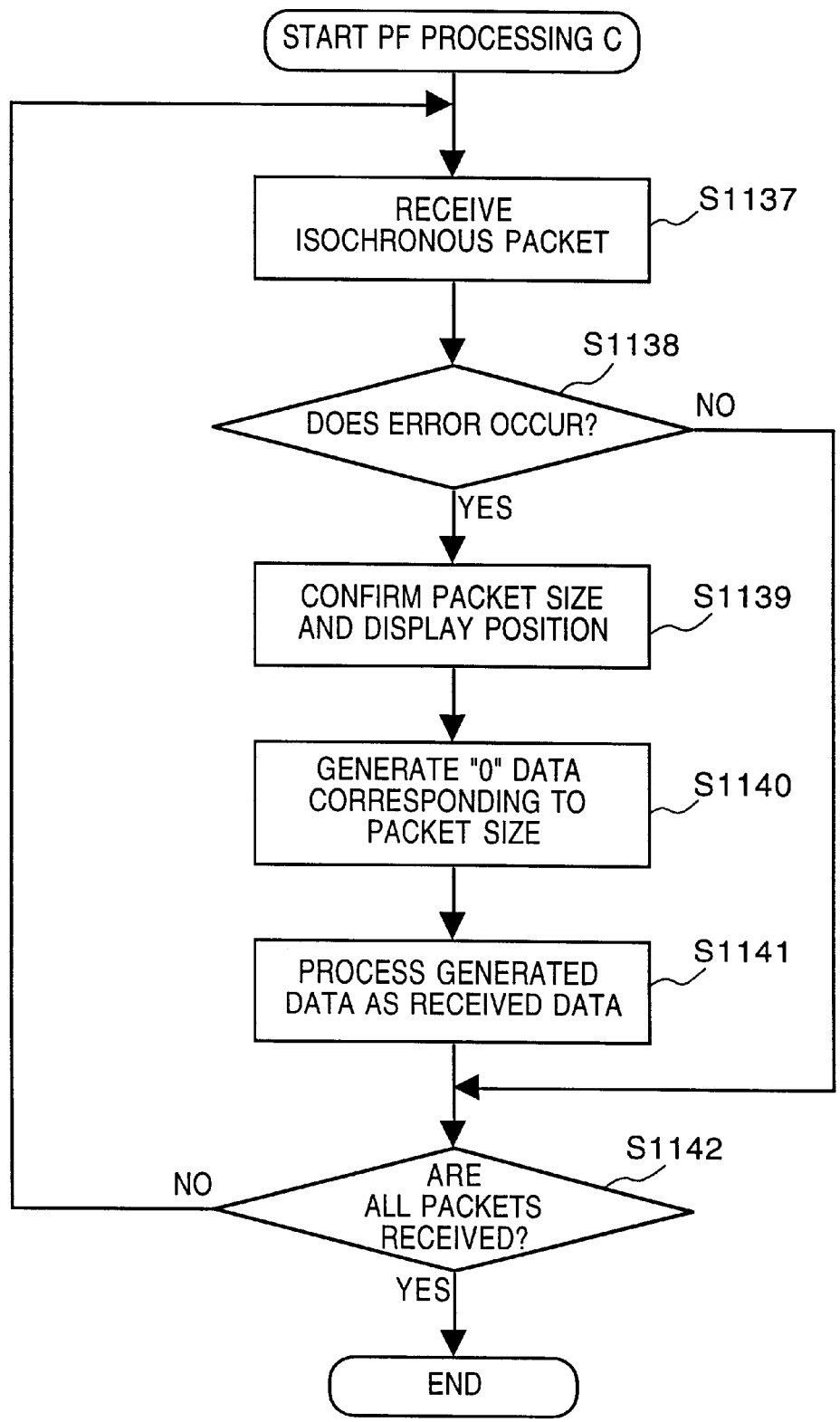
FIG. 27 is a flow chart showing the contents of processing C in FIGS. 24A and 24B.

In step S1109, image data transfer processing C using isochronous transfer is performed (processing contents will be described later with reference to FIG. 27).

In step S1110, it is determined whether the isochronous transfer mode is to be used to transfer scanned image data. If YES in step S1110, the flow advances to step S1112. If No in step S1110, i.e., if the asynchronous transfer mode is to be used, the flow advances to step S1111 to perform processing A, as in step S1106.

Figure 28:
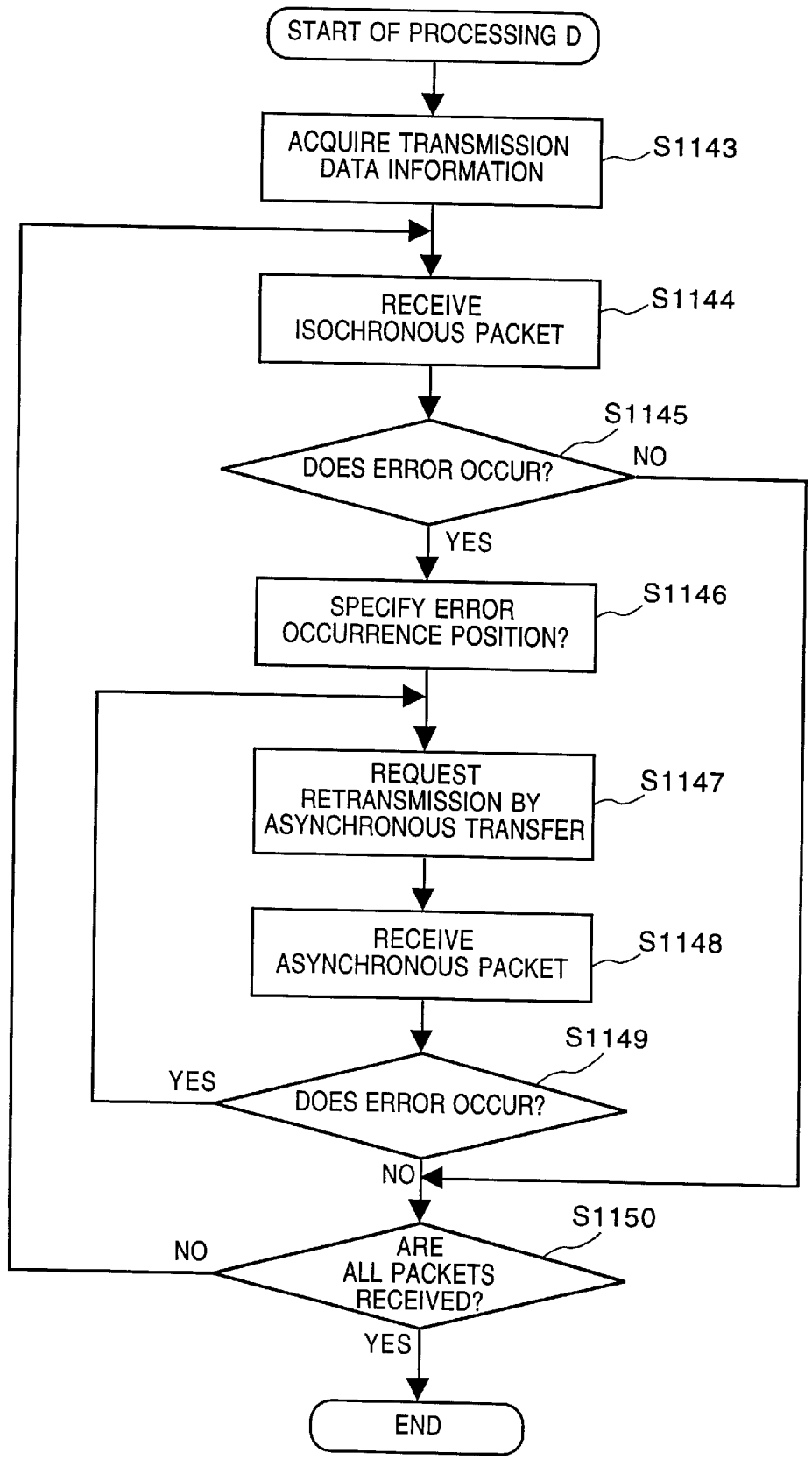
FIG. 28 is a flow chart showing the contents of processing D in FIGS. 24A and 24B.

In step S1112, image data transfer processing D using isochronous transfer is performed (processing contents will be described later with reference to FIG. 28).

When any one of the reception operations is performed, the flow advances to step S1113 to determine whether the data in the received packet is compressed. If YES in step S1113, the flow advances to step S1114. If NO in step S1113, the flow advances to steps S1116 and S1117.

If the data is compressed, it is determined in step S1114 whether the data is to be expanded. If YES in step S1114, the flow advances to step S1115. If NO in step S1114, the flow advances to step S1116. In step S1115, the compressed image data is expanded. In step S1116, the received image data is stored.

In this flow chart, storage processing is performed after all image data are received. In fact, the storage/holding operation is performed every time a packet is received. Although not illustrated, when the compressed image data is stored without being expanded, expansion processing in step S1115 must be performed before the image data is displayed.

In step S1117, the received image data is displayed on the display unit 1220. With this processing, the user can obtain information and materials for determining whether the read image is a desired image, the read position is correct, or the image has an appropriate color and density.

In step S1118, it is determined whether another image read request is received. If YES in step S1118, processing from step S1101 is repeated. If NO in step S1118, processing associated with image reading is ended.

Image data reception processing A using asynchronous transfer will be described next with reference to FIG. 25.

In step S1119, processing of receiving the prescanning or scanned image data in the asynchronous transfer mode is started.

In step S1120, it is determined whether the packet transmitted from the image reading apparatus 1201 is not properly received because of the problem on the line or the state of the reception-side node, i.e., whether an error occurs. If YES in step S1120, the flow advances to step S1121 to output a request for retransmission in the asynchronous transfer mode according to the IEEE 1394 protocol to the image reading apparatus 1201. With this processing, all the packets can be transmitted without data omission. The flow returns to step S1119 to receive the retransmitted packet.

If NO in step S1120, the flow advances to step S1122 to determine whether all image data are received. If all packets are processed, the sequence of processing A is ended. If NO in step S1122, i.e., if packets to be transmitted still remain, the flow returns to step S1119 to continue reception processing.

Figure 26:
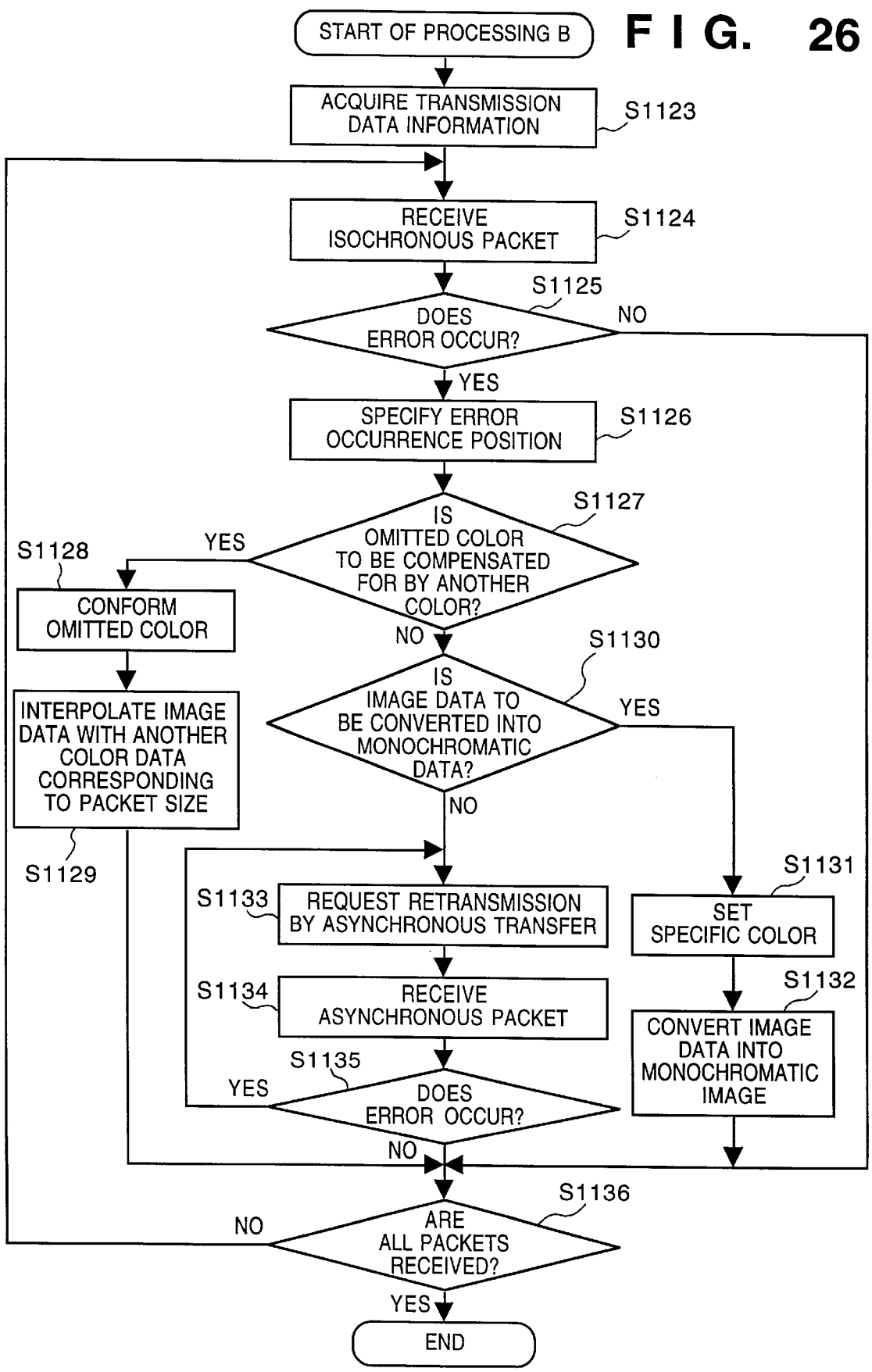
FIG. 26 is a flow chart showing the contents of processing B in FIGS. 24A and 24B.

Prescanned image data transfer processing B using isochronous transfer will be described next with reference to FIG. 26.

In step S1123, the above-described transmission data information from the image reading apparatus 1201 is received by asynchronous transfer in which retransmission is performed in response to error occurrence. With this processing, information of the size of image data to be transmitted, the packet size, and the total number of packets is obtained.

In step S1124, processing of receiving the prescanned image data by isochronous transfer is started. The image data is received from the image reading apparatus 1201 in units of packets by isochronous transfer.

In step S1125, it is determined whether the packet transmitted from the image reading apparatus 1201 is not properly received because of the problem on the line or the state of the reception-side node, i.e., whether an error occurs. On the IEEE 1394 protocol, no retransmission is performed in the isochronous transfer mode. Therefore, a unique protocol is performed subsequently. When the host computer 1214 determines that an error occurs i.e., a packet is omitted, the flow advances to step S1126. If No in step S1125, the flow advances to step S1136.

Whether an error occurs is determined as follows. The size of image data, the size of a packet, the total number of packets, and the packet number added in each packet (serial number defined by the independent protocol), which are managed to determine packet omission or grasp/set the packet transfer interval from the band where the packets can be transferred in the isochronous transfer mode, which is acquired after IEEE 1394 bus configuration. To grasp the packet transfer interval, a cycle start packet is used.

In step S1126, the error occurrence position is specified in accordance with occurrence of the error. More specifically, the image data display position is specified from the serial number defined by the independent protocol or transfer period.

When the packets are transmitted in units of colors, it is determined in step S1127 whether the color information of the omitted packet is to be compensated for by another color. More specifically, another color data is directly used as the omitted color data, or color data received before the omitted packet is used. With these methods, the position information can be stored and displayed, though a change in hue at that portion cannot be prevented. If YES in step S1127, the flow advances to step S1128. If NO in step S1127, the flow advances to step S1130.

In step S1128, the omitted color is grasped. Since three colors of R, G, and B are alternately and repeatedly transmitted, the color of the omitted packet is determined on the basis of the preceding transmitted color. More specifically, for data of the color component which may be omitted, data of the same color component which has been received latest is used. In step S1129, a color other than the omitted color is selected, and the omitted color data is interpolated using the selected color data.

In step S1130, when an error occurs, it is determined that the color information is not necessary for prescanning, and it is determined whether the color image is to be converted into a monochromatic image. If YES in step S1130, the flow advances to step S1131. If NO in step S1130, the flow advances to step S1133.

In step S1131, a specific color for conversion to a monochromatic image is set. More specifically, the G component is used as the luminance component. When the color information of the omitted packet is G, a retransmission request using asynchronous transfer is output. At this time, it is notified that the image data to be subsequently transferred only need have luminance data. If the omitted color is other than G, only a request for transferring monochromatic image data in subsequent data transfer is output.

When the retransmission request is output in step S1131, the packet is received in step S1132. In addition, color image data which has already been received and stored or displayed on the display unit 1220 is converted into monochromatic image data.

In step S1133, in response to error occurrence, a retransmission request based on the asynchronous transfer mode is output to the image reading apparatus 1201 in accordance with the IEEE 1394 protocol. With this processing, all packets can be transmitted without data omission.

In step S1134, the asynchronous packet is received. The received packet data is assigned to the position where data may be omitted.

In step S1135, it is determined whether the retransmission packet transmitted from the image reading apparatus 1201 by asynchronous transfer is not properly received because of the problem on the line or the state of the reception-side node, i.e., whether an error occurs. When the host computer 1214 determines that an error occurs, i.e., a packet is omitted, the flow returns to step S1133. If NO in step S1125, the flow advances to step S1136.

In step S1136, it is determined whether all image data are received. If all packets are processed, the sequence of processing B is ended. If NO in step S1136, i.e., if packets to be received still remain, the flow returns to step S1124 to continue reception processing.

Processing C of transferring prescanned image data without color information using isochronous transfer will be described next with reference to FIG. 27.

In step S1137, processing of receiving the prescanned image data in the isochronous transfer mode is started.

In step S1138, it is determined whether the packet transmitted from the image reading apparatus 1201 by asynchronous transfer is not properly received because of the problem on the line or the state of the reception-side node, i.e., whether an error occurs. If YES in step S1138, the flow returns to step S1139. If No in step S1138 (if transfer is successfully complete), the flow advances to step S1142.

In step S1139, the size of the packet to be received and the position where the packet data is to be displayed are specified in response to error occurrence. In step S1140, dummy data (data with a value "0") corresponding to the packet size specified in step S1139 is generated. When the received image data is used for only display, data having a size necessary for display is generated. In step S1141, the data generated in step S1140 is processed as the received image data. When the image data is to be stored in the RAM 1217, storage processing is continuously performed, and when the image data is to be displayed on the display unit 1220, display processing is continuously performed.

In step S1142, it is determined whether all image data are received. Processing from step S1137 is repeated until it is determined that all packets are completely processed. If YES in step S1142, the sequence of processing C is ended.

In processing C, the processing time is shortened by omitting retransmission. Problems posed due to the absence of retransmission (e.g., a shift in position information due to image data omission) are solved by generating dummy data on the reception side.

Scanned image data transfer processing D using isochronous transfer will be described next with reference to FIG. 28.

In step S1143, the above-described transmission data information from the image reading apparatus 1201 is received by asynchronous transfer in which retransmission is performed in response to error occurrence. With this processing, pieces of information such as the size of image data to be transmitted, the packet size, and the total number of packets are obtained.

In step S1144, processing of receiving the scanned image data in the isochronous transfer mode is started. The image data is received from the image reading apparatus 1201 in units of packets by isochronous transfer. In step S1145, it is determined whether the packet transmitted from the image reading apparatus 1201 is not properly received because of the problem on the line or the state of the reception-side node, i.e., whether an error occurs. On the IEEE 1394 protocol, no retransmission is performed in the isochronous transfer mode. Therefore, a unique protocol is performed subsequently, as in step S1125. When the host computer 1214 determines that an error occurs, i.e., a packet is omitted, the flow advances to step S1146. If NO in step S1145, the flow advances to step S1150. A description of determination whether an error occurs has already been made in step S1125 and will be omitted.

In step S1146, the error occurrence position is specified in response to error occurrence. More specifically, the image data display position is specified from the serial number defined by the independent protocol or transfer period.

In step S1147, a retransmission request based on the asynchronous transfer mode is output to the image reading apparatus 1201 in accordance with the IEEE 1394 protocol in response to error occurrence. With this processing, all packets can be transmitted without data omission.

In step S1148, the asynchronous packet is received. The received packet data is embedded into the position where data may be omitted.

In step S1149, it is determined whether the retransmission packet transmitted from the image reading apparatus 1201 by asynchronous transfer is not properly received because of the problem on the line or the state of the reception-side node, i.e., whether an error occurs. When the host computer 1214 determines that an error occurs, i.e., a packet is omitted, the flow returns to step S1147. If No in step S1149, the flow advances to step S1150.

In step S1150, it is determined whether all image data are received. If all packets are processed, the sequence of processing C is ended. If NO in step S1150, i.e., if packets to be received still remain, the flow returns to step S1144 to continue reception processing.

In this embodiment, image data transmission using asynchronous transfer and processing responding to error occurrence are selected depending on whether color information is necessary. However, this is merely an example. Even when color information is necessary, retransmission processing for error correction may be omitted on the basis of user determination (selection or setting). In addition, processing may be selected on the basis of an item other than color information. More specifically, packet transmission using the normal isochronous transfer mode, transmission processing using isochronous transfer and also some retransmission in response to error occurrence, which is not defined by the protocol of the IEEE 1394 interface, or packet transmission using asynchronous transfer can be selected by user determination. This user determination (selection) may be set every time an image is to be read, or registered as a default value to skip the processing.

FIGS. 40A to 40D are schematic views showing image data omission states due to error occurrence in the third embodiment.

Figure 40A:
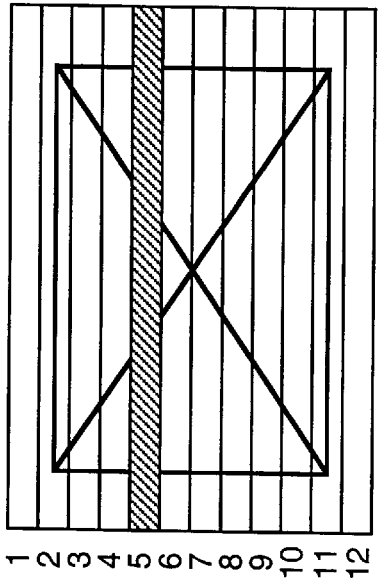
FIGS. 40A to 40D are views showing display examples in image data omission due to an error in the third embodiment.
Figure 40B:
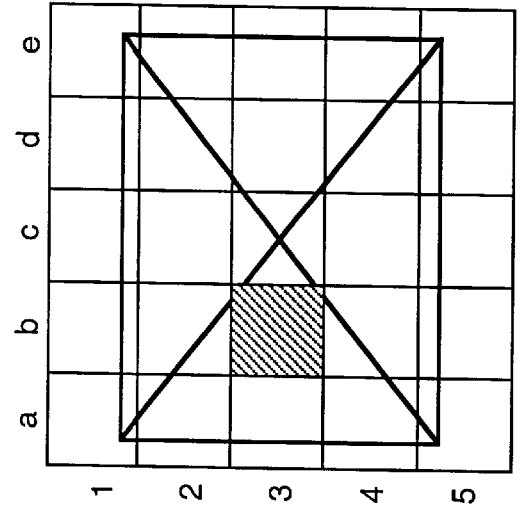
Figure 40C:
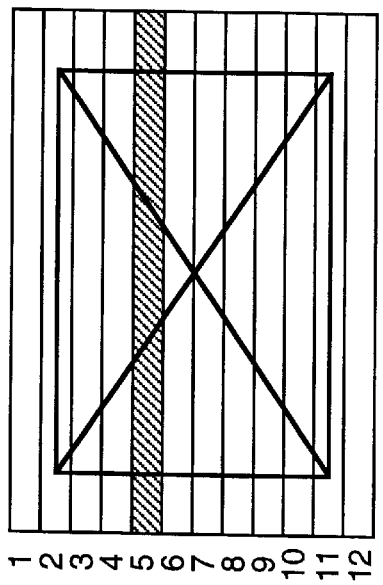
Figure 40D:
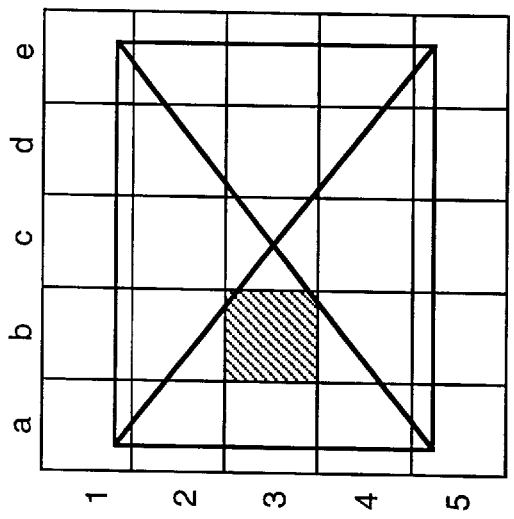

FIGS. 40A and 40C are schematic views of image data read by prescanning. The image data is segmented in accordance with the transmission packet size and transferred to the reception side. In FIG. 40A, the image data is segmented into bands in the subscanning direction. In FIG. 40C, the image data is segmented into blocks in the main scanning and subscanning directions. In FIG. 40A, numbers (1 to 12) are added to identify the segmented bands for the convenience. In FIG. 40C, numbers and letters are added to identify the blocks for the convenience. Halftone-dotted band 5 and block 3b are packets which are not received by isochronous transfer due to an error. When data corresponding to the omitted packet data size is compensated for on the reception side, the prescanned image data is displayed on the reception side as in FIGS. 40B or 40D even without recovery processing such as retransmission. In both cases, although the portion where a band or block is omitted cannot be displayed, the image does not shift due to omission. In FIG. 40B, data with a value "0" is assigned to the position of band 5, so the image does not shift. Although the total number of packets to be received decreases by one, the number of packets to be displayed does not change. In FIG. 40D, although no data is displayed at the position where block 3b is to be displayed, the image does not shift. In this case as well, although the total number of packets to be received decreases by one, the size of image data to be displayed is the same as that of the transmitted image data. As described above, by compensating for packet omission with data corresponding to the size of omitted data, grasp of position information of the image as the original purpose of prescanning can be realized without performing the transmission or read operation again.

Figure 41:
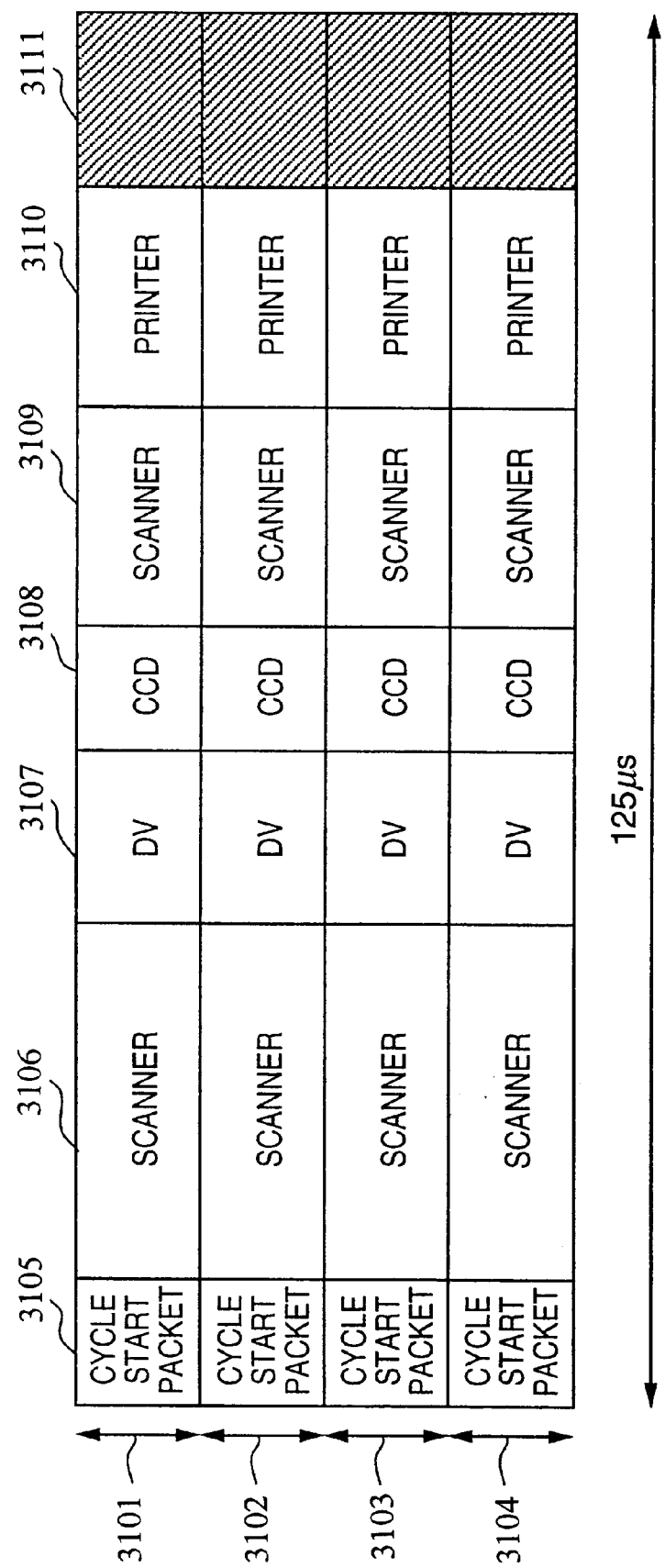
FIG. 41 is a view showing the IEEE 1394 bandwidth in the third embodiment.

FIG. 41 shows an example of IEEE 1394 bandwidths in transmitting prescanned data by isochronous and asynchronous transfer in the third embodiment.

Reference numerals 3101 to 3104 denote frames to be repeatedly generated. The cycle of the IEEE 1394 interface is 125 μsec. Reference numeral S3105 denotes a cycle start packet indicating the start of a frame; and 3106, 3107, and 3108, bandwidths used for isochronous transfer. The data transmitted using the bandwidth 3106 is prescanned image data which requires no color information (i.e., allows data omission to some extent because the purpose of acquiring position information can be achieved). The bandwidth 3107 is used to transfer video data of a DV such as a digital video camera. The bandwidth 3108 is used to transfer moving image data from a CCD camera which is required to construct a TV conference system or the like using PCs. Reference numerals 3109 and 3110 denote bandwidths used for asynchronous transfer. The data transmitted using the bandwidth 3109 is prescanned image data having color information (having information for which no data omission is permitted). In this bandwidth, retransmission in response to error occurrence is performed. The bandwidth 3110 is used to transfer print data for a printer. Reference numeral 3111 denotes an unused bandwidth.

With the above processing and arrangement, the original purposes of prescanning, i.e., conformation of an image to be read and designation of a scanning region (designation of a trimming range) can be satisfied, and the time required for transmission of prescanned image data can be shortened. Especially, when the user is to grasp the position and size of the original or the entire image to be read or designate the trimming range, the above purpose can be achieved without performing retransmission even when a packet is omitted due to error occurrence during packet transfer.

<Fourth Embodiment>

The fourth embodiment of the present invention will be described with reference to the accompanying drawings.

Figure 42:
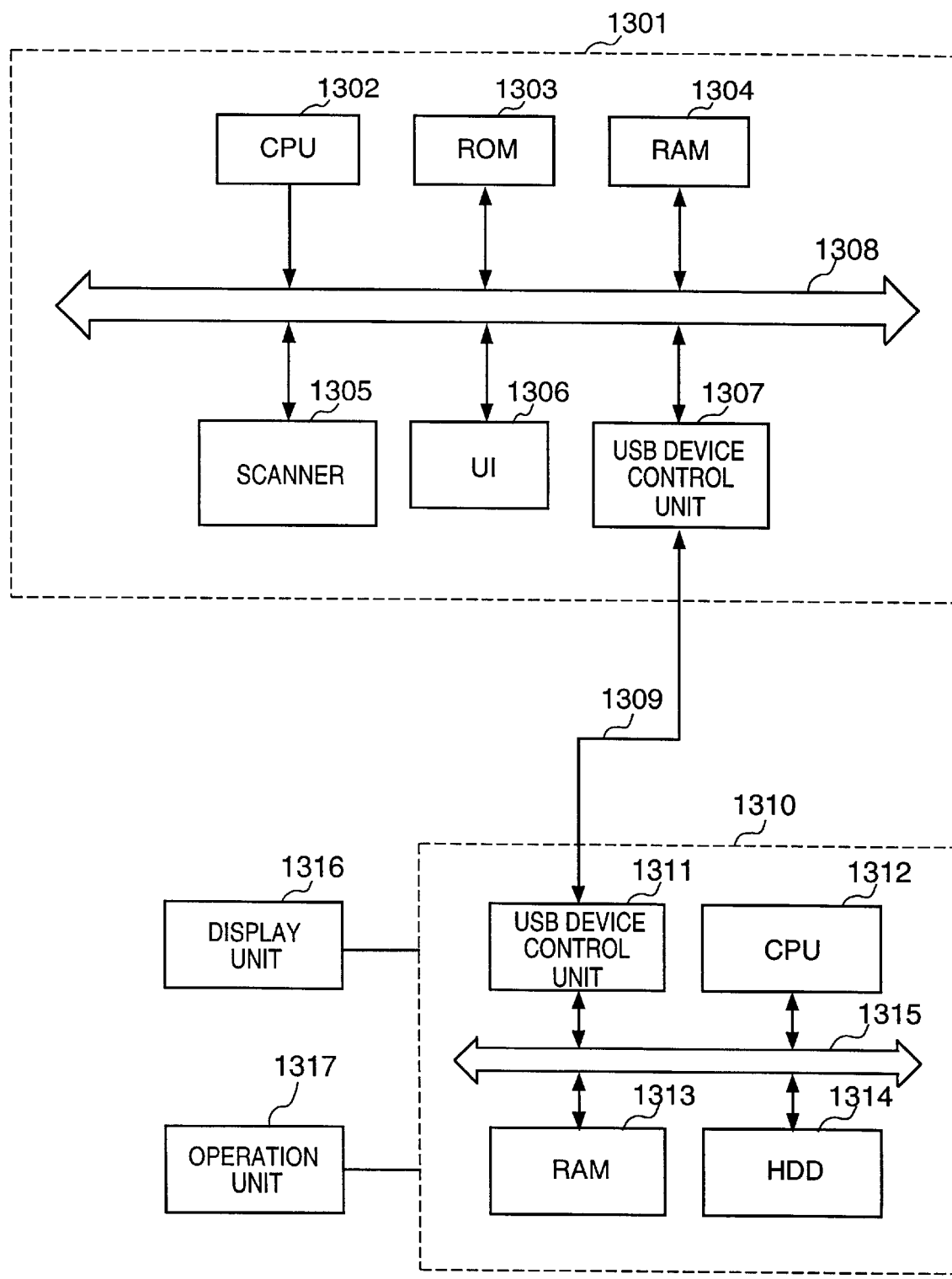
FIG. 42 is a block diagram of an image reading system of the fourth embodiment.

In the fourth embodiment, the IEEE 1394 interface for constituting the system in the third embodiment is replaced with a USB. The arrangement is the same as that of the third embodiment except the block diagrams showing the system configuration and details thereof, and a detailed description of the same parts will be omitted. FIG. 42 is a block diagram showing the arrangement of an image reading system of the fourth embodiment. In FIG. 42, reference numeral 1301 denotes an image reading apparatus main body. The image reading apparatus 1301 is constituted by blocks 1302 to 1308 to be described below and mainly has a scanner function, an image processing function, and a communication function of transmitting image data.

The CPU 1302 controls the entire image reading apparatus 1301 and executes programs for various image processing. The ROM 1303 stores the programs to be executed by the CPU 1302 and various control information. The control information can be updated later by using a flash memory. The RAM 1304 stores data and programs to be used by the CPU 1302, various image data read by the scanner 1305, and generated correction data. The scanner 1305 for reading an original is constituted by a light source used to read the original, a CCD sensor, an A/D converter, an image signal correction circuit, and the like. The detailed description has already been made with reference to FIG. 2, and will be omitted.

The user interface 1306 is used to notify the user of the status of the image reading apparatus 1301 main body or a status in communication or receive a command input from the user. The user interface 1306 is constituted by a display unit for notification and an operation unit for receiving an input. The USB device control unit 1307 controls communication of the USB. The details have been described with reference to FIG. 6. Reference numeral 1308 denotes a system bus on which constituent elements (not shown) other than the blocks 1302 to 1307 of the image reading apparatus 1301 shown in FIG. 42 are also connected, and high-speed data transfer can be performed between the blocks.

A cable 1309 of the USB interface incorporates a total of four cables, i.e., two signal lines and two power supply pair cables.

Reference numeral 1310 denotes a host computer. The USB always requires a host computer to construct the system. In this system configuration, a read request is output to the image reading apparatus (scanner device) 1301, and image data transferred from the image reading apparatus (scanner device) 1301 is received.

A USB device control unit 1311 for controlling communication of the USB has the same function as that of the above-described USB device control unit 1307. A CPU 1312 controls the host computer main body 1310 and executes an application program as one of constituent elements of the scanner reading system. The CPU 1312 also executes the driver of the USB interface.

A RAM 1313 temporarily stores data and programs to be used by the CPU 1312 and various image data transmitted from the scanner device 1301. A hard disk drive 1314 stores the programs to be executed by the CPU 1312, control information, and various image data. Reference numeral 1315 denotes a system bus on which other devices (not shown) are also connected. A display unit 1316 is constituted by a CRT or an LCD connected to the host computer 1310. The display unit 1316 displays transmitted image data or setting in reading.

An operation unit 1317 is constituted by a keyboard or a mouse connected to the host computer 1310. An operation on the application program, e.g., setting various read conditions is performed by the operation unit 1317.

As described above, the fourth embodiment is different from the third embodiment in that the interface is changed from the IEEE 1394 to the USB, correction data generation and various image processing are performed using not the hardware logic (ASIC) but software.

The USB bandwidths are the same as described above with reference to FIG. 16.

In this example, two prescanned image data (image data for isochronous transfer, which has no color information, and image data for bulk transfer, which has color information) are simultaneously transmitted using different bandwidths. However, only one of them can also be transmitted. Alternatively, the data may be stored in the memory and transmitted in response to a request from the user, as needed.

With the above arrangement, the original purposes of prescanning, i.e., conformation of an image to be read and designation of a scanning region (designation of a trimming range) can be satisfied, and the time required for transmission of prescanned image data can be shortened. Since the USB interface has a transfer rate lower than that of the IEEE 1394 interface, the USB interface can be effectively used to effectively use the bus and efficiently transmit image data.

In this embodiment, the image reading apparatus and the host computer are connected. However, the image data generation source is not limited to the image reading apparatus such as an image scanner. For example, image data may be stored in a predetermined storage medium and transferred to the host computer. A digital camera or the like corresponds to this arrangement.

As described above, according to the third and fourth embodiments, the following effects can be obtained.

The original purposes of prescanning, i.e., conformation of an image to be read and designation of a scanning region (designation of a trimming range) can be satisfied, and the time required for transmission of prescanned image data can be shortened.

Even when data omission occurs due to an error occurring during prescanned image data transfer, the prescanning image can be displayed on the reception side in accordance with the purpose without performing retransmission.

Even when isochronous transfer is used to transfer image data such as color information or scanned image data for which no data omission is permitted, a transfer mode in which retransmission is performed in response to error occurrence during data packet transmission is used to realize reliable high-speed data transfer.

The size of a packet to be transferred is determined on the reception-side node such that the constant multiple of the main scanning direction data length of the prescanning image to be displayed matches the data length of the packet or a multiple of the data length of the packet by a predetermined number matches the main scanning direction data length of the prescanning image to be displayed. With this arrangement, the load on displaying the prescanned image data or interpolation processing in response to data omission on the reception side is decreased, and the total processing time can be shortened.

As described above, as the first effect of the third and fourth embodiments, when the contents of an image from the image scanner or an image data generation source are to be confirmed, high-speed transfer is performed. Even when an error occurs during transfer, the influence on the layout of the entire image can be eliminated.

As the second effect, the image read by the image scanner or image data from an image data generation source is transferred at a high speed, and even when an error occurs during transfer, only data with the error is transferred in a transfer mode having retransmission, thereby guaranteeing both high-speed transfer and high image quality.

<Fifth Embodiment>

In the third and fourth embodiments, when an error occurs during packet transfer of prescanned image data through the IEEE 1394 interface or USB interface, the omitted packet is compensated for on the reception side (host computer) to prevent a shift in the image. Although the layout of the entire image is correct, the image portion corresponding to the error packet is kept omitted, so the image of the portion cannot be known.

The fifth embodiment solves this problem. In this embodiment as well, an IEEE 1394 interface is used as a communication interface. The connection relationship between the image reading apparatus and the host computer and the arrangements of these parts are almost the same as those in FIG. 29. Only different portions will be described below.

Figure 44:
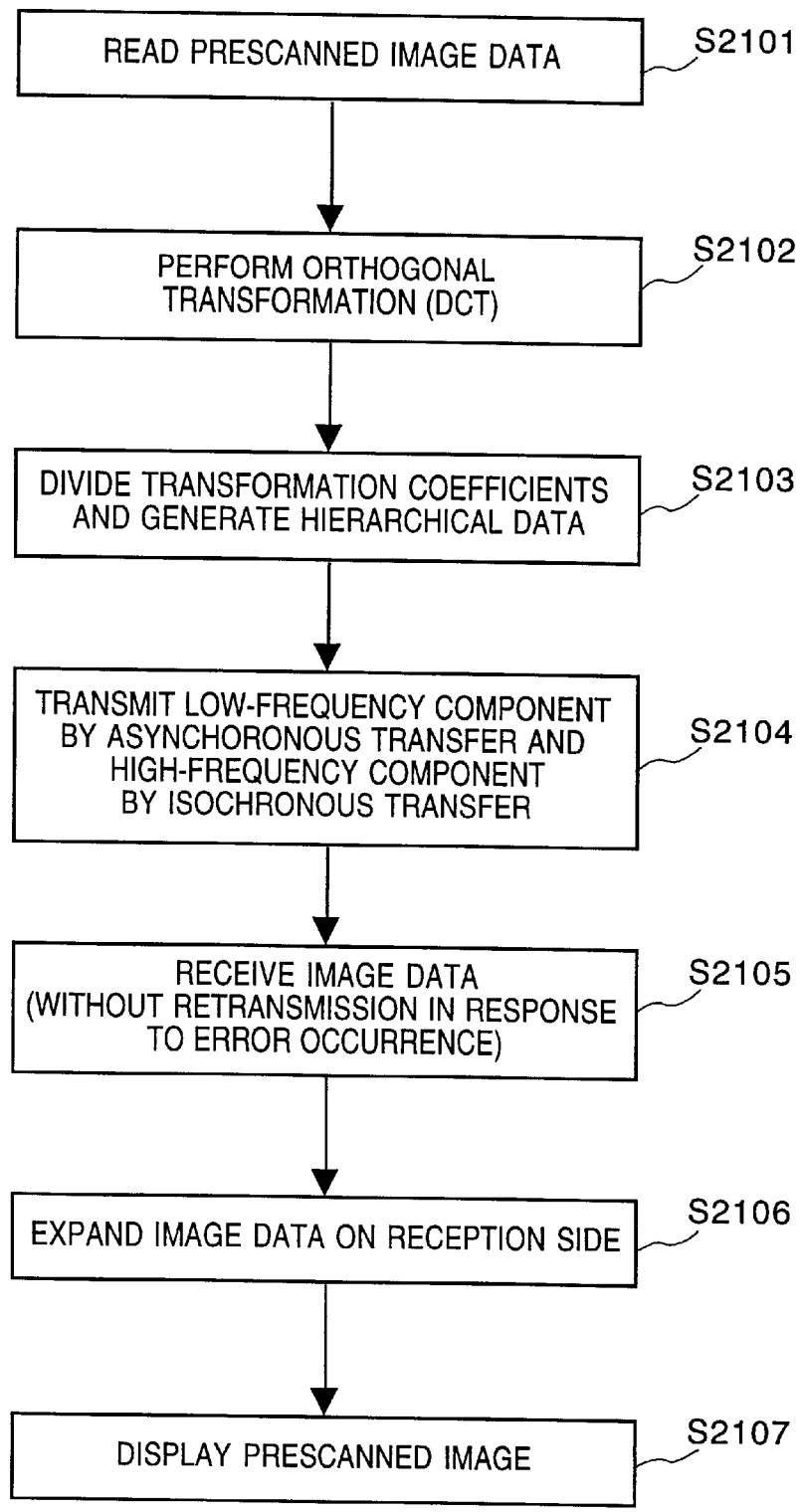
FIG. 44 is a flow chart showing the operation of the entire system of the fifth embodiment.

FIG. 44 is a flow chart showing the operation of the entire system of the fifth embodiment of the present invention.

In step S2101, prescanned image data is read. In step S2102, the read image data is subjected to orthogonal transformation (DCT transformation) in units of pixel blocks each having, e.g., 8×8 pixels, thereby obtaining 64 transformation coefficients. In step S2103, the transformation coefficients obtained in step S2102 are zigzag-scanned. At this time, hierarchical image data is generated along the scanning direction from a lower frequency component in each of the horizontal and vertical directions. Since pixel blocks each having 8×8 pixels are subjected to DCT transformation, a total of 64 hierarchical image data (hierarchical planes) are generated. Image data having only a DC component and image data having an AC component with a relatively low frequency will be referred to as low-resolution low-tone hierarchical data hereinafter.

In step S2104, the image data generated in step S2103 are sequentially transmitted to the reception side in ascending order of frequency. Low-resolution low-tone hierarchical data are transmitted to the reception side using an asynchronous transfer mode as a transfer mode in which retransmission is performed at least in response to error occurrence. Most remaining image data are transferred using the isochronous transfer mode.

In step S2105, the transmitted image data is received on the reception side. The low-resolution low-tone hierarchical data are properly received because they are transmitted in the asynchronous transfer mode. Most remaining packets are transmitted by isochronous transfer, so no retransmission request is output even when it is determined that an error occurs.

In step S2106, the received image data is expanded (inverse DCT transformation) In step S2107, the expanded prescanned image data is displayed on the image display device.

With this procedure, even when certain hierarchical image data is omitted due to an error occurring during prescanned image data transfer, the image data necessary in prescanning can be obtained without retransmitting the omitted data because the remaining hierarchical data are received. In addition, by using the mode (asynchronous transfer) for guaranteeing proper data transfer to transfer the low-resolution low-tone hierarchical data, image data having resolution and tone as minimum requirements for display of the prescanning image can be properly obtained.

The above processing will be described in more detail with reference to FIG. 55.

The original image data obtained by reading the original image is subjected to DCT transformation in units of blocks each having 8×8 pixels. The upper left coefficient D00 in the 8×8 matrix of the DCT-transformed data as the transformation result has a DC component, and the remaining coefficients have AC components. There are 64−1=63 AC components, and the frequency rises toward the lower right side. In this case, it is assumed that the frequency of the AC component rises along the zigzag arrow in FIG. 55.

Figure 55:
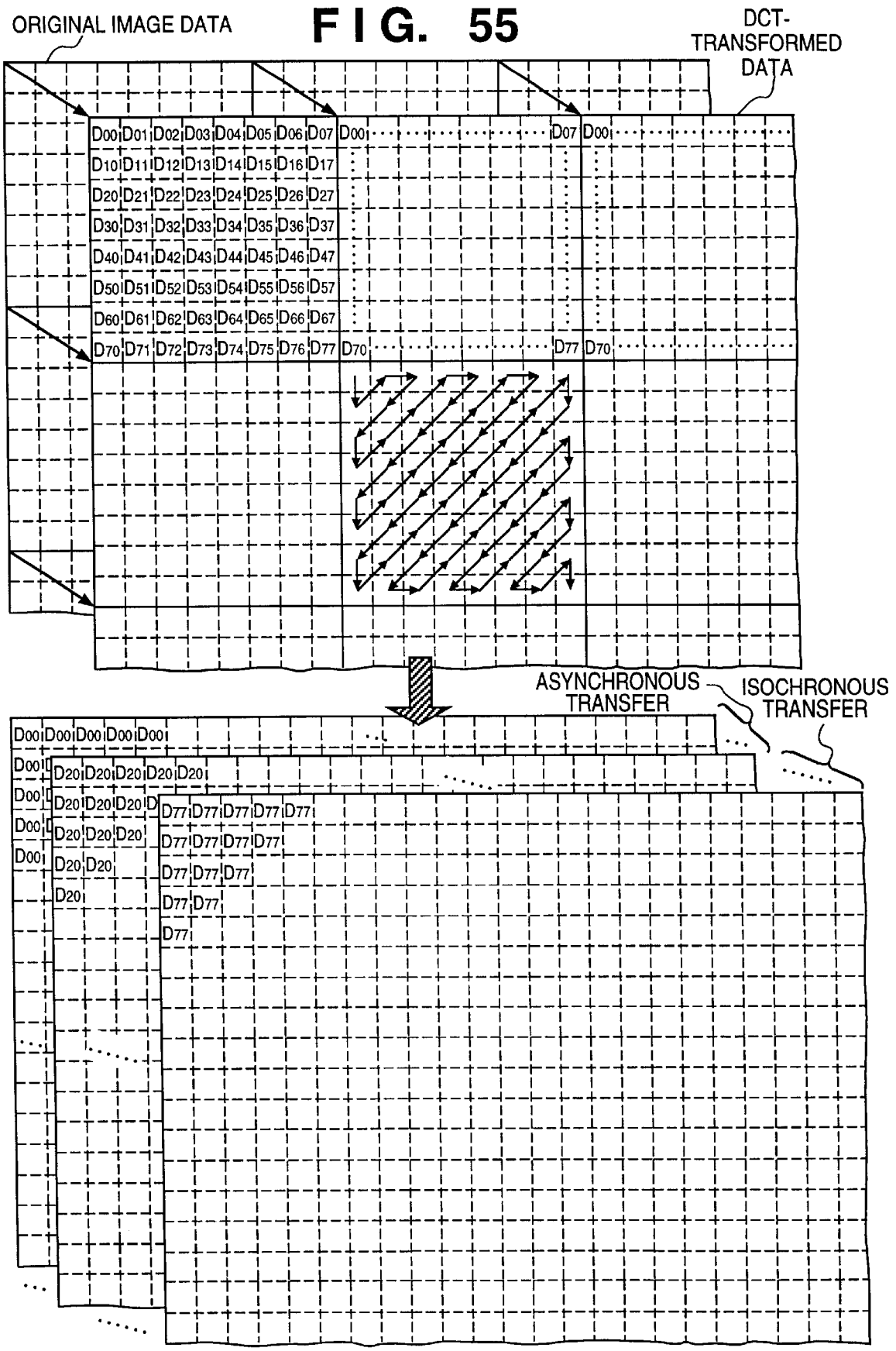
FIG. 55 is a view showing construction of the contents of transmission data in the fifth embodiment.

In this embodiment, as shown in FIG. 55, a plane having only the coefficient D00, a plane having only the coefficient D01, . . . , and finally, a plane having only the coefficient D77 are defined. The plane data with the coefficients D00, D10, D01, D02, D11, and D20 are transferred using the transfer mode for guaranteeing proper transfer (e.g., the asynchronous transfer mode of the IEEE 1394 ). The remaining plane data are transferred in the transfer mode with priority on band (e.g., the isochronous transfer mode).

Consequently, data which largely influence the image quality (the DC component and some low-frequency AC components in the DCT-transformed data) are transferred in the mode for guaranteeing the data. Even when some packets of high-frequency component data are omitted during transfer, the influence on the entire image is minimized. Therefore, a quality sufficient to confirm the original image in prescanning can be guaranteed.

The boundary between the two transfer modes can be freely set by the user of the device (e.g., the host computer) on the image data reception side. This setting is made using, e.g., a graphical user interface (for example, a button freely movable between the maximum quality and maximum speed of prescanning is prepared) on the MS-Windows as an OS available from Microsoft in U.S.A. The set contents are sent to the original reading apparatus. This user interface is provided as a so-called driver for receiving image data from the image reading apparatus.

A detailed arrangement and operation for realizing the above processing will be described below.

The block diagram showing the arrangement of the image reading system of the fifth embodiment is the same as in FIG. 29 described above in the third embodiment, and a detailed description thereof will be omitted.

Figure 45:
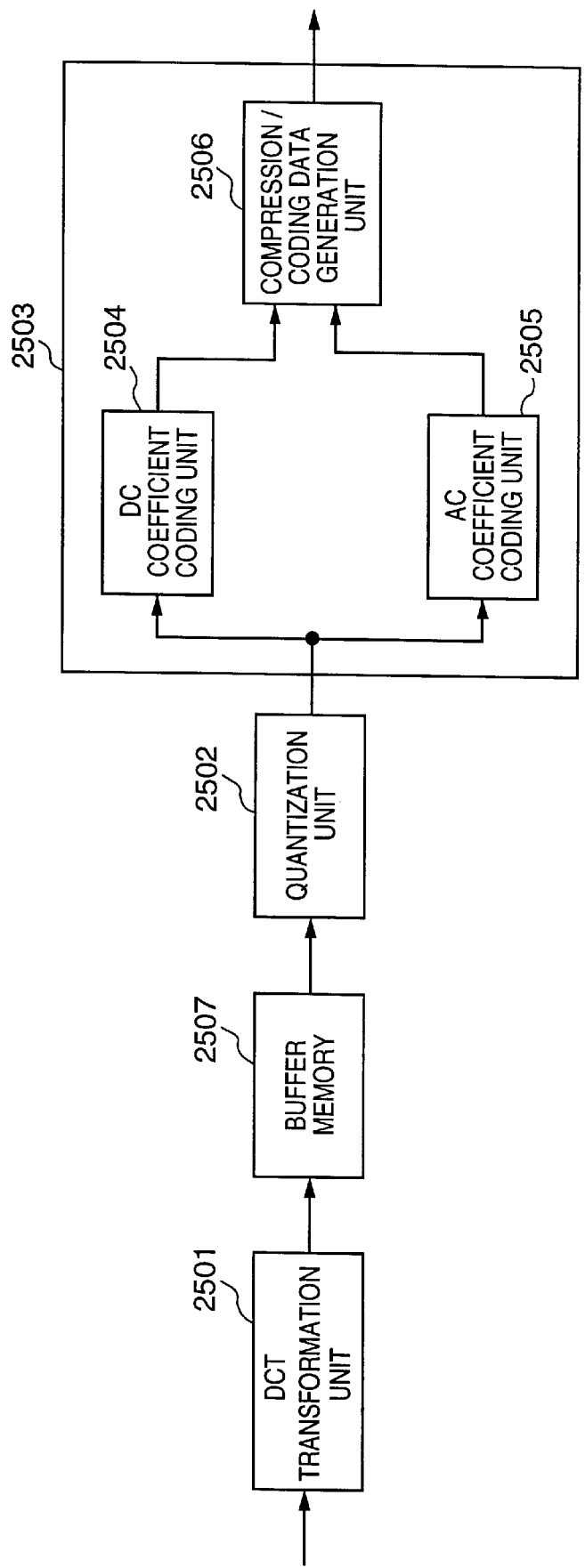
FIG. 45 is a block diagram showing the arrangement of compression processing in the fifth embodiment.

FIG. 45 is a block diagram showing the arrangement of a compression processing unit in the fifth embodiment. The compression processing unit is included in an image processing unit 1209.

An orthogonal transformation unit 2501 performs DCT transformation. The orthogonal transformation unit 2501 receives image data read by a scanner unit 1205 and two-dimensionally DCT-transforms the image data in units of blocks each having 8×8 pixels to obtain transformation coefficients as a result. A color image is transformed in units of colors (e.g., for each of R, G, and B). A buffer memory 2507 has a capacity for storing DCT-transformed image data of one page. The data stored in the buffer memory is the above-described DCT-transformed data shown in FIG. 55.

A quantization unit 2502 linearly quantizes data of each component of the two-dimensional DCT data stored in the buffer memory 2507. The input transformation coefficient is converted into the closest integer. Reference numeral 2503 denotes a Huffman coding unit. The Huffman coding unit 2503 is constituted by a DC (Direct Current) coefficient coding unit 2504, an AC (Alternating Current) coefficient coding unit 2505, and a compression/coding data generation unit 2506, all of which will be described below.

The DC coefficient coding unit 2504 is a coding unit for a direct current (DC) coefficient and outputs DC coefficient coding data obtained on the basis of a group number code and load bit data obtained by Huffman coding.

The AC coefficient coding unit 2505 is a coding unit for an alternating current (AC) coefficient. The AC coefficients are one-dimensionally arrayed by zigzag scanning, segmented into hierarchical planes (or bands) of a plurality of AC components having the same frequency, and output.

The compression/coding data generation unit 2506 edits the DC coefficient coding data and the AC coefficient coding data to generate compressed/coded data. Compressed image data is generated in units of bands (hierarchical planes).

The fifth embodiment is based on progressive coding of a spectrum selection (s-s) scheme. However, the same effect as described above can be obtained even with a continuous approximation (s-a) scheme.

In the fifth embodiment, the control procedure on the image data transmission side is the same as that in the third embodiment described with reference to FIG. 31.

Figure 46:
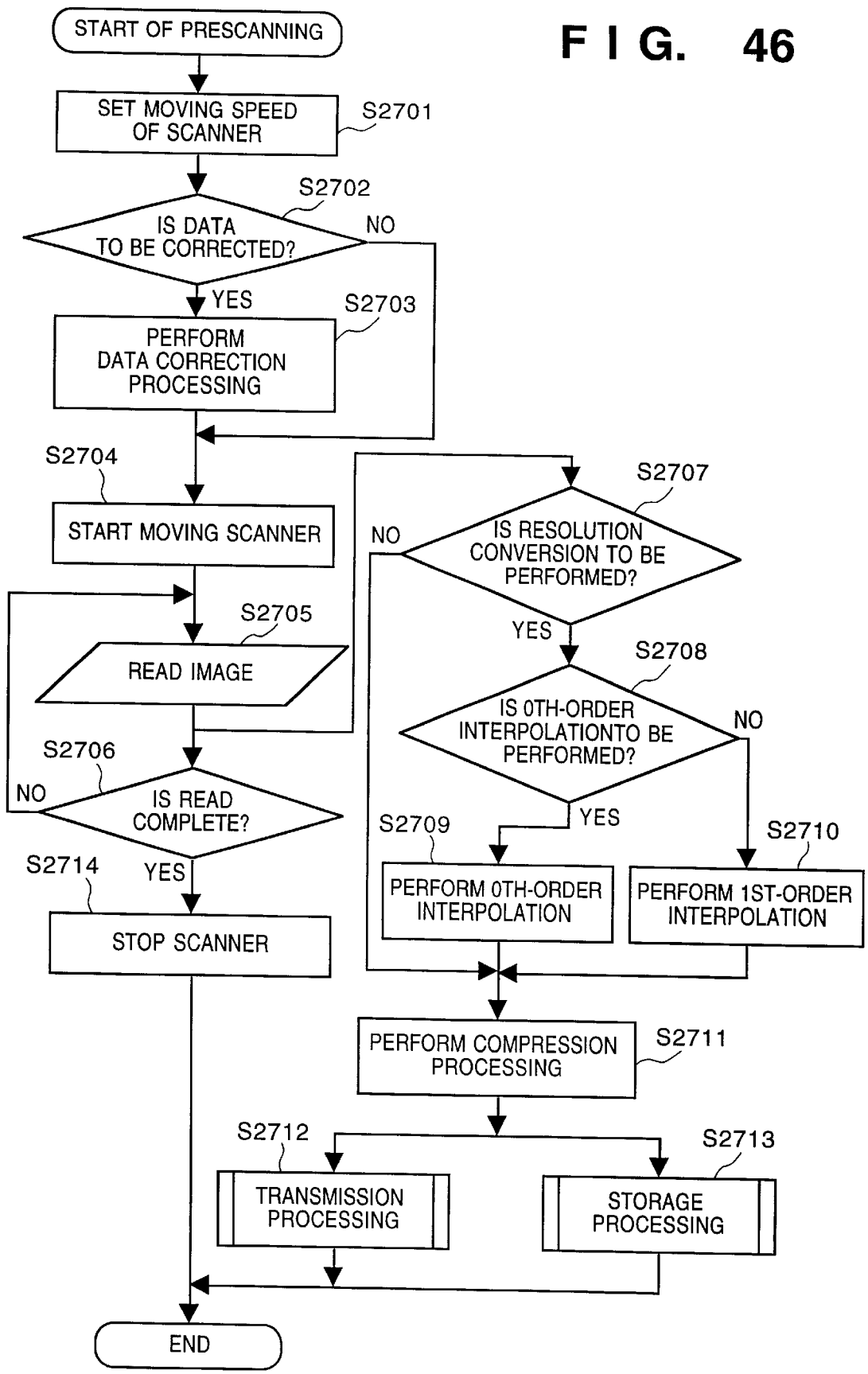
FIG. 46 is a flow chart showing the procedure of prescanning in the fifth embodiment.

FIG. 46 is a flow chart showing the procedure of prescanning (step S1503 in FIG. 31) in the fifth embodiment.

In step S2701, the moving speed of the scanner is set. Since the image reading apparatus uses a line sensor, a scanner device 1302 is moved in the subscanning direction by controlling a driving unit 1301, thereby obtaining a desired resolution.

In step S2702, it is determined whether the image data is to be corrected using correction data for prescanning. If YES in step S2702, the setting for correction is performed in step S2703. If NO in step S2702 (if default setting is not changed), the flow advances to step S2704.

In step S2703, the correction data is set. With this processing, the original read position and input level are set. The setting for correction of the color or density is also made, as needed.

In step S2704, a signal is transmitted to the driving unit 1201 to start moving the scanner.

In step S2705, the image is read. Simultaneously, the read image data is transmitted to a host computer 1214 or stored in the storage medium in the image reading apparatus 1201. These processing operations may be performed serially or in parallel depending on the arrangement.

In step S2706, it is determined whether the image is completely read. If YES in step S2706, the flow advances to step S2709. If NO in step S2706, the flow returns to step S2705 to continue read processing.

In step S2707, it is determined whether the resolution is to be converted. If YES in step S2707, the flow advances to step S2708. If NO in step S2707, the flow advances to step S2711.

In step S2708, it is determined whether 0th-order interpolation (simple thinning) is to be selected as resolution conversion processing. If YES in step S2708, the flow advances to step S2709. If NO in step S2708 (if another resolution conversion processing is to be performed), the flow advances to step S2710.

In step S2709, 0th-order interpolation (simple thinning) is performed as resolution conversion processing.

In step S2710, 1st-order interpolation (linear interpolation) is performed as resolution conversion processing.

In step S2711, the transformation coefficients obtained by DCT transformation are segmented into a plurality of hierarchical planes and subjected to compression/coding processing by Huffman coding, as described above with reference to FIG. 45.

In step S2712, transmission processing of transferring the read image data to the host computer 1214 is performed. Details will be described later with reference to FIG. 47.

In step S2713, storage processing of storing the read image data is performed. Details are the same as in FIG. 35, and a description thereof will be omitted.

In step S2714, the scanner is stopped. The scanner is driven simultaneously with transmission to the host or storage in the memory, as described above.

This embodiment uses three modes for transferring an image to the host computer: a mode (first mode) for transferring the entire image data by isochronous transfer, a mode (second mode) for transferring the entire image by asynchronous transfer, and a mode (third mode) for transferring the image data using both the first and second modes. As the characteristic feature of this embodiment, image data is transferred using the third mode, i.e., both isochronous transfer and asynchronous transfer. A mode to be used is selected in accordance with an instruction from the host computer.

Figure 47:
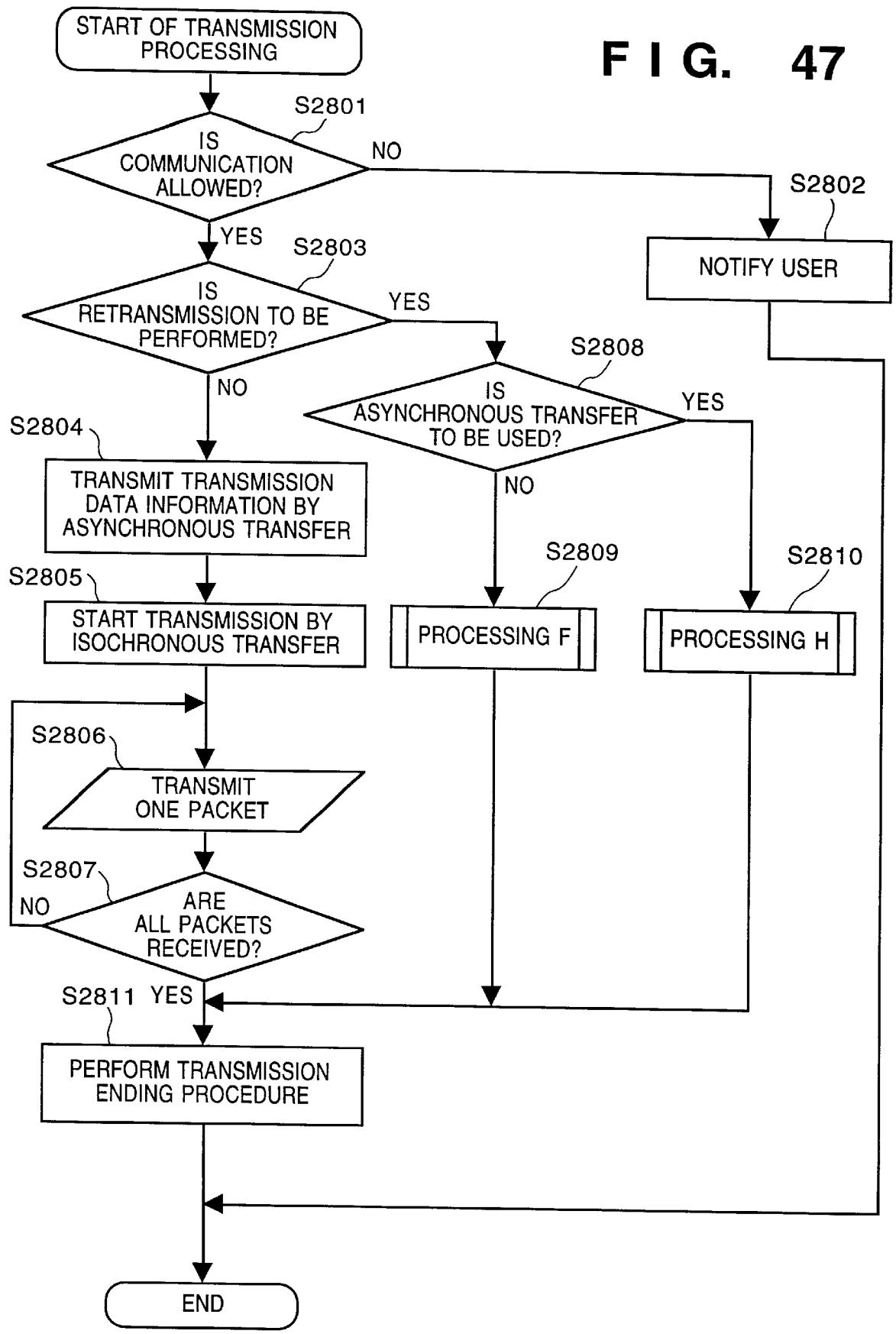
FIG. 47 is a flow chart showing the procedure of transmission processing in the fifth embodiment.

The operation procedure in the fifth embodiment will be described with reference to the flow chart of FIG. 47. Prior to the description, assume that the transfer mode to be used to transfer the prescanned image has already been instructed from the host computer.

In step S2801, it is determined whether the image data can be transmitted to the host computer 1214. If YES in step S2801, the flow advances to step S2803. If NO in step S2801, the flow advances to step 2802.

In step S2802, the user is notified through a user interface 1210 of the image reading apparatus 1201 that image data cannot be transmitted to the host computer 1214.

In step 52803, it is determined whether packet retransmission is to be performed in response to error occurrence or the first mode is selected.

If it is determined that one of the second and third modes with packet retransmission is selected, the flow advances to step S2808. If NO in step S2803, i.e., if the first mode is selected, the flow advances to step S2804.

In step S2804, transmission data information (the image data size, the total number of packets, and the packet size) is transmitted to the host computer 1214 using asynchronous transfer in which retransmission is performed in response to error occurrence.

In step S2805, processing of transmitting coded data of each hierarchical plane of the prescanned image data in the isochronous transfer mode is started.

In step S2806, the image data is transmitted to the host computer 1214 in units of packets by isochronous transfer.

In step S2807, it is determined whether all image data are transmitted. If all packets are processed, the flow advances to step S2811. If NO in step S2807, i.e., if packets to be transmitted still remain, the flow returns to step S2806 to continue transmission processing. Since isochronous transfer is used for transfer, the number of packets which have been transmitted (or the number of remaining image data) need not be counted every time one packet is transmitted. In addition, even when all packets are transferred, the host computer 1214 need not be notified of it. Although no packets are transmitted after transfer is complete, the band assigned for isochronous transfer does not change.

As the characteristic feature of processing from step S2804 to step S2807, the isochronous transfer without retransmission is used to transfer the prescanned image. With this arrangement, after the band for isochronous transfer is ensured in IEEE 1394 bus configuration, a predetermined band can always be used, and therefore, the time required to transfer the image to the host computer 1214 can be shortened.

On the other hand, when the flow advances to step S2808, since a transfer mode with retransmission is to be performed, it is determined whether the isochronous transfer mode is to be used to transfer the image, i.e., whether the third mode is selected. If YES in step S2808, the flow advances to step S2810. If NO in step S2808, i.e., if only the asynchronous transfer is to be used, the flow advances to step S2809.

In step S2809, image data transfer processing F using asynchronous transfer (second mode) is performed (the processing contents have already been described with reference to FIG. 35). In step S2810, image data transfer processing H using both isochronous transfer and asynchronous transfer is performed (the processing contents will be described later with reference to FIG. 48). When one of these processing operations is complete, the procedure of ending transmission is performed in step S2811.

Image data transfer using asynchronous transfer (second mode) has been described with reference to FIG. 35. The third mode will be described below.

Image data transfer processing using both asynchronous transfer and isochronous transfer (third mode) will be described with reference to FIG. 48.

In step S2817, in the image data segmented into a plurality of hierarchical planes in compression/coding processing, hierarchical image data to be transmitted in the transfer mode with retransmission are set. More specifically, when the images of hierarchical planes are to be sequentially transmitted from the DC component toward a component with a higher frequency, a boundary between hierarchical plane data to be transmitted in the asynchronous transfer and those to be transmitted in the isochronous transfer mode is set. This boundary is determined in accordance with an instruction from the host computer, as described above.

In step S2818, processing of transmitting the prescanned image data in the isochronous transfer mode is started (the band is ensured).

In step S2820, the hierarchical number set in step S2817 is compared with the hierarchy of image data to be currently transmitted. When the comparison result reveals that the hierarchy of the packet data to be currently transmitted is lower (the frequency is lower), the flow advances to step S2821. If the hierarchy is higher than the set value (the frequency is higher), the flow advances to step S2819 to transmit the image data to the host computer 1214 in units of packets by isochronous transfer.

In step S2821, the packet is transmitted using the asynchronous transfer mode.

In step S2822, it is determined whether the packet transmitted by asynchronous transfer is not properly received because of the problem on the line or the state of the reception-side node, i.e., whether an error occurs. If YES in step S2822, the flow advances to step S2823. If No in step S2822 (if transfer is successfully complete), the flow advances to step S2824.

In step S2823, retransmission is performed in response to error occurrence, and the flow returns to step S2822.

In step S2824 it is determined whether all image data are transmitted. If all packets are processed, the sequence of processing H is ended. If NO in step S2824, i.e., if packets to be transmitted still remain, the flow returns to step S2820 to continue transmission processing.

As the characteristic feature of processing H (third mode), the isochronous transfer mode without retransmission is used to transfer the prescanned image, and data having a low frequency in the hierarchical compressed/coded data is transferred using the asynchronous transfer mode.

Consequently, DC component data and AC component data having a low frequency, which have a large influence on the image quality, are guaranteed. Therefore, even when an error occurs in transfer of a high-frequency component packet, a quality sufficient to confirm the prescanning image can be ensured.

Figure 48:
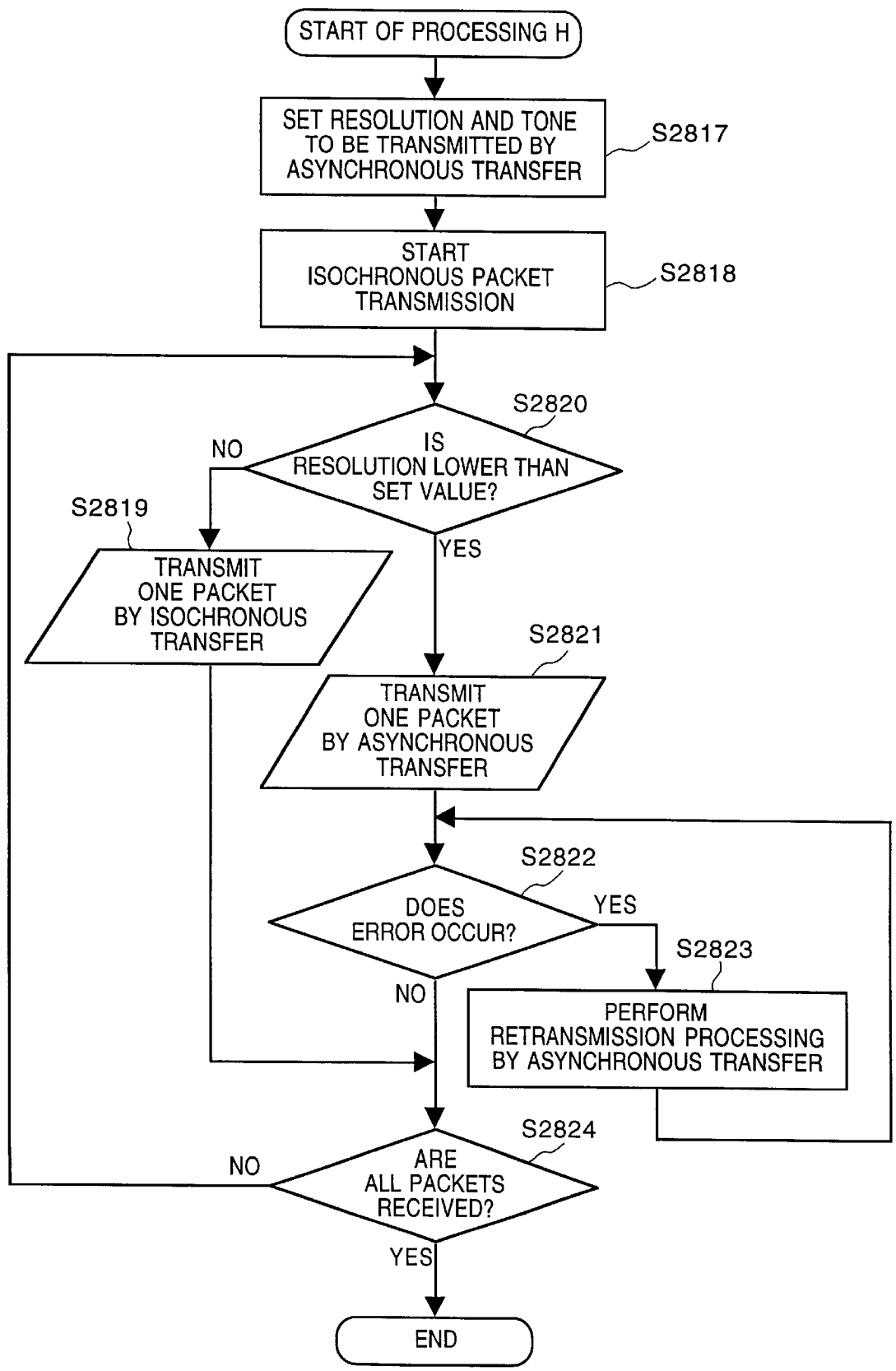
FIG. 48 is a flow chart showing the procedure of processing H in FIG. 47.

In processing shown in FIG. 48, one of asynchronous transfer and isochronous transfer is selected. However, the procedure shown in FIG. 50 may be used.

Figure 49:
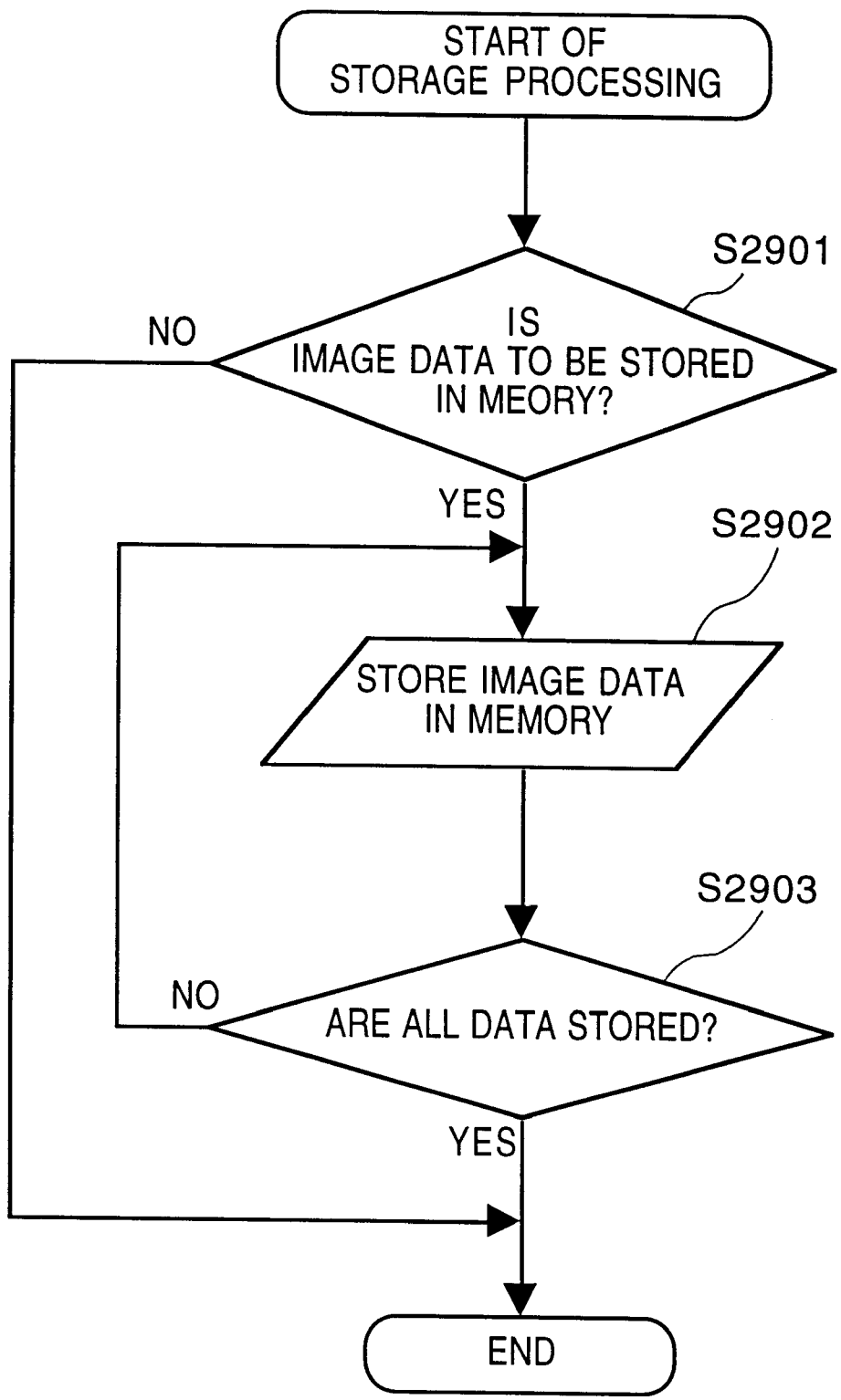
FIG. 49 is a flow chart showing the procedure of storage processing in the fifth embodiment.
Figure 50:
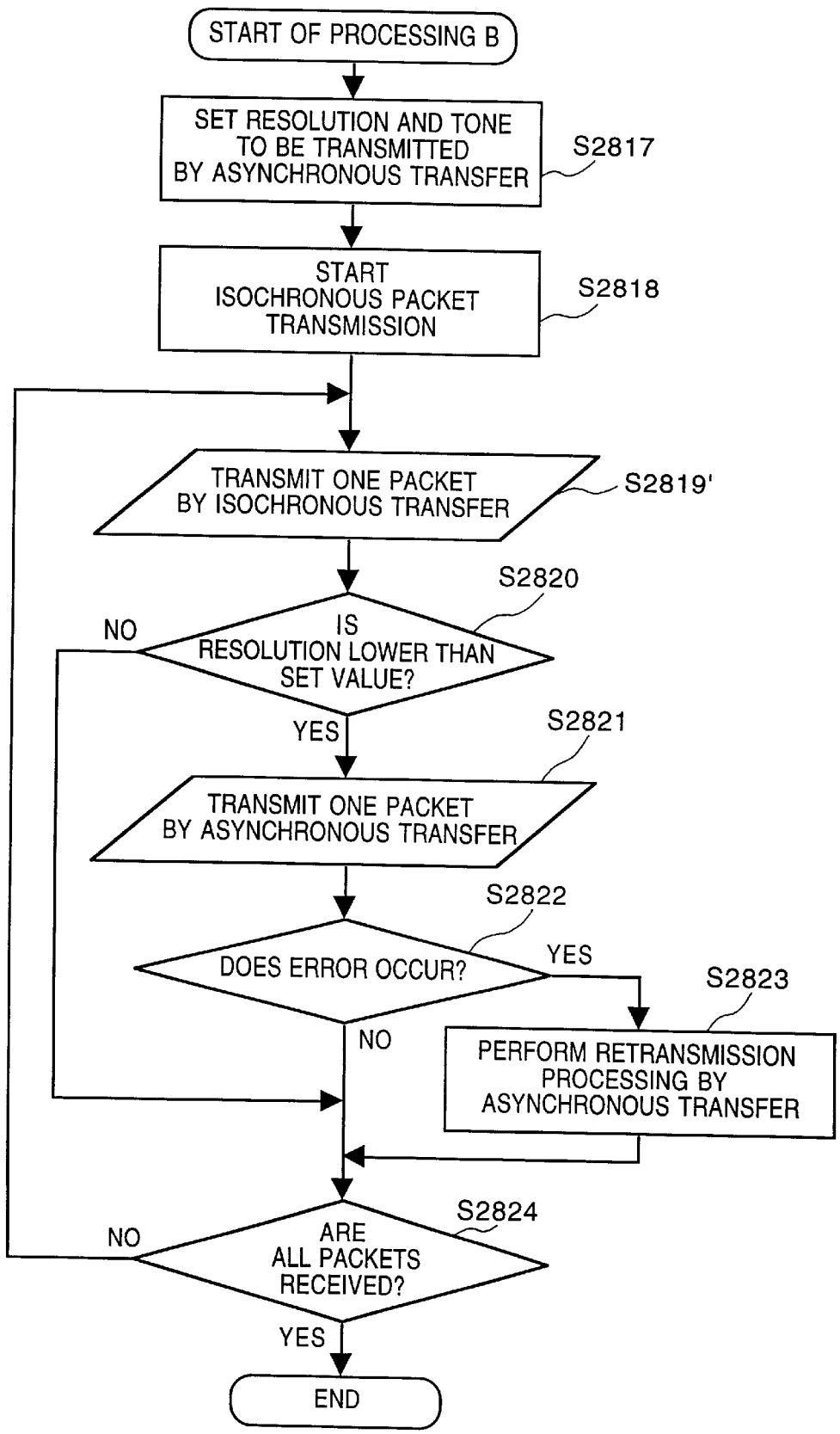
FIG. 50 is a flow chart showing another example of processing in FIG. 48.

FIG. 50 is different from FIG. 48 in that isochronous transfer (step S2819') is performed immediately before step S2820. More specifically, both isochronous transfer and asynchronous transfer are used to transfer a low-frequency component in the DCT-transformed data. In this case, the reception side receives both the isochronous packet and the asynchronous packet and basically uses the packet in the isochronous transfer mode. However, when an error occurs, the packet in the asynchronous transfer mode is used. FIG. 49 is a flow chart showing the procedure of storage processing (corresponding to FIG. 37) in the fifth embodiment.

In step S2901, it is determined whether the image data is to be stored in a RAM 1204. If YES in step S2901, the flow advances to step S2902. If NO in step S2901, storage processing is ended. In step S2902, the read data is stored in the memory 1204. Processing in step S2902 is performed until it is determined in step S2903 that all image data are stored in the memory 1204.

With this processing, even when a retransmission request is received from the host computer 1214, the image data can be transmitted without reading the image again. That is, the processing time can be shortened. Whether the image data is to be stored is determined in accordance with an instruction command from the host computer.

The procedure of correction data generation processing in the fifth embodiment is the same as that shown in FIG. 38.

The processing contents of scanning are the same as in FIG. 39. That is, processing F and processing G in FIG. 39 are the same as those described with reference to FIGS. 35 and 36.

FIGS. 51A and 51B are flow charts showing the control procedure on the reception side (host computer side) in the fifth embodiment.

In step S21201, items of the read request are set. More specifically, the image reading apparatus 1201 is instructed to perform the origina l read operation, and simultaneously, various items, i.e., whether the image read operation is prescanning or scanning, the resolution, the necessity of retransmission in response to error occurrence, the transfer mode, and the like are set.

In step S21202, the request items set in step S21201 are transmitted to the image reading apparatus 1201 by asynchronous transfer. If the transmitted request items are not properly received on the image reading apparatus side, retransmission is performed in accordance wit h the IEEE 1394 protocol to properly transfer the request items.

In step S21203, it is determined whether the requested read operation is prescanning. If YES in step S21203, the flow advances to step S21204. If NO in step S21203, the flow advances to step S21208.

In step S21204, it is determined whether retransmission is to be performed in response to error occurrence in prescanning. If YES in step S21204, the flow advances to step S21205. If No in step S21204, the flow advances to step S21206.

Figure 52:
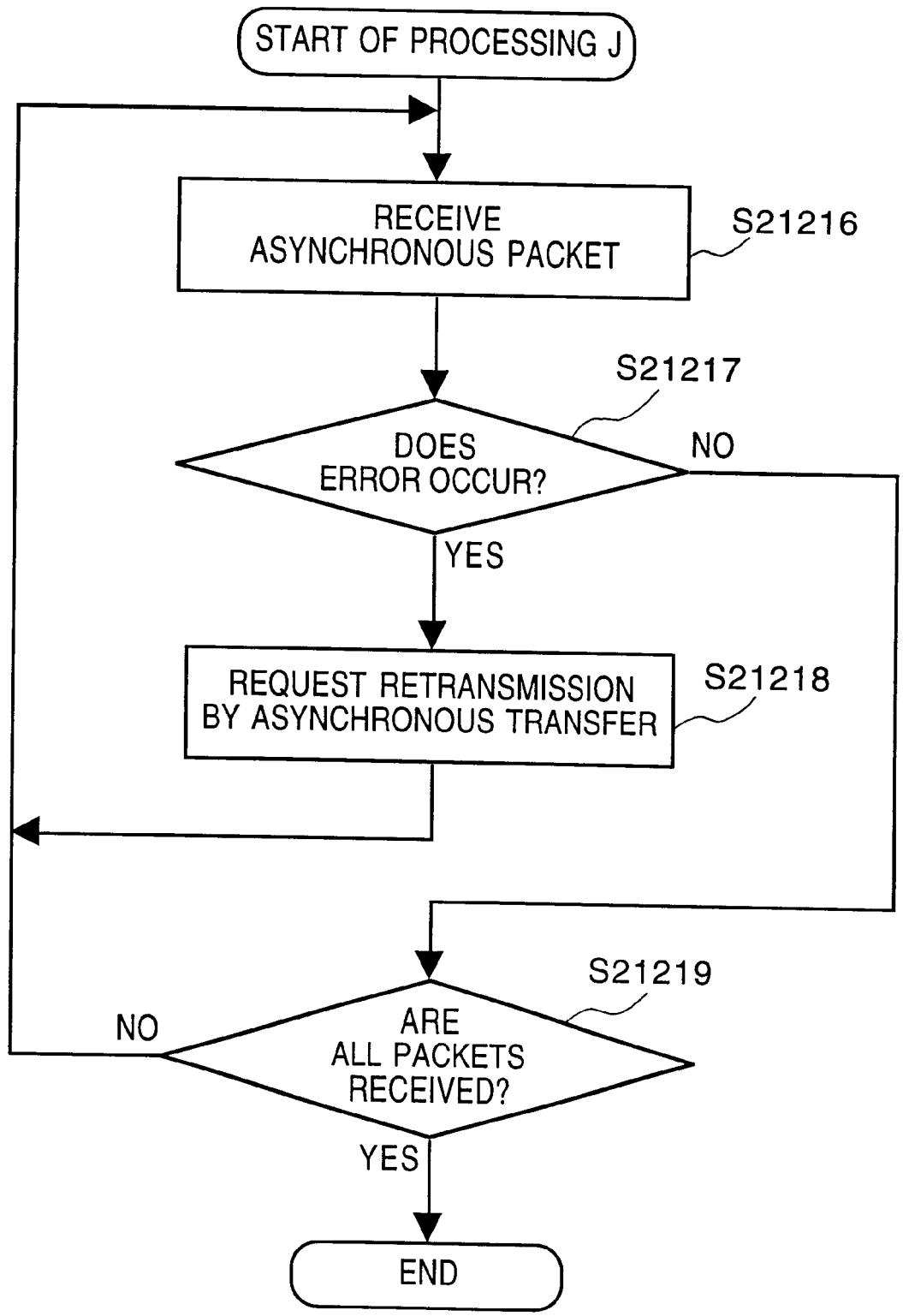
FIG. 52 is a flow chart showing the procedure of processing J in FIGS. 51A and 51B.

In step S21205, image data transfer processing J using asynchronous transfer is performed (the processing contents will be described later with reference to FIG. 52).

If retransmission is not to be performed, the flow advances from step S21204 to step S21206 to receive the transmission data information transferred from the image reading apparatus 1201 in the isochronous transfer mode. When an error occurs on the line or during reception, a retransmission request is output to properly acquire the information. In step S21207, image data transfer processing K using isochronous transfer is performed (the processing contents will be described later with reference to FIG. 53).

For scanning, the flow advances to step S21208 to determine whether the isochronous transfer mode is to be used to transfer scanned image data. If YES in step S21208, the flow advances to step S21210. If NO in step S21208, i.e., if the asynchronous transfer mode is to be used, the flow advances to step S21209.

Step S21209 corresponds to step S2809 (the flow chart of FIG. 25) described above, and a detailed description thereof will be omitted.

In step S21210, image data transfer processing L using isochronous transfer is performed. The processing contents will be described later with reference to FIG. 54.

When the coded image data is received, the flow advances to step S21211 to determine whether the compressed data is to be expanded. If YES in step S21211, the flow advances to step S21212. If NO in step S21211, the flow advances to step S21213.

In step S21212, the compressed image data is expanded.

In step S21213, the received image data is stored. In this flow chart, the storage processing is performed after all image data are received. In fact, the storage operation is performed every time a packet is received. Although not illustrated, when the compressed image data is stored without being expanded, the image data must be subjected to expansion processing in step S21212 before display.

In step S21214, the received image data is displayed on a display unit 1220. More specifically, processing reverse to that on the transmission side is performed. The 8×8 DCT-transformed data is reconstructed on the basis of the coefficients of the expanded hierarchical planes, subjected to inverse DCT transformation, and then displayed (developed on the VRAM).

With this processing, the user can obtain information and materials for determining whether the read image is a desired image, the read position is correct, or the image has an appropriate color and density.

In step S21215, it is determined whether another image read request is output. If YES in step S21215, processing from step S21201 is repeated. If NO in step S21215, processing associated with image reading is ended.

Processing J of performing image data reception using asynchronous transfer will be described next with reference to FIG. 52.

In step S21216, processing of receiving the prescanned or scanned image data in the asynchronous transfer mode is started.

In step S21217, it is determined whether the packet transmitted from the image reading apparatus 1201 is not properly received because of the problem on the line or the state of the reception-side node, i.e., whether an error occurs. If YES in step S21217, the flow advances to step S21218. If NO in step S21217 (if transfer is successfully complete), the flow advances to step S21219.

In step S21218, a retransmission request based on the asynchronous transfer mode is output to the image reading apparatus 1201 in accordance with the IEEE 1394 protocol in response to error occurrence. With this processing, all packets can be transmitted without data omission. The flow returns to step S21216 to receive the retransmitted packet.

In step S21219, it is determined whether all image data are transmitted. If all packets are processed, the sequence of processing D is ended. If NO in step S21219, i.e., if packets to be transmitted still remain, the flow returns to step S21216 to continue reception processing.

Figure 53:
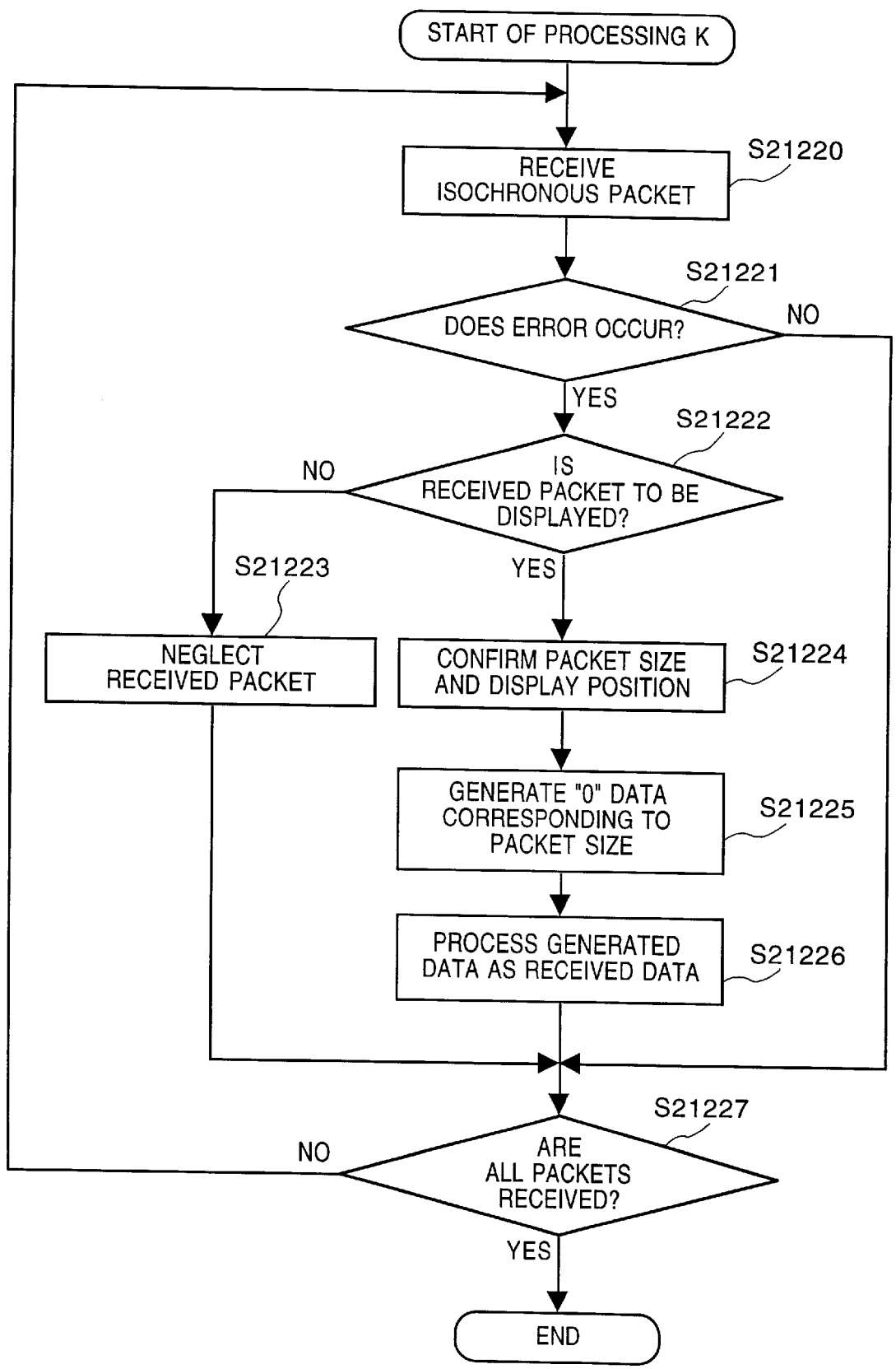
FIG. 53 is a flow chart showing the procedure of processing K in FIGS. 51A and 51B.

Processing K of transferring prescanned image data having no color information using isochronous transfer will be described next with reference to FIG. 53.

In step S21220, processing of receiving the prescanned image data in the isochronous transfer mode is started. In step S21221, it is determined whether the packet transmitted from the image reading apparatus 1201 is not properly received because of the problem on the line or the state of the reception-side node, i.e., whether an error occurs. If YES in step S21221, the flow advances to step S21222. If NO in step S21221 (if transfer is successfully complete), the flow advances to step S21227.

In step S21222, it is determined whether the received packet (error packet) is to be displayed. If YES in step S21222, the flow advances to step S21224 to neglect the received packet. That is, it is supposed that the packet is not received.

If YES in step S21222, the flow advances to step S21224 to confirm (check) the size of the packet to be received in response to error occurrence and the position where the packet data is to be displayed. In step S21225, dummy data (data with a value "0") corresponding to the packet size confirmed in step S21224 is generated. When the received image data is used for only display, data corresponding to the size necessary for display is generated.

In step S21226, the data generated in step S21225 is processed as the received image data. If the image data is to be stored in a RAM 1217, storage processing is performed. If the image data is to be displayed on the display unit 1220, display processing is performed.

In step S21227, it is determined whether all image data are transmitted. If all packets are processed, the sequence of processing K is ended. If NO in step S21227, i.e., if packets to be received still remain, the flow returns to step S21220 to continue reception processing.

In processing K, the processing time is shortened by omitting retransmission. Problems posed due to the absence of retransmission (e.g., a shift in position information due to image data omission) are solved by generating dummy data on the reception side or neglecting the image data hierarchy having the error.

Figure 54:
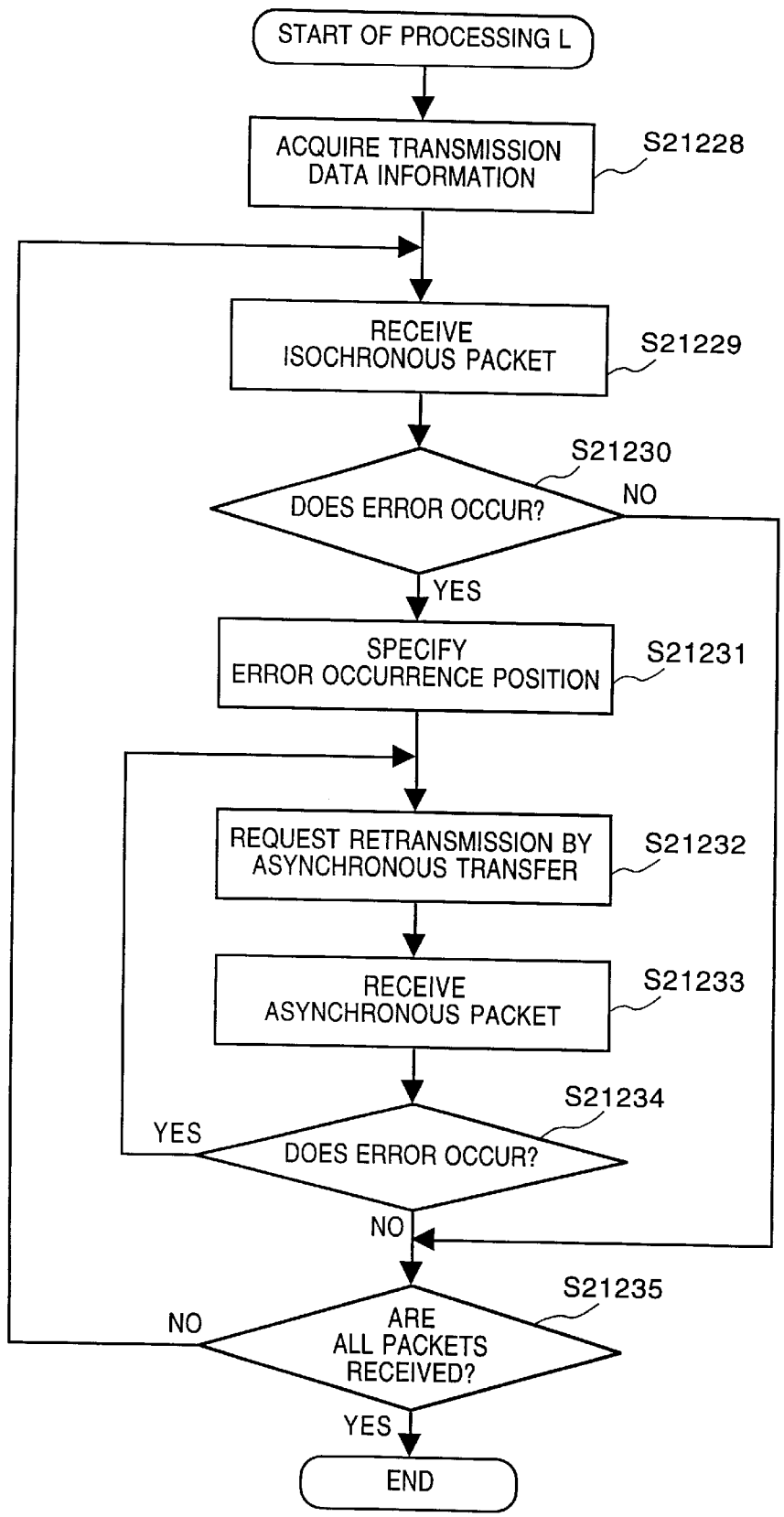
FIG. 54 is a flow chart showing the procedure of processing L in FIGS. 51A and 51B.

Scanned image data transfer processing L using isochronous transfer will be described next with reference to FIG. 54.

In step S21228, the above-described transmission data information from the image reading apparatus 1201 is received by asynchronous transfer in which retransmission is performed in response to error occurrence. With this processing, information such as the size of image data to be transmitted, the packet size, and the total number of packets is obtained.

In step S21229, processing of receiving the scanned image data in the isochronous transfer mode is started. The image data is received from the image reading apparatus 1201 in units of packets by isochronous transfer.

In step S21230, it is determined whether the packet transmitted from the image reading apparatus 1201 is not properly received because of the problem on the line or the state of the reception-side node, i.e., whether an error occurs. On the IEEE 1394 protocol, no retransmission is performed in the isochronous transfer mode. Therefore, an independent protocol is performed subsequently.

Whether an error occurs is determined as follows. The packet number (serial number defined by the independent protocol) is managed on the basis of the size of image data, the size of a packet, the total number of packets, which are acquired in advance, to determine packet omission or grasp/set the packet transfer interval from the band where the packets can be transferred in the isochronous transfer mode, which is acquired after IEEE 1394 bus configuration. To grasp the packet transfer interval, a cycle start packet is used. If the host computer 1214 determines that a packet is omitted, the flow advances to step S21231. If NO in step S21230, the flow advances to step S21235.

In step S21231, the error occurrence position is specified in response to error occurrence. More specifically, the image data display position is specified from the serial number defined by the independent protocol or transfer period.

In step S21232, a retransmission request based on the asynchronous transfer mode is output to the image reading apparatus 1201 in accordance with the IEEE 1394 protocol in response to error occurrence. With this processing, all packets can be transmitted without data omission.

In step S21233, the asynchronous packet is received. The received packet data is assigned to the position where data may be omitted.

In step S21234, it is determined whether the retransmission packet transmitted from the image reading apparatus 1201 by asynchronous transfer is not properly received because of the problem on the line or the state of the reception-side node, i.e., whether an error occurs. When the host computer 1214 determines that an error occurs, i.e., a packet is omitted, the flow returns to step S21232. If NO in step S21234, the flow advances to step S21235.

In step S21235, it is determined whether all image data are received. If all packets are processed, the sequence of processing L is ended. If NO in step S21235, i.e., if packets to be received still remain, the flow returns to step S21229 to continue reception processing.

With the above arrangement, the original purposes of prescanning, i.e., conformation of an image to be read and designation of a scanning region (designation of a trimming range) can be satisfied, and the time required for transmission of prescanned image data can be shortened. Especially, when the user is to grasp the position and size of the original or the entire image to be read or designate the trimming range, the above purpose can be achieved without performing retransmission of omitted data even when image data of a certain hierarchical plane is omitted due to error occurrence during prescanned image data transfer because the remaining hierarchical data are received. In addition, by using the mode for guaranteeing proper data transfer to transfer the hierarchical data after DCT transformation, which has a low frequency component (including a DC component), image data having resolution and tone as minimum requirements for display of the prescanned image can be properly obtained.

<Other Embodiments>

In the fifth embodiment, image processing such as compression, correction parameter extraction, and correction data generation are constituted by dedicated hardware and simultaneously processed. However, sequential processing by the CPU for controlling the main body can also be realized.

In the fifth embodiment, as the means for communicating with the host, the IEEE 1394 interface is used. However, the same arrangement as described above can be realized by using a communication interface such as a USB supporting the mode without error retransmission (isochronous mode). Therefore, the present invention is not limited to the IEEE 1394 interface, as a matter of course.

In the above embodiment, the buffer memory for storing orthogonally transformed data has a capacity corresponding to one page. However, when the original image is read in units of bands by scanning a line sensor having a predetermined number of photoelectric conversion elements, as in a serial printer, a memory capacity of one band suffices. Therefore, the present invention is not limited by the capacity.

The object of the present invention can also be realized even by supplying a storage medium storing software program codes for realizing the functions of the above-described embodiments to a system or an apparatus, and causing the computer (or a CPU or an MPU) of the system or the apparatus to read out and execute the program codes stored in the storage medium, as a matter of course.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS running on the computer performs part or all of actual processing on the basis of the instructions of the program codes, as a matter of course.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of t he program codes, as a matter of course.

In the embodiments, the image reading apparatus and the host computer are connected. However, the image data generation source is not limited to the image reading apparatus such as an image scanner. For example, image data may be stored in a predetermined storage medium in advance and transferred to the host computer. One example of this is a digital camera.

As has been described above, according to the fifth embodiment, the following effects can be obtained.

The original purposes of prescanning, i.e., conformation of an image to be read and designation of a scanning region (designation of a trimming range) can be satisfied, and the time required for transmission of prescanned image data can be shortened.

Even when an error occurs during prescanned image data transfer to result in data omission, no retransmission is performed. For this reason, the load on both the transmission side and the reception side is reduced.

To transfer low-resolution low-tone hierarchical data, the mode for guaranteeing proper data transfer is used. Therefore, image data having resolution and tone as minimum requirements for display of the prescanned image can be properly obtained.

As described above, according to the fifth embodiment, when image data requiring no high quality is necessary as in prescanning of an original image, image data guaranteeing a certain quality can be obtained at a high speed.

As many apparently widely different embodiments of the present invention can be made without departing from the spirit and scope thereof, it is to be understood that the invention is not limited to the specific embodiments thereof except as defined in the appended claims.

What is claimed is:

1. An image processing system comprising:
   an image processing apparatus having read means for scanning an original and converting the original into image data, said image processing apparatus performing serial communication with another apparatus through a predetermined network or a communication interface;
   communication means, having a first transfer mode which does not correct a communication error and a second transfer mode which corrects a communication error, for transferring the image data read by said read means in one of the modes; and control means for controlling said communication means to transfer prescanned image data from said read means in the first transfer mode and transfer main scanned image data in the second transfer mode.

2. The system according to claim 1, further comprising setting means for setting to transfer the prescanned image data in the second transfer mode.

3. The system according to claim 1, wherein said communication means performs communication through a USB interface.

4. The system according to claim 3, wherein the first transfer mode is an isochronous transfer mode, and the second transfer mode is a bulk transfer mode.

5. The system according to claim 1, wherein said communication means performs communication through an IEEE 1394 interface.

6. The system according to claim 5, wherein the first transfer mode is an isochronous transfer mode, and the second transfer mode is an asynchronous transfer mode.

7. The system according to claim 1, further comprising storage means for storing prescanned image data and main scanned image data.

8. The system according to claim 7, further comprising image compression means for compressing the prescanned image data and main scanned image data to be stored in said storage means.

9. The system according to claim 1, further comprising resolution conversion processing means for converting resolution of prescanned image data and main scanned image data.

10. The system according to claim 1, further comprising means for extracting a feature amount parameter from prescanned image data and using the feature amount parameter in setting scanning.

11. The system according to claim 10, wherein the feature amount parameter is associated with a size and position of the original.

12. The system according to claim 10, wherein the feature amount parameter is associated with color information.

13. The system according to claim 10, wherein the feature amount parameter is associated with an input signal level from said read means.

14. The system according to claim 10, wherein the feature amount parameter is associated with an attribute of a drawn object.

15. An information processing apparatus for receiving data from said image processing system of claim 1, comprising:

determination means for determining whether an error occurs when a data packet is received from said image processing system using the first transfer mode in prescanning an original image; and dummy data generation means for, when said determination means determines that an error occurs generating dummy data corresponding to a data size of the data packet without outputting a retransmission request for the data packet, wherein an image is constructed on the basis of normally received data and the dummy data.

16. The apparatus according to claim 15, wherein said communication interface comprises an IEEE 1394 interface.

17. The apparatus according to claim 16, wherein the first transfer mode is an isochronous transfer mode, and the second transfer mode is an asynchronous transfer mode.

18. The apparatus according to claim 15, wherein said communication interface comprises a USB (Universal Serial Bus) interface.

19. The apparatus according to claim 15, wherein said dummy data generation means generates dummy data having a value "0" as a data content when data to be received contains no color information.

20. A method of controlling an information processing apparatus for receiving data from said image processing system of claim 1, comprising:

the determination step of determining whether an error occurs when a data packet is received from said image processing system using the first transfer mode in prescanning an original image; and the dummy data generation step of, when it is determined in the determination step that an error occurs, generating dummy data corresponding to a data size of the data packet without outputting a retransmission request for the data packet, wherein an image is constructed on the basis of normally received data and the dummy data.

21. A storage medium which stores program codes functioning as an information processing apparatus for receiving data from said image processing system of claim 1, comprising:

a program code for the determination step of determining whether an error occurs when a data packet is received from said image processing system using the first transfer mode in prescanning an original image; and a program code for the dummy data generation step of, when it is determined in the determination step that an error occurs, generating dummy data corresponding to a data size of the data packet without outputting a retransmission request for the data packet.

22. An integrated image processing apparatus constituted by said image processing system of claim 1 and an information processing apparatus for receiving data from said image processing system, wherein said information processing apparatus comprises:

determination means for determining whether an error occurs when a data packet is received from said image processing system using the first transfer mode in prescanning and scanning an original image; and retransmission request means for, when said determination means determines that an error occurs, requesting to retransmit the data packet in the second transfer mode.

23. The system according to claim 22, wherein said communication interface comprises an IEEE 1394 interface.

24. The system according to claim 23, wherein the first transfer mode is an isochronous transfer mode, and the second transfer mode is an asynchronous transfer mode.

25. The system according to claim 22, wherein said communication interface comprises a USB (Universal Serial Bus) interface.

26. The system according to claim 22, wherein said information processing apparatus further comprises display means for displaying an image on the basis of the received data.

27. An information processing apparatus for receiving data from said image processing system of claim 1, comprising:

determination means for determining whether an error occurs when a data packet is received from said image processing system using the first transfer mode; and retransmission request means for, when said determination means determines that an error occurs, requesting to retransmit the data packet in the second transfer mode.

28. A method of controlling an information processing apparatus for receiving data from said image processing system of claim 1, comprising:

the determination step of determining whether an error occurs when a data packet is received from said image processing system using the first transfer mode; and the retransmission request step of, when it is determined in the determination step that an error occurs, requesting to retransmit the data packet in the second transfer mode.

29. A storage medium which stores program codes functioning as an information processing apparatus for receiving data from said image processing system of claim 1, comprising:

a program code for the determination step of determining whether an error occurs when a data packet is received from said image processing system using the first transfer mode; and a program code for the retransmission request step of, when it is determined in the determination step that an error occurs, requesting to retransmit the data packet in the second transfer mode.

30. An image processing apparatus constituted by said image processing system of claim 1 and an information processing apparatus for receiving data from said image processing system, wherein said information processing apparatus comprises:

determination means for determining whether an error occurs when a data packet is received from said image processing system using the first transfer mode; and retransmission request means for, when said determination means determines that an error occurs, requesting to retransmit the data packet in the second transfer mode.

31. The system according to claim 1, further comprising transformation means for transforming the image data into two-dimensional spatial frequency components in units of pixel blocks, and transmission control means for dividing the frequency components obtained by said transformation means into low-frequency component data and high-frequency component data and transmitting, to a terminal, the high-frequency component data using the first transfer mode and the low-frequency component data using at least the second transfer mode.

32. The apparatus according to claim 31, wherein said transformation means comprises progressive coding means based on orthogonal transformation.

33. The system according to claim 32, wherein said progressive coding means employs a spectrum selection scheme.

34. The apparatus according to claim 33, wherein the first transfer mode is an isochronous transfer mode, and the second transfer mode is an asynchronous transfer mode.

35. The apparatus according to claim 32, wherein said progressive coding means employs a continuous approximation scheme.

36. The apparatus according to claim 31, wherein said communication interface comprises an IEEE 1394 interface.

37. The apparatus according to claim 31, wherein said communication interface comprises a USB (Universal Serial Bus) interface.

38. The apparatus according to claim 31, wherein said transmission control means transfers the low-frequency component data using both the first and second transfer modes.

39. The apparatus according to claim 31, wherein the frequency components to be transferred in the first or second transfer mode change in accordance with an instruction from an apparatus for receiving the data.

40. The system according to claim 31, wherein when data is to be transferred in the first transfer mode, a predetermined serial number is added to a data packet to be transferred in the first transfer mode.

41. An information processing apparatus for receiving data from said image processing system of claim 40, comprising:

means for, when the data transferred in the first transfer mode has an error, transmitting the serial number of the data packet to said image processing system to request retransmission.

42. The apparatus according to claim 31, wherein said transmission control means is biased when a prescanning instruction is received.

43. An information processing apparatus for receiving data from said image processing system of claim 31, comprising:

inverse transformation means for synthesizing the low-frequency component data and the high-frequency component data and performing transformation inverse to transformation by said transformation means; and display means for displaying inversely transformed data.

44. A method of controlling said image processing system of claim 1, comprising:

the transformation step of transforming the image data into two-dimensional spatial frequency components in units of pixel blocks; and the transmission control step of dividing the frequency components obtained in the transformation step into low-frequency component data and high-frequency component data and transmitting, to a terminal, the high-frequency component data using the first transfer mode and the low-frequency component data using at least the second transfer mode.

45. The system according to claim 1, wherein said image processing apparatus comprises transformation means for transforming the image data into two-dimensional spatial frequency components in units of pixel blocks, and transmission control means for dividing the frequency components obtained by said transformation means into low-frequency component data and high-frequency component data and transmitting, to a terminal, the high-frequency component data using the first transfer mode and the low-frequency component data using at least the second transfer mode, and said terminal comprises inverse transformation means for receiving the data transmitted by said transmission control means, synthesizing the frequency component data, and performing transformation inverse to transformation by said transformation means.

46. An image processing method of performing serial communication with another apparatus through a predetermined network network or a communication interface, comprising:

the read step of scanning an original by predetermined read means and converting the original into image data;

the communication step of transferring the image data read by said read means in one of a first transfer mode which does not correct a communication error and a second transfer mode which corrects a communication error; and;

the control step of controlling the communication step to transfer prescanned data in the read step in the first transfer mode and transfer main scanned data in the second transfer mode.

* * * * *

UNITED STATES PATENT AND TRADEMARK OFFICE
CERTIFICATE OF CORRECTION

PATENT NO.   : 6,307,974 B1
DATED         : October 23, 2001
INVENTOR(S)  : Tsujimoto It is certified that error appears in the above-identified patent and that said Letters Patent is hereby corrected as shown below:

Column 6,
Line 49, delete "s canner" and please insert therefor -- scanner --
Line 51, delete "t o" and insert therefor -- to --

Column 8,
Line 66, delete "th e" and insert therefor -- the --

Column 9,
Line 1, delete "th e" and insert therefor -- the --

Column 12,
Line 16, delete "re quested" and insert therefor -- requested --
Line 46, delete "S1502" and insert therefor -- S1501 --

Column 18,
Line 19, delete "(scanning)" and insert therefor -- (scanning). --

Column 36,
Line 2, delete "2802" and insert therefor -- S2802 --
Line 6, delete "52803" and insert therefor -- S2803 --

Column 38,
Line 23, delete "origina l" and insert therefor -- original --
Line 32, delete "wit h" and insert therefor -- with --

UNITED STATES PATENT AND TRADEMARK OFFICE
CERTIFICATE OF CORRECTION

PATENT NO. : 6,307,974 B1
DATED : October 23, 2001
INVENTOR(S) : Tsujimoto

It is certified that error appears in the above-identified patent and that said Letters Patent is hereby corrected as shown below:

Column 42,
Line 22, delete "t he" and insert therefor -- the --

Signed and Sealed this

Eighth Day of October, 2002

Attest:

JAMES E. ROGAN
Attesting Officer     Director of the United States Patent and Trademark Office